(12) United States Patent
Misawa

(10) Patent No.: US 8,009,421 B2
(45) Date of Patent: Aug. 30, 2011

(54) DISPLAY ELEMENT, PORTABLE EQUIPMENT AND IMAGING DEVICE

(75) Inventor: Atsushi Misawa, Asaka (JP)

(73) Assignee: Fujifilm Corporation, Tokyo (JP)

( * ) Notice: Subject to any disclaimer, the term of this patent is extended or adjusted under 35 U.S.C. 154(b) by 633 days.

(21) Appl. No.: 12/002,753

(22) Filed: Dec. 19, 2007

(65) Prior Publication Data

US 2008/0212271 A1   Sep. 4, 2008

(30) Foreign Application Priority Data

Dec. 20, 2006   (JP) .................................. 2006-343267

(51) Int. Cl.
*H05K 5/00* (2006.01)
*G06F 1/16* (2006.01)
*G06F 3/033* (2006.01)
*G09G 5/00* (2006.01)

(52) U.S. Cl. ......... 361/679.55; 361/679.21; 361/679.26; 345/156; 345/157; 345/168; 345/905

(58) Field of Classification Search .......... 361/679.01–679.45, 679.55–679.59, 361/724–727; 345/156, 157, 168, 169, 905
See application file for complete search history.

(56) References Cited

U.S. PATENT DOCUMENTS

| | | | |
|---|---|---|---|
| 6,016,176 A | 1/2000 | Kim et al. | |
| 6,269,225 B1 | 7/2001 | Sato et al. | |
| 6,424,387 B2 | 7/2002 | Sato et al. | |
| 6,762,929 B2 * | 7/2004 | Sawyer | 361/679.05 |
| 6,873,315 B2 * | 3/2005 | Hemia et al. | 345/156 |
| 7,184,086 B2 | 2/2007 | Tamura | |
| 7,667,962 B2 * | 2/2010 | Mullen | 361/679.56 |
| 2001/0008582 A1 | 7/2001 | Sato et al. | |
| 2003/0048256 A1 * | 3/2003 | Salmon | 345/168 |
| 2003/0160892 A1 | 8/2003 | Tamura | |
| 2004/0052044 A1 | 3/2004 | Mochinzuki et al. | |
| 2004/0183958 A1 * | 9/2004 | Akiyama et al. | 349/58 |
| 2006/0209218 A1 * | 9/2006 | Lee et al. | 349/1 |
| 2007/0241002 A1 * | 10/2007 | Wu et al. | 206/150 |

FOREIGN PATENT DOCUMENTS

| | | |
|---|---|---|
| EP | 0 790 617 A3 | 7/1998 |
| EP | 1 394 803 A1 | 3/2004 |
| EP | 1 394 804 A2 | 3/2004 |
| JP | 9-134132 | 5/1997 |
| JP | 9-216465 | 8/1997 |
| JP | 2000-10086 | 1/2000 |

(Continued)

*Primary Examiner* — Jayprakash N Gandhi
*Assistant Examiner* — Nidhi Desai
(74) *Attorney, Agent, or Firm* — McGinn IP Law Group, PLLC

(57) ABSTRACT

A flexible display element capable of being rolled up and unfurled, comprises a back plate covering a back side of the display element, wherein the back plate comes into contact with the back side of the display element when the display element is rolled up, and at least a central portion of the back plate is separated from the display element to support the display element in a flat shape when the display element is unfurled. Thus, the display element and the back plate can be rolled up and carried with a simple configuration of the display element and the back plate, and the display element can be supported in a flat shape when unfurled. Therefore, it is possible to provide a flexible display element having high portability, ease of rolling, and retention of flatness during periods of use.

30 Claims, 44 Drawing Sheets

FOREIGN PATENT DOCUMENTS

| | | |
|---|---|---|
| JP | 2000-19980 | 1/2000 |
| JP | 2003-250074 | 9/2003 |
| JP | 2003-274250 | 9/2003 |
| JP | 2004-109382 | 4/2004 |
| JP | 2004-118803 | 4/2004 |

* cited by examiner

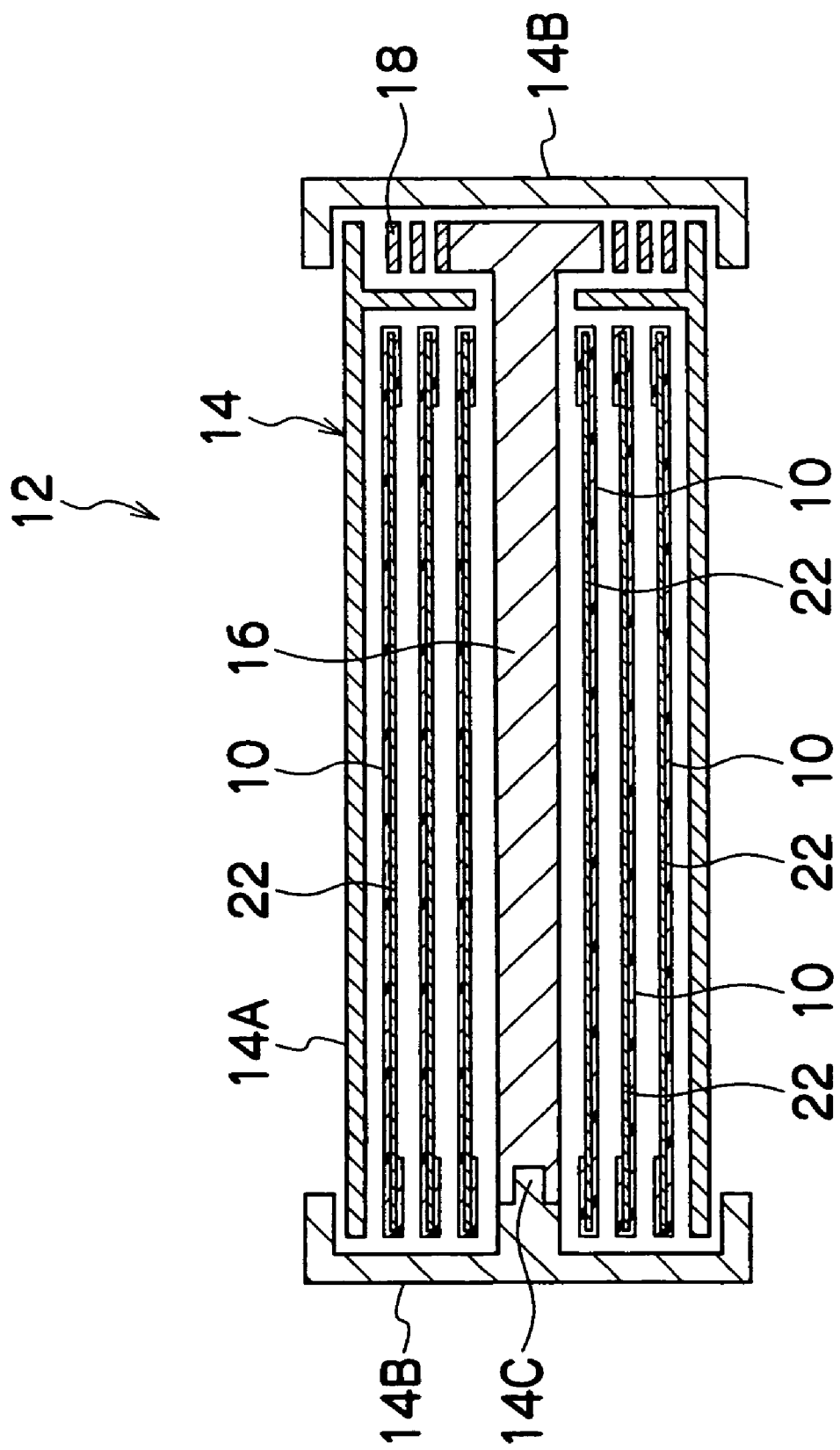

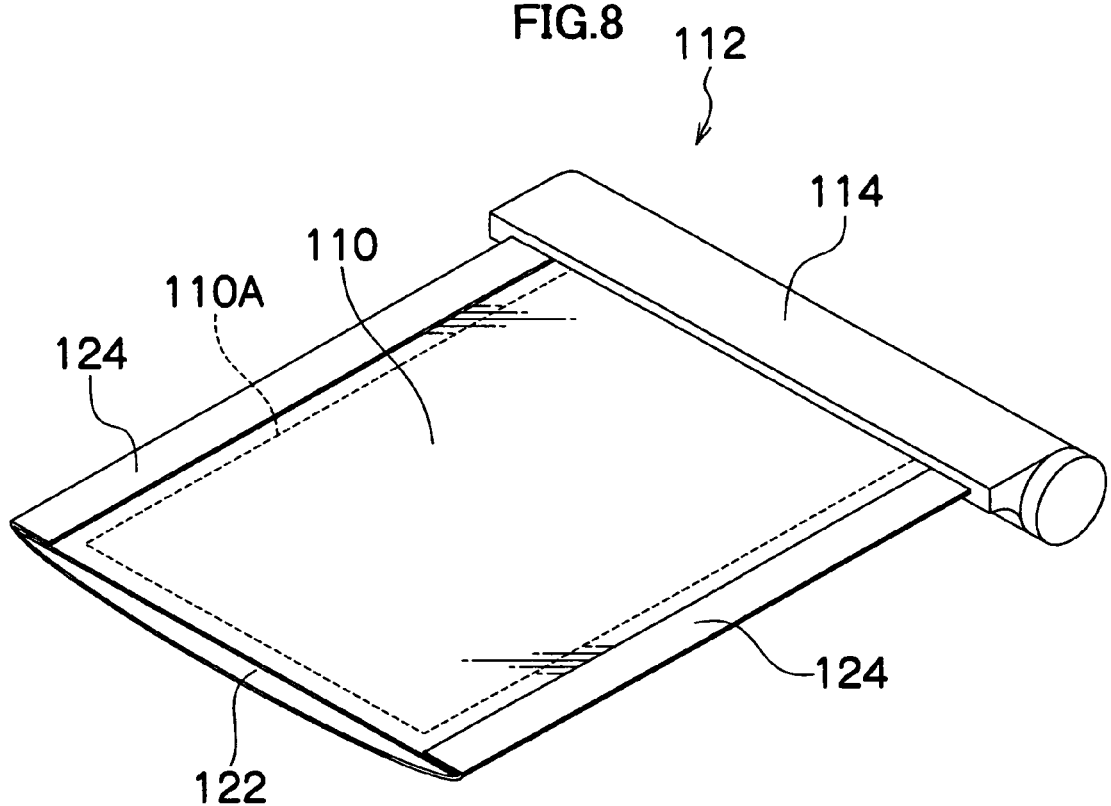
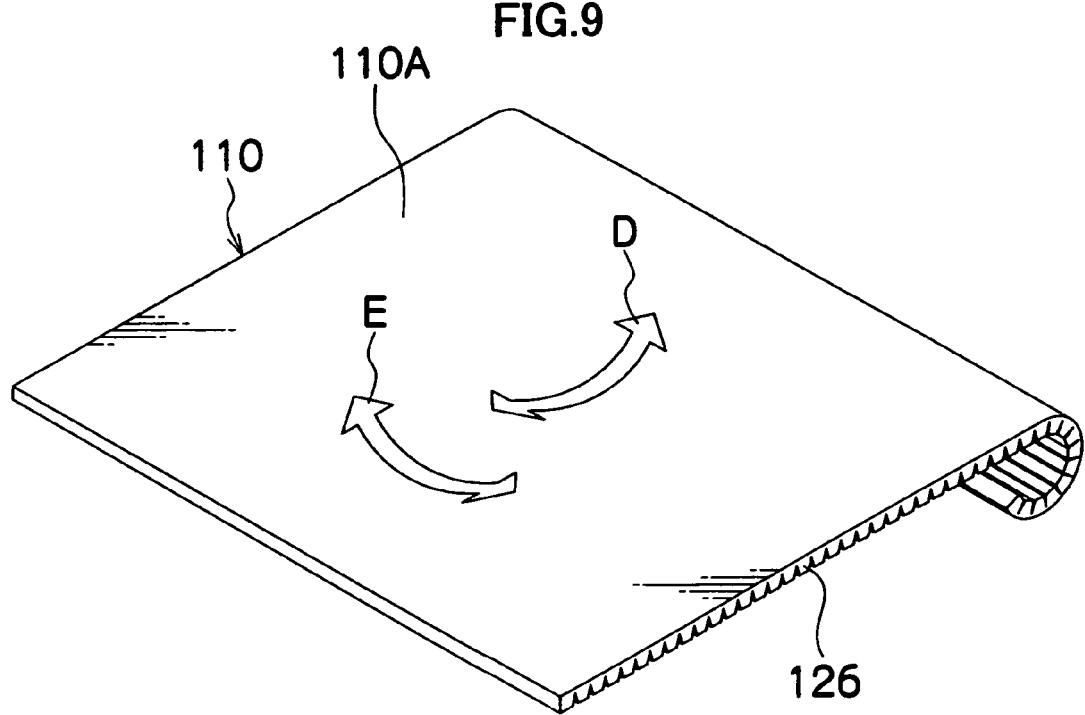

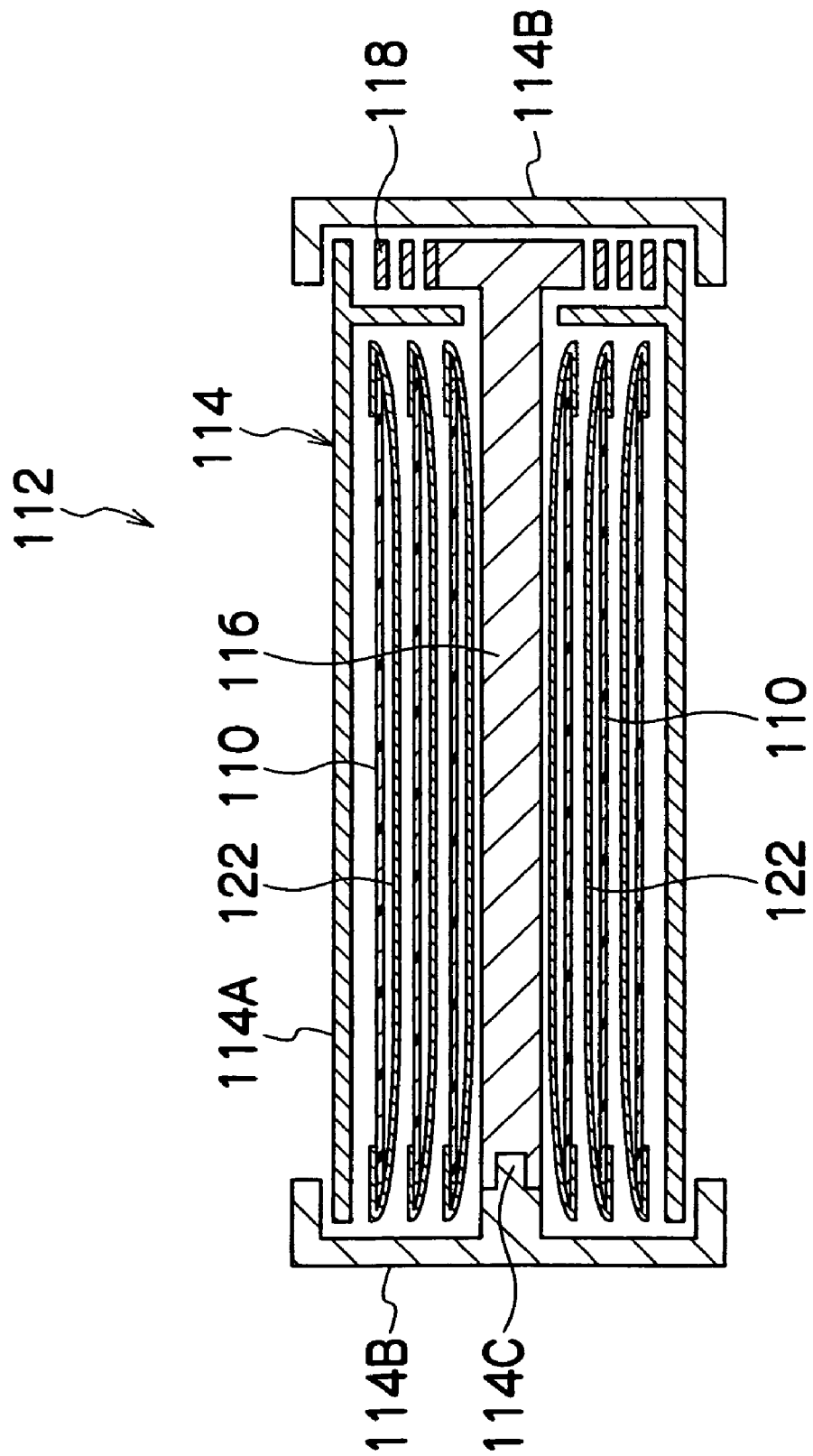

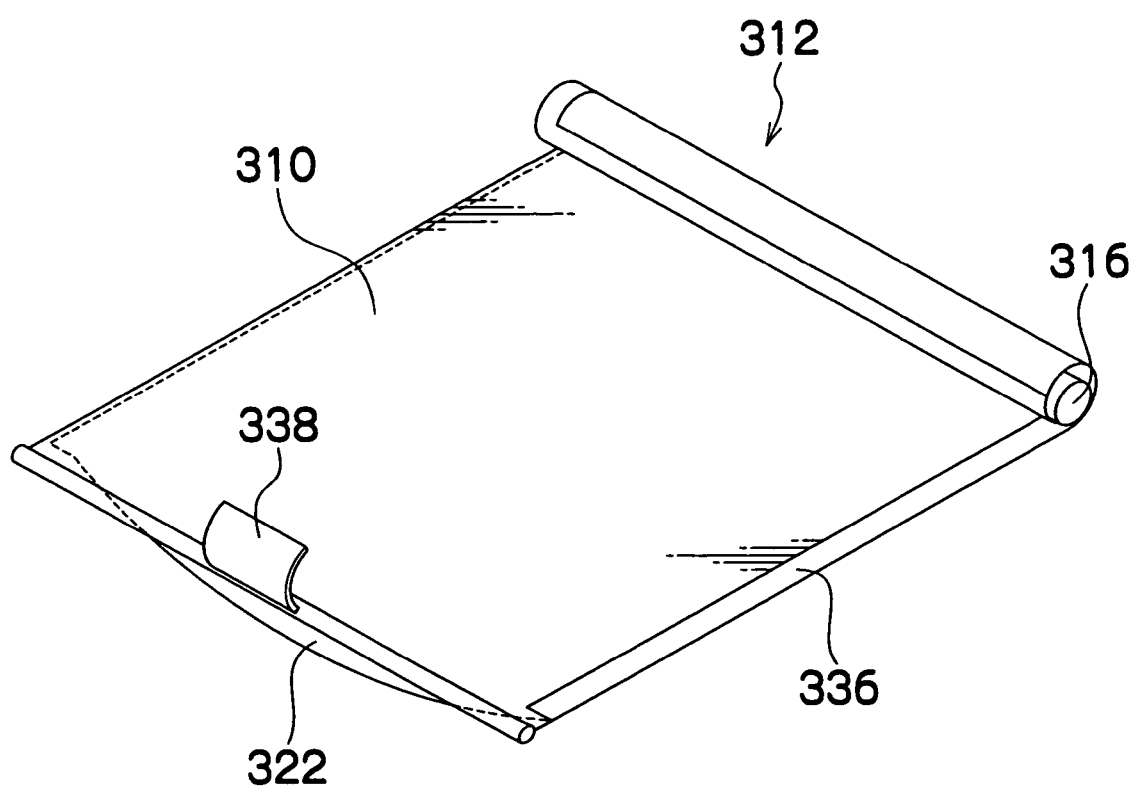

FIG.47
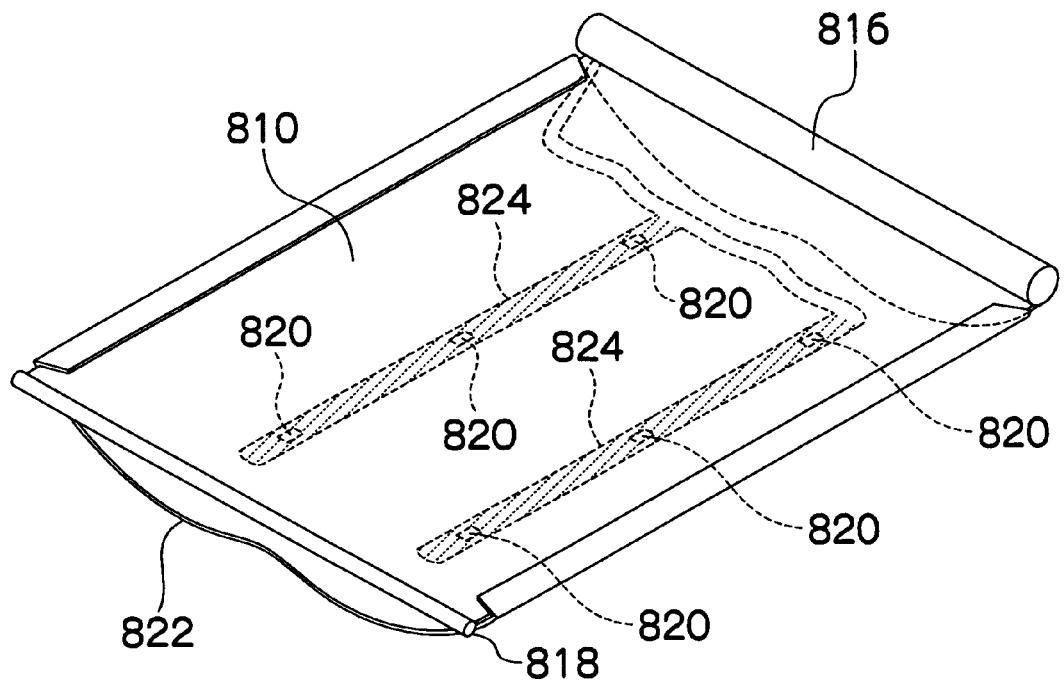
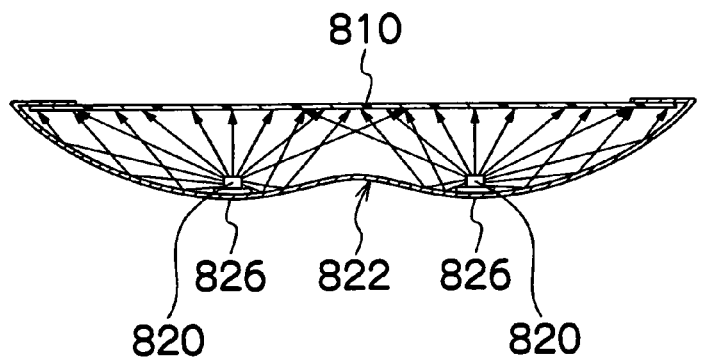
FIG.48A
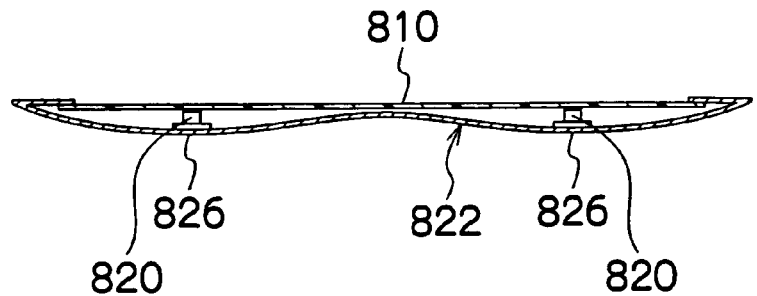
FIG.48B

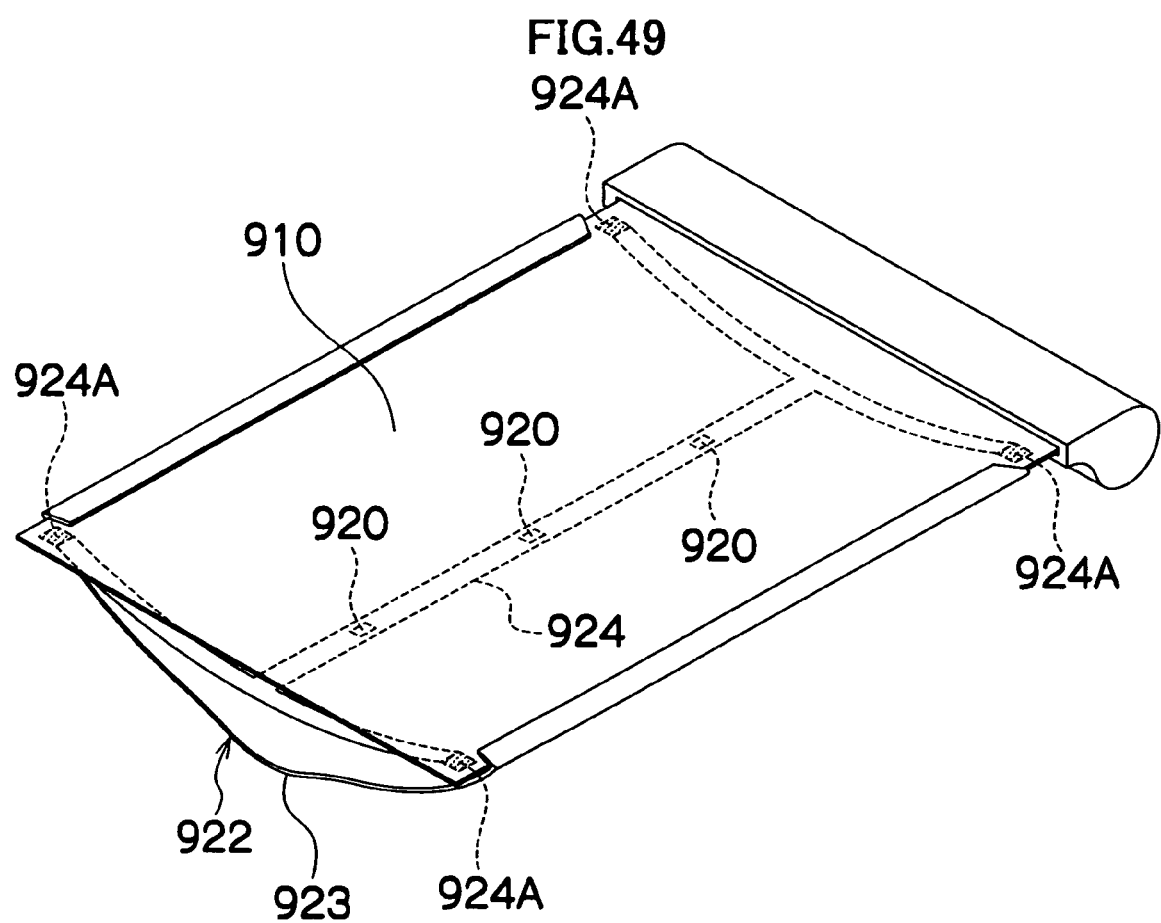

DISPLAY ELEMENT, PORTABLE EQUIPMENT AND IMAGING DEVICE

BACKGROUND OF THE INVENTION

1. Field of the Invention

The present invention relates to a display element, portable equipment, and an imaging device which have high portability, a high compactifying capability, and high operability.

2. Description of the Related Art

Numerous kinds of portable equipment using flexible display elements which can be reduced in size when carried have been proposed. For example, like a roll-up display disclosed in Japanese Patent Application Laid-Open No. H09-216465, some kinds of portable equipment enable viewing of images recorded by thermal heads. According to Japanese Patent Application Laid-Open No. H09-216465, a recording medium pulled out of the main body of equipment is flexible like paper and does not have flatness alone. Therefore, as is evident from the drawings of Japanese Patent Application Laid-Open No. H09-216465, according to the characteristics, the recording medium has to be held with both hands to keep the flatness.

As disclosed in Japanese Patent Application Laid-Open No. 2003-250074 and Japanese Patent Application Laid-Open No. 2003-274250, some kinds of portable equipment have flexible displays and have the following drawbacks: when the strength of a display is increased to keep the shape of the display pulled out of the main body of equipment, the strength becomes a resistance to rolling when the display is stored. Thus it is difficult to roll up the display. On the other hand, when the flexibility of the display is increased to facilitate rolling, the shape retention of the display decreases. In order to keep the flatness, it is necessary to hold a gripping portion on the opposite side of the main body of equipment, thus operability is hard to obtain.

Further, Japanese Patent Application Laid-Open No. 2000-19980 proposes a display body that is curved when pulled out (claim 1 and paragraph [0022] in Japanese Patent Application Laid-Open No. 2000-19980). A small curvature causes an insufficient strength and the curvature has to be increased to obtain a sufficient strength. As a result, a curved display may be viewed and the display may not have a designed aspect ratio.

Furthermore, Japanese Patent Application Laid-Open No. 2000-10086 and Japanese Patent Application Laid-Open No. H09-134132 propose display units that are surrounded by frames keeping the flatness of the display units. Since the frames cannot be rolled up, a problem arises in storing the frames. Thus such equipment is stored in a complicated manner and the size reduction is limited.

In Japanese Patent Application Laid-Open No. 2004-118803 and Japanese Patent Application Laid-Open No. 2004-109382, displays are just foldable and thus the degree of size reduction is smaller than that of a roll-up display.

As described above, in related art, numerous kinds of equipment using flexible display elements are proposed which are reduced in size when carried. However, all of the methods are defective in ease of rolling (compactifying capability) and retention of flatness (operability) during periods of use.

SUMMARY OF THE INVENTION

An object of the present invention is to propose a flexible display element, potable equipment, and an imaging device which have high portability, ease of rolling, and retention of flatness during periods of use.

In order to attain the object, a display element according to a first aspect of the invention is a flexible display element capable of being rolled up and unfurled, including a back plate covering the back side of the display element, wherein the back plate comes into contact with the back side of the display element when the display element is rolled up, and at least a central portion of the back plate is separated from the display element to support the display element in a flat shape when the display element is unfurled.

According to the display element of the first aspect of the invention, the display element and the back plate can be rolled up and carried with a simple configuration of the display element and the back plate, and the display element can be supported in a flat shape when unfurled. Thus it is possible to provide a flexible display element having high portability, ease of rolling, and retention of flatness during periods of use.

In order to attain the object, a portable equipment according to a second aspect of the invention is a portable equipment including a flexible display element capable of being rolled up and unfurled, which includes a back plate on the back side of the display element, wherein the back plate comes into contact with the display element when the display element is rolled up, and the back plate is bent such that at least a central portion of the back plate is separated from the display element due to a bend when the display element is unfurled, and the flatness of the display element is kept by a structure made up of the display element and the back plate when the display element is unfurled.

According to the portable equipment of the second aspect of the invention, the back plate is provided on the back side of the flexible display element. The back plate comes into contact with the display element when rolled up, and at least the central portion of the back plate is separated from the display element due to a bend (deformation) when unfurled. Since the strength of the display element is kept by the back plate, a sufficient strength can be obtained by the bend. Thus even in the presence of a large bend, the display element is not bent and a designed aspect ratio can be obtained on display.

In order to attain the object, a portable equipment according to a third aspect of the invention is a portable equipment including a flexible display element capable of being rolled up and unfurled, further including a back plate on the back side of the display element, wherein the back plate reduces a resistance to a rolling movement by removing a lateral pressure in the planar direction of the display element to decrease shape retention of the display element when the display element is rolled up, and applies a lateral pressure to the display element to keep the shape of the display element flat when the display element is unfurled.

According to the portable equipment of the third aspect of the invention, the back plate can obtain shape retention when the display element is pulled out, and can reduce a resistance when the display element is rolled up. The back plate applies a lateral pressure in contact with both sides of the display element when bent, and removes the lateral pressure when rolled up, and a clearance is generated between the back plate and at least one of the sides of the display element, thereby reducing a resistance when the display element is rolled up.

According to a portable equipment of a fourth aspect of the invention, in one of the second and third aspects, the back plate is V-shaped in cross section with the central portion separated from the display element due to a bend when the display element is unfurled.

The portable equipment of the fourth aspect of the invention enables the back plate to have a highly stable shape and facilitates processing and product inspection.

According to a portable equipment of a fifth aspect of the invention, in the second to fourth aspects, the back plate has a ridge member to make a shape with a plurality of ridges by a plurality of bent portions separate from the display element, so as to form a space surrounded by the display element and the back plate when the display element is unfurled.

According the portable equipment of the fifth aspect of the invention, the display element is unfurled and placed on a table and the like with higher stability.

According to the portable equipment of a sixth aspect of the invention, in the second to fourth aspects, the back plate has one end fixed on the back side of the display element.

According to the portable equipment of the sixth aspect of the invention, the back plate has one end fixed on the back side of the display element, thereby reducing rattling caused by unsteadiness during transportation.

In order to attain the object, an imaging device according to a seventh aspect of the invention is an imaging device including at least a taking lens and a shooting part, the imaging device further including: a main body substantially shaped like one of a cylinder and a polygon, and a display element stored in the main body when carried, and pulled out of the main body when used to display a photographed image or a reproduced image, wherein the display element has a flatness keeping mechanism for keeping flatness when the display element is pulled out, and the flatness keeping mechanism keeps a predetermined positional relationship and shape relative to the main body by applying a restraining force to the pulled out display element, and releases the restraining force when the display element is stored in the main body.

According to the imaging device of the seventh aspect of the invention, shooting is enabled when the main body is held with one hand and the display element is pulled out with the other hand. At this moment, since the shape of the display element is kept by the flatness keeping mechanism, an operation can be performed with one hand holding the main body. Further, the display element can be easily rolled up when stored. The display element is pulled out to the left or the right when viewed from the back side of the main body. Considering that the shooting part is operated with the right hand of a photographer it is preferable to pull out the display element to the left in view of operability.

According to an imaging device of an eighth aspect of the invention, in the seventh aspect, the flatness keeping mechanism is a back plate covering the back side of the display element, the back plate comes into contact with the back side of the display element when the display element is rolled up, at least a central portion of the back plate is separated from the display element to support the display element in a flat shape when the display element is unfurled, a pull-out slot for the display element on the main body is formed to have a shape which is substantially identical to a cross-sectional shape of the unrolled back plate, and to have a clearance formed on a portion facing a surface of the display element.

According to the imaging device of the eighth aspect of the invention, the clearance of the pull-out slot of the main body does not bring the surface of the display element into contact with the pull-out slot, thereby preventing scratches. Additionally, the bent portion of the back plate is not flattened by the pull-out slot and thus the positional relationship between the main body and the display element can be kept. When the main body is held, the shape of a base (near the pull-out slot of the main body) is kept even in the presence of an external force applied to the display element, thereby strongly keeping the integration with the main body. According to this imaging device, shooting can be performed with one hand holding the main body and the display element can be easily rolled up when stored.

According to an imaging device of a ninth aspect of the invention, in the seventh aspect, the flatness keeping mechanism is a back plate covering the back side of the display element, the back plate comes into contact with the back side of the display element when the display element is rolled up, and at least a central portion of the back plate is separated from the display element to support the display element in a flat shape when the display element is unfurled, a pull-out slot for the display element of the main body is formed to have a shape which is flattened by a predetermined amount from a cross-sectional shape of the unrolled back plate, and to have a clearance formed on a portion facing a surface of the display element.

According to the imaging device of the ninth aspect of the invention, the clearance of the pull-out slot of the main body does not bring the surface of the display element into contact with the pull-out slot, thereby preventing scratches. Further, the back plate is flattened by the pull-out slot to about a half, so that a resistance to a rolling movement can be reduced. Since the back plate is not completely flattened, it is possible to prevent the display element from easily shaking.

According to an imaging device of a tenth aspect of the invention, in the seventh aspect, the flatness keeping mechanism is a back plate covering the back side of the display element, the back plate comes into contact with the back side of the display element when the display element is rolled up, and at least a central portion of the back plate is separated from the display element to support the display element in a flat shape when the display element is unfurled, a pull-out slot for the display element of the main body is formed to have a shape which is flatter than a cross-sectional shape of the unrolled back plate, and to have a clearance formed on a portion facing a surface of the display element.

According to the imaging device of the tenth aspect of the invention, the clearance of the pull-out slot of the main body does not bring the surface of the display element into contact with the pull-out slot, thereby preventing scratches. Further, since the back plate is flattened by the pull-out slot, a resistant to a rolling movement is reduced.

According to an imaging device of an eleventh aspect of the invention, in the seventh aspect, the flatness keeping mechanism is a back plate covering the back side of the display element, the back plate comes into contact with the back side of the display element when the display element is rolled up, and at least a central portion of the back plate is separated from the display element to support the display element in a flat shape when the display element is unfurled, a pull-out slot for the display element of the main body is formed to have a shape which is substantially identical to a cross-sectional shape of the unrolled back plate, and to have a clearance expanding toward the center, which is formed on a portion facing a surface of the display element.

According to the imaging device of the eleventh aspect of the invention, the clearance of the pull-out slot of the main body does not bring the surface of the display element into contact with the pull-out slot, thereby preventing scratches. Additionally, the bent portion of the back plate is not flattened by the pull-out slot and thus the positional relationship between the main body and the display element can be kept. When the main body is held, the shape of a base (near the pull-out slot of the main body) is kept even in the presence of an external force applied to the display element, thereby strongly keeping the integration with the main body. According to this imaging device, shooting can be performed with one hand holding the main body and the display element can be easily rolled up when stored. Moreover, even when the display element is slightly bent, the clearance expanding toward the center prevents rubbing on the display surface, thereby preventing scratches.

A portable equipment of a twelfth aspect of the invention, in the second to sixth aspects, further includes a pull-out slot for the display element on the main body of the portable equipment, the pull-out slot being formed to have a shape which is substantially identical to a cross-sectional shape of the unrolled back plate, and to have a clearance formed on a portion facing a surface of the display element.

According to the portable equipment of the twelfth aspect of the invention, the clearance of the pull-out slot of the main body does not bring the surface of the display element into contact with the pull-out slot, thereby preventing scratches. Additionally, the bent portion of the back plate is not flattened by the pull-out slot and thus the positional relationship between the main body and the display element can be kept. When the main body is held, the shape of a base (near the pull-out slot of the main body) is kept even in the presence of an external force applied to the display element, thereby strongly keeping the integration with the main body. According to this portable equipment, shooting can be performed with one hand holding the main body and the display element can be easily rolled up when stored.

A portable equipment according to a thirteenth aspect of the invention, in the second to sixth aspects, further includes a pull-out slot for the display element on the main body of the portable equipment, the pull-out slot being formed to have a shape which is flattened by a predetermined amount from a cross-sectional shape of the unrolled back plate, and to have a clearance formed on a portion facing a surface of the display element.

According to the portable equipment of the thirteenth aspect of the invention, the clearance of the pull-out slot of the main body does not bring the surface of the display element into contact with the pull-out slot, thereby preventing scratches. Further, the back plate is flattened by the pull-out slot to about a half, so that a resistance to a rolling movement can be reduced. Since the back plate is not completely flattened, it is possible to prevent the display element from easily shaking.

A portable equipment according to a fourteenth aspect of the invention, in the second to sixth aspects, further includes a pull-out slot for the display element on the main body, the pull-out slot being formed to have a shape which is flatter than a cross-sectional shape of the unrolled back plate, and to have a clearance formed on a portion facing a surface of the display element.

According to the portable equipment of the fourteenth aspect of the invention, the clearance of the pull-out slot on the main body of the portable equipment does not bring the surface of the display element into contact with the pull-out slot, thereby preventing scratches. Further, since the back plate is flattened by the pull-out slot, a resistant to a rolling movement is reduced.

A portable equipment according to a fifteenth aspect of the invention, in the second to sixth aspects, further includes a pull-out slot for the display element on the main body of the portable equipment, the pull-out slot being formed to have a shape which is substantially identical to a cross-sectional shape of the unrolled back plate, and to have a clearance expanding toward the center, the clearance being formed on a portion facing a surface of the display element.

According to the portable equipment of the fifteenth aspect of the invention, the clearance of the pull-out slot of the main body does not bring the surface of the display element into contact with the pull-out slot, thereby preventing scratches. Additionally, the bent portion of the back plate is not flattened by the pull-out slot and thus the positional relationship between the main body and the display element can be kept. When the main body is held, the shape of a base (near the pull-out slot of the main body) is kept even in the presence of an external force applied to the display element, thereby strongly keeping the integration with the main body. According to this imaging device, shooting can be performed with one hand holding the main body and the display element can be easily rolled up when stored. Moreover, even when the display element is slightly bent, the clearance expanding toward the center prevents rubbing on the display surface, thereby preventing scratches.

An imaging device according to a sixteenth aspect of the invention, in the seventh to eleventh aspects, further includes a detecting device which detects a movement of the display element, wherein operation modes are switched in synchronization with the movement of the display element from a first position to a second position.

According to the imaging device of the sixteenth aspect of the invention, the operation modes can be switched between OFF and ON in synchronization with a change of the display element between a stored state and a pull-out state. Since the imaging device is turned on/off in response to the pulling out/storage of the display element, high operability can be obtained.

An imaging device according a seventeenth aspect of the invention, in the seventh to eleventh and sixteenth aspects, further includes convex portions provided on portions of the back plate, which are folded to both ends of a display screen.

According to the imaging device of the seventeenth aspect of the invention, the convex portions are provided on portions of the back plate, which are folded to the ends of a screen. Thus the convex portions act as spacers when the display element is rolled up, thereby preventing scratches and rubbing on the display screen of the display element.

An imaging device according to an eighteenth aspect of the invention, in the seventh to eleventh, sixteenth, and seventeenth aspects, further includes a rolling detecting switch disposed on a position making contact with a portion outside a display range of the display element when the display element is rolled up, on a roll-up shaft of the display element stored in the main body, wherein the rolling detecting switch turns off at least a part of display on a display part when the display element is rolled up.

According to the imaging device of the eighteenth aspect of the invention, when the display element is rolled up around the roll-up shaft, the rolling detecting switch is provided on a position making contact with a portion outside the display range, and at least one of the display and the power supply is turned off when the display element is rolled up, so that at least one of the power supply and the display can be automatically turned off. Thus it is possible to prevent a skip of power shutdown and excessive power consumption.

In order to attain the object, a portable equipment according to a nineteenth aspect of the invention includes a back plate on the back side of a flexible display element, the back plate being bent with a central portion separated from the display element due to a bend when the display element is unfurled, and is closer to the display element when the display element is stored than when the display element is unfurled, wherein the back plate includes a reflective surface on the display element side of the back plate, and light emitting elements between the reflective surface and the display element.

According to the portable equipment of the nineteenth aspect of the invention, the back plate that is bent when unfurled is provided on the back side of the flexible display element, wherein the reflective surface is provided on the inner surface of the back plate and the light emitting elements are provided between the reflective surface and the display element. Thus it is possible to provide a display element having high compactifying efficiency, in which a back plate can also act as a reflecting mirror of backlights.

According to a portable equipment of a twentieth aspect of the invention, in the nineteenth aspect, the light emitting elements are provided on an intermediate position of the display element and the reflective surface by means of an elastic member, and the light emitting elements can be rolled in contact with the display element when the display element is rolled up.

According to the portable equipment of the twentieth aspect of the invention, the light emitting elements are provided on the intermediate position between the display element and the reflective surface by means of the elastic member, thereby improving light emitting characteristics.

According to a portable equipment of a twenty-first aspect of the invention, in the twentieth aspect, the elastic member is a flexible printed board having an interconnection of the light emitting elements.

According to the portable equipment of the twenty-first aspect of the invention, the flexible printed board also acts as the elastic member. Thus the light emitting elements can be provided on the intermediate point with a simple configuration.

According to a portable equipment of a twenty-second aspect of the invention, in the nineteenth to twenty-first aspects, the back plate comes into contact with the display element when the display element is rolled up, and the back plate is ridged to have a plurality of bent portions separate from the display element due to bends when the display element is unfurled.

According to the portable equipment of the twenty-second aspect of the invention, more even backlights can be obtained.

According to the display element, portable equipment, and the imaging device of the present invention, the back plate is provided on the back side of the display element, which comes into contact with the back side of the display element when the display element is rolled up, and supports the display element in a flat shape by separating from the display element at its central portion, at least, when the display element is unfurled. Thus it is possible to provide a flexible display element, portable equipment, and an imaging device which have high portability, ease of rolling, and retention of flatness during periods of use.

BRIEF DESCRIPTION OF THE DRAWINGS

FIG. 4 is a sectional view showing the main body of the display device shown in FIG. 1;

FIG. 8 is an outside drawing showing a display device including a flexible display element according to a second embodiment;

FIG. 9 is a perspective view showing the display element of the display device shown in FIG. 8;

FIG. 12 is a sectional view showing the main body of the display device shown in FIG. 8;

FIG. 14 is an outside drawing showing a display device including a flexible display element according to a fourth embodiment;

FIG. 47 is a perspective view of a display element including a back plate having backlights according to another embodiment;

FIGS. 48A and 48B are sectional views showing the display element of FIG. 47;

FIG. 49 is a perspective view of a display element including a back plate having backlights according to another embodiment;

DETAILED DESCRIPTION OF THE PREFERRED EMBODIMENTS

The following will describe preferred embodiments of a display element, portable equipment, and an imaging device of the present invention in accordance with the accompanying drawings.

First, a number of flexible displays (e.g., organic EL displays) including flexible display elements have been proposed in which a resin, and so on, is used as a base material instead of a glass of the related art.

Figure 1:
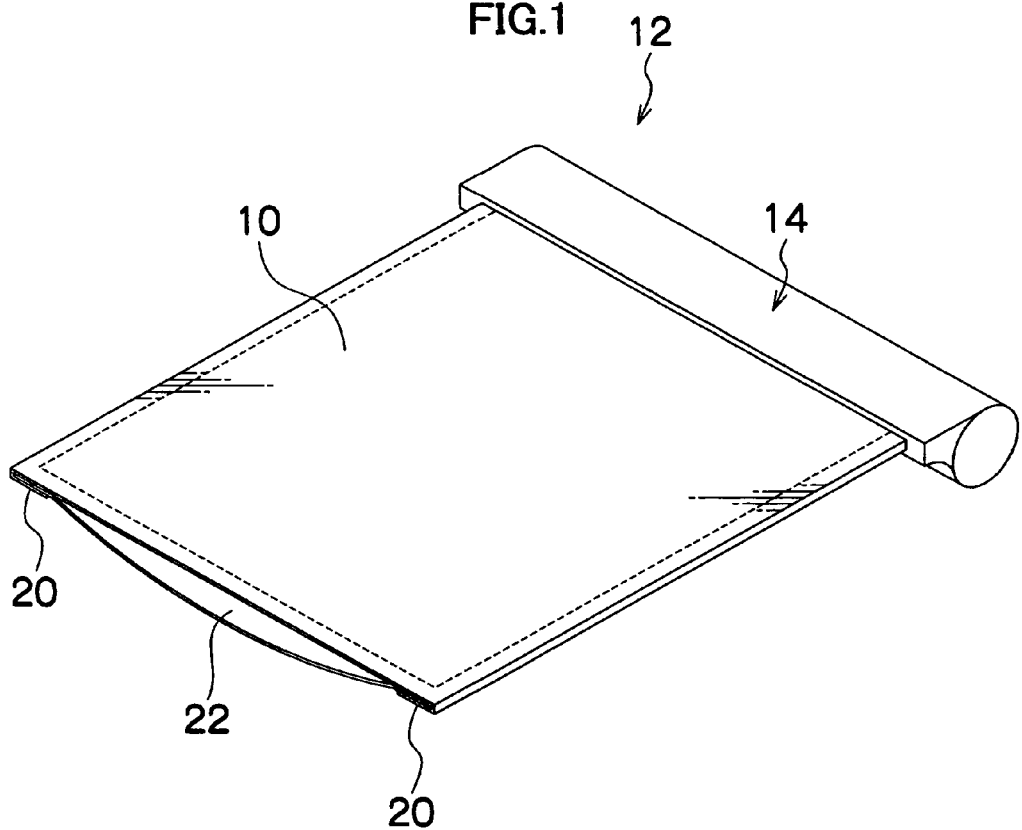
FIG. 1 is an outside drawing showing a display device including a flexible display element according to a first embodiment.
Figure 2:
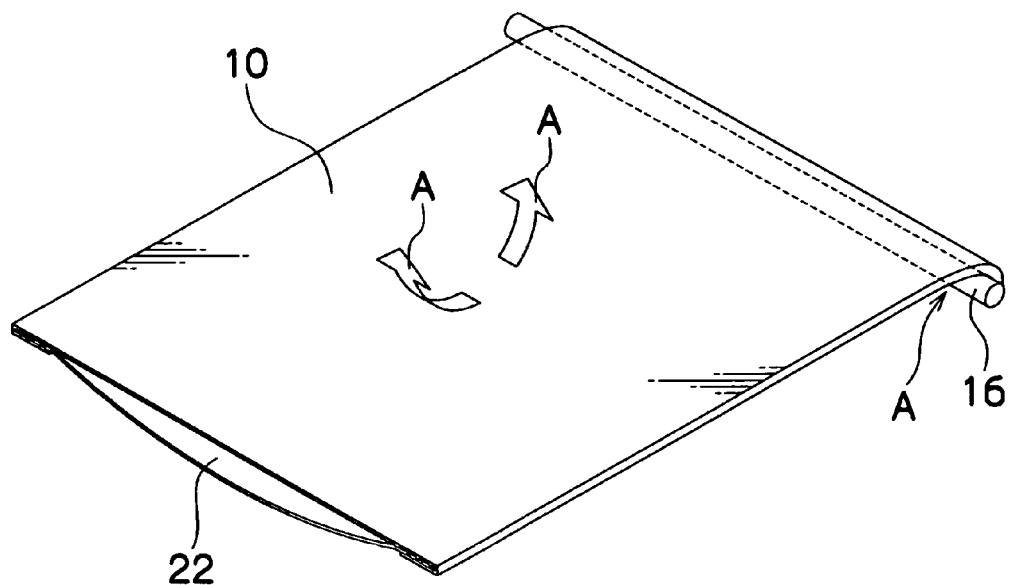
FIG. 2 is an explanatory drawing showing the internal configuration of the main body of the display device shown in FIG. 1.
Figure 3:
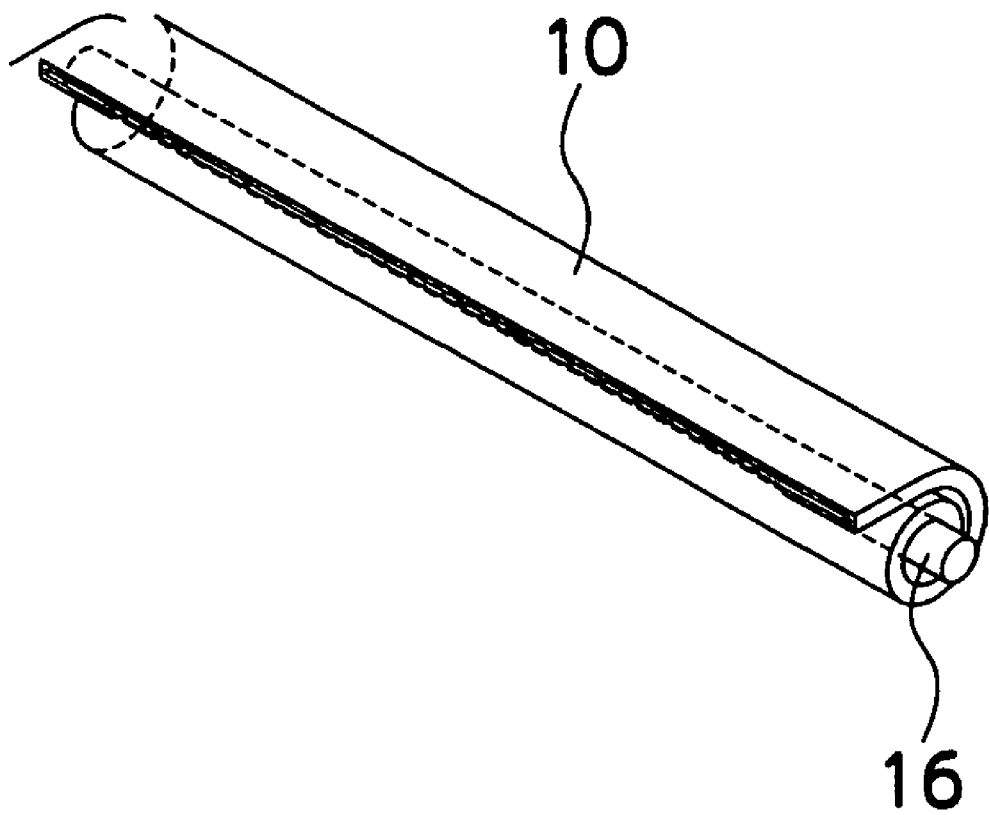
FIG. 3 shows a state in which the display element of the display device of FIG. 1 is rolled up around a roll-up shaft.

FIG. 1 is an outside drawing showing a display device (portable equipment) 12 including such a flexible display element 10 according to a first embodiment. In FIG. 1, the strip-like display element 10 is pulled out of a cylindrical main body 14. FIG. 2 shows the internal configuration of the main body 14 and a developed state of a roll-up shaft 16 for rolling up the display element 10 and the unrolled display element 10. FIG. 3 also shows the roll-up shaft 16 and the display element 10 having been completely rolled around the roll-up shaft 16.

Figure 7:
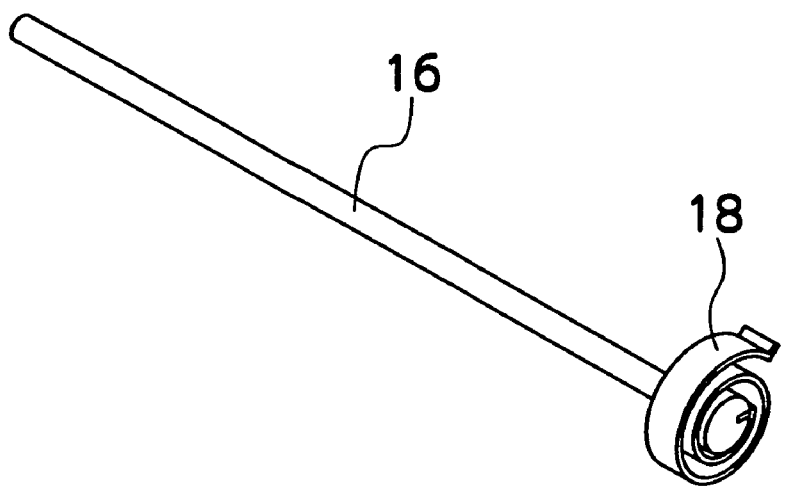
FIG. 7 is an explanatory drawing showing the configuration of a roll-up spring.

As shown in FIG. 4, the main body 14 of FIG. 1 is made up of a cylindrical body 14A having open ends, and caps 14B for closing the open ends of the cylindrical body 14A. The roll-up shaft 16 is disposed between the caps 14B so as to rotate via a bearing portion 14C, and is urged in a rolling direction by a roll-up spring 18 (see FIG. 7). Further, the state of the unrolled display element 10 is kept by a stopper (not shown).

Figure 5A:
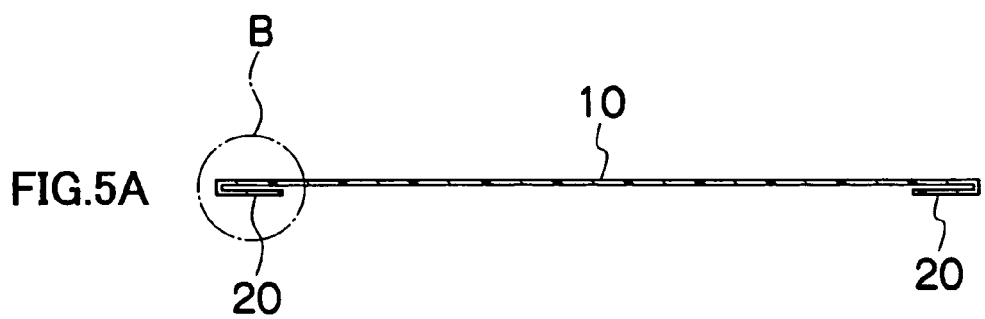
FIGS. 5A to 5D are sectional views showing the display element and a back plate shown in FIG. 1.
Figure 5B:
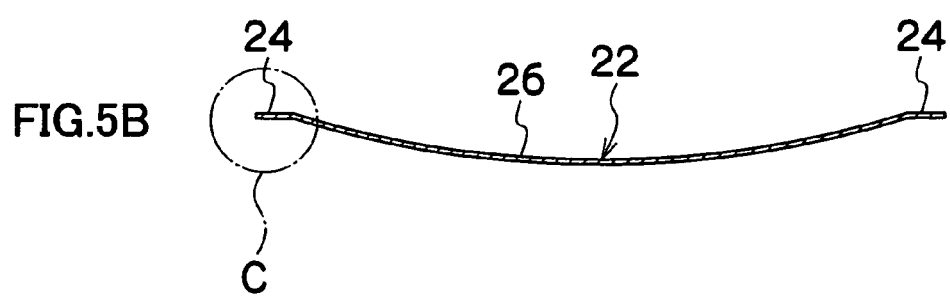
Figure 5C:
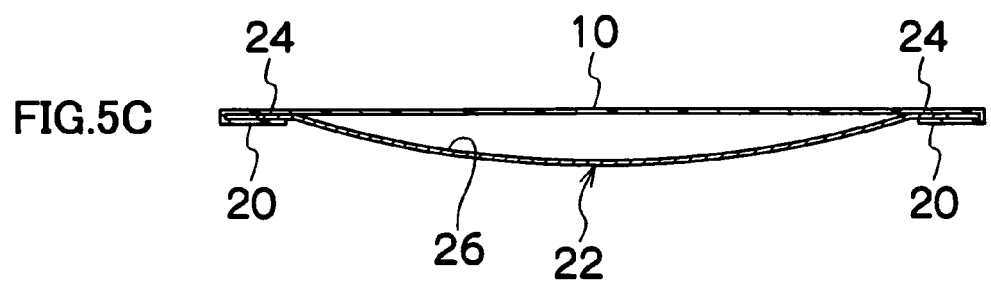
Figure 6:
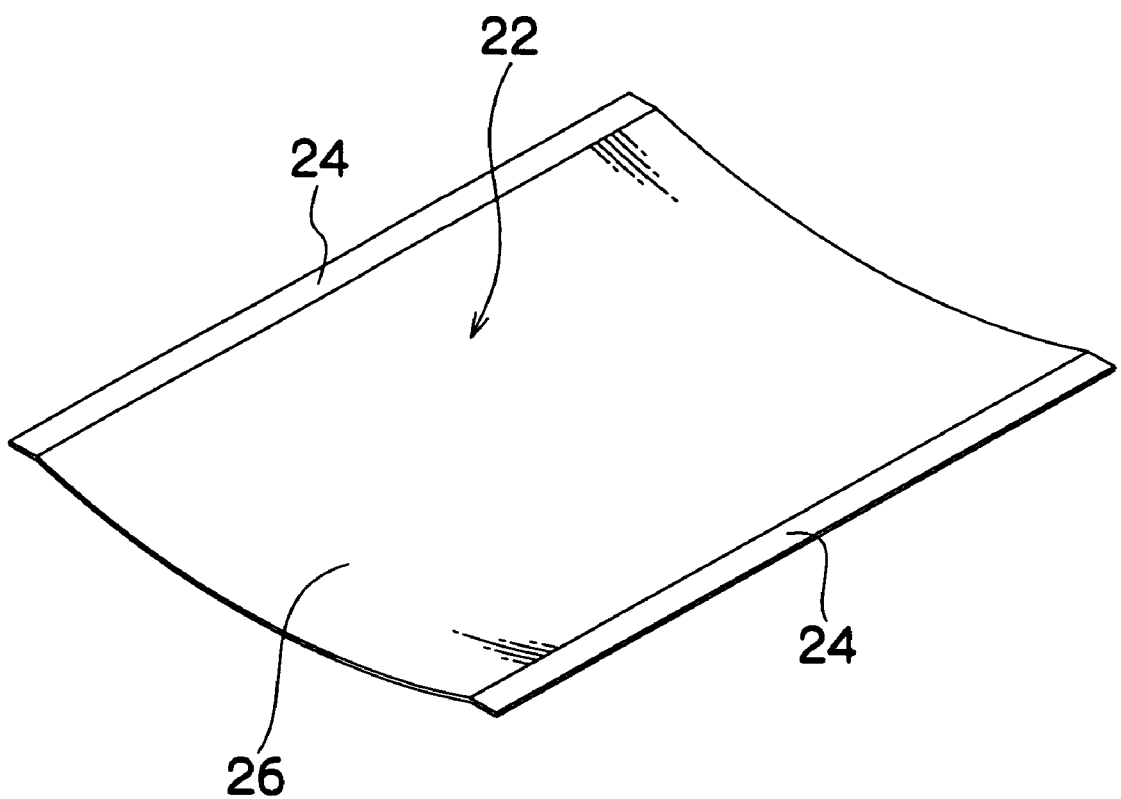
FIG. 6 is a perspective view showing the back plate of the display device shown in FIG. 1.

As shown in FIG. 5A, the display element is shaped like a thin plate in cross section. Portions B on the longitudinal ends of the display element 10 include the bent portions 20 substantially bent into U-shapes. On the back side of the display element 10, a back plate 22 having a free shape (when an external force is removed) of FIG. 6 is attached. The back plate 22 is formed by, as shown in FIG. 5B, connecting flat portions 24 of portions C on the longitudinal ends of the display element via a curved portion 26. By connecting the two flat portions 24 to the curved portion 26, the flexibility of the flat portions 24 is restricted and the surfaces of the flat portions 24 are kept in parallel with each other. The flat portions 24 are fit into and combined with the bent portions 20 of the display element 10 shown in FIG. 5A, so that a cross-sectional shape in FIG. 5C is obtained. At this moment, the flat portions 24 are pressed to the back side of the display element 10 by the bent portions 20 and the flat portions 24 are kept in parallel with each other as described above. Thus the overall display element 10 is kept flat and the display element 10 pulled out of the main body 14 independently keeps the flatness as shown in FIG. 1 or 2.

In this state, even when an attempt is made to bend the display element 10 to the direction along arrows A of FIG. 2 (or in the opposite directions: in such a direction that the display element 10 is bent along the width), the display element 10 cannot be easily bent because a force of the back plate 22 is applied to keep the flatness. Therefore, the display device 12 can be used by holding the main body 14 only with one hand, without holding the display element 10.

The following is an operation of rolling up the display element 10.

Figure 5D:
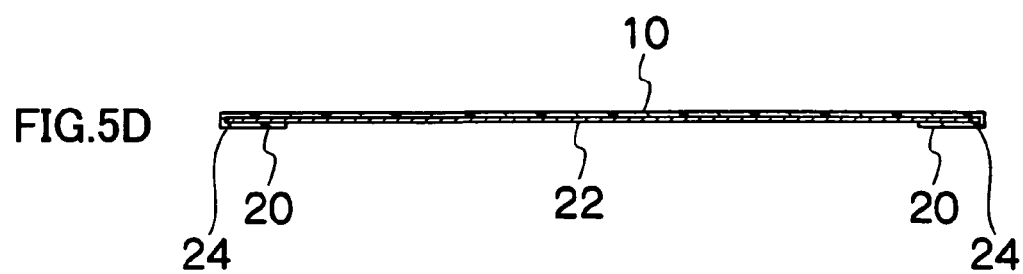

When the display element 10 is rolled up, the back plate 22 is flattened at portions A of FIG. 2 by the roll-up shaft 16 and the curved shape is corrected to a flat shape in cross section as shown in FIG. 5D. Thus the two flat portions 24 are connected via a plane and the force keeping the flatness of the display element 10 is not applied. Therefore, the display element 10 can be easily bent to the direction along the arrows A (or in the opposite directions) of FIG. 2 and can be easily rolled up around the roll-up shaft 16. The display element 10 rolled thus is stored in the main body 14 as shown in FIG. 4.

According to the first embodiment, the flexible display element 10 can be used after being unrolled (pulled out) from the main body 14. The unrolled display element 10 keeps its flat shape with the flatness retaining action of the back plate 22. When the display device 12 is carried, the display element 10 can be stored in the main body 14 as described above.

Figure 11:
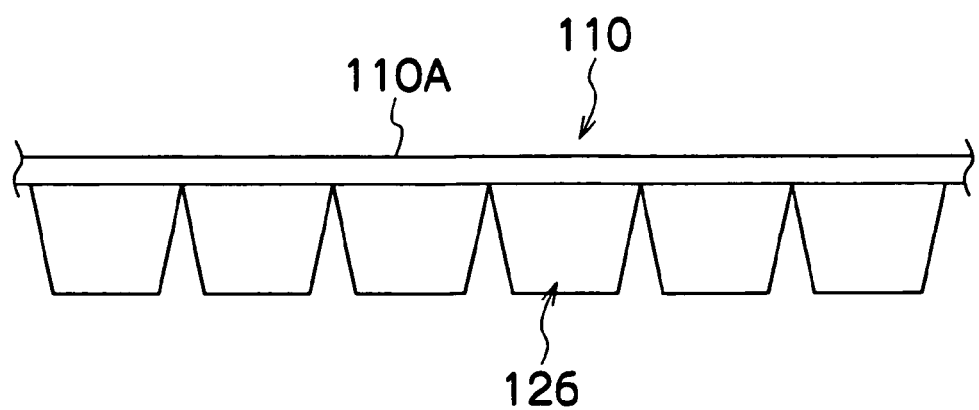
FIG. 11 is an enlarged view mainly showing the display element of the display device shown in FIG. 8.

FIG. 8 is an outside drawing showing a display device (portable equipment) 112 including a flexible display element 110 according to a second embodiment. The FIG. 8 shows the state that the display element 110 is unrolled. FIG. 9 shows the single unit configuration of the display element 110. Over the opposite side of a display surface 110A, convex beam members 126 are bonded as shown in FIG. 11. With this configuration, the flexible display element 110 alone can be bent in direction D (and in the opposite direction) of FIG. 9 but cannot be bent in direction E (and in the opposite direction).

As shown in FIG. 12, a main body 114 is made up of a cylindrical body 114A having open ends, and caps 114B for closing the open ends of the cylindrical body 114A. A roll-up shaft 116 is disposed between the caps 114B so as to rotate via a bearing portion 114C and is urged in a rolling direction by a roll-up spring 118. Further, the state of the unrolled display element 110 is kept by a stopper (not shown).

Figure 10A:
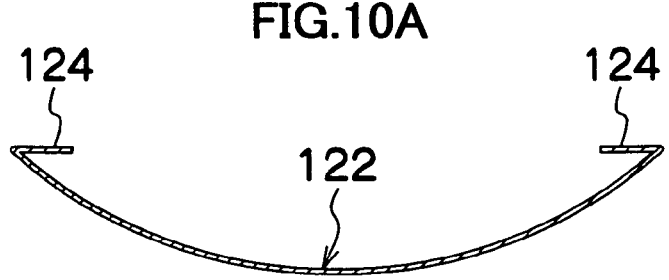
FIGS. 10A and 10B are sectional views showing the display element and the back plate of the display device shown in FIG. 8.
Figure 10B:
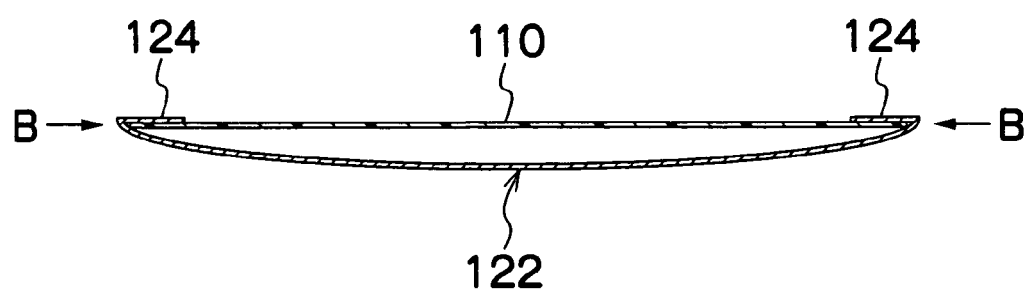

A back plate 122 combined with the display element 110 has a free shape (when an external force is removed) of FIG. 10A, and bent portions 124 are formed on both longitudinal ends of the display element. When the bent portions 124 are used to combine the back plate 122 with the display element 110 of FIG. 9, the back plate 122 has a curved shape in cross section as shown in FIG. 10B. At this moment, from the state of FIG. 110A, the back plate 122 is extended and combined with the display element, so that lateral pressures indicated by arrows B of FIG. 10B are applied from the back plate 122 in the width direction of the display element 110. The lateral pressures are received by the beam members 126 bonded on the back side of the display element 110, so that the display element 110 keeps the cross-sectional shape of FIG. 10B. Thus a force for keeping the flat shape is generated on the flexible display element 110 having been pulled out of the main body 114 of FIG. 8. In this way, the display element 110 pulled out of the main body 114 independently keeps its flatness. Also, one of the bent portions 124 of the back plate 122 may be fixed on the back side of the display element 110.

In this state, even when an attempt is made to bend the display element 110 to the direction along the arrows D and E of FIG. 9 (or in the opposite directions), the display element 110 cannot be easily bent because a force of the back plate 122 is applied to keep the flatness. Therefore, the display device 112 can be used by holding the main body 114 only with one hand, without holding the display element 110.

The following is an operation of rolling up the display element 110.

As in the first embodiment, when the display element 110 is rolled up, the back plate 122 is flattened by the roll-up shaft 116 because the display element 110 is rolled up around the roll-up shaft 116, and the curved shape of the back plate 122 is corrected to a flat shape. When the back plate 122 is flattened thus, the lateral pressures applied to the flexible display element 110 are released. Thus the display element 110 can be bent along the arrow D (or in the opposite direction). Therefore, the display element 110 is smoothly rolled up around the roll-up shaft 116. The display element 110 rolled thus is stored in the main body 114 as shown in FIG. 12.

As described above, according to the second embodiment of the present invention, the flexible display element 110 is used after being pulled out from the main body 114 and the unrolled (pulled-out) display element 110 keeps its flat shape alone. When carried, the display element 110 can be rolled up and thus can be stored in the main body 114.

Figure 13A:
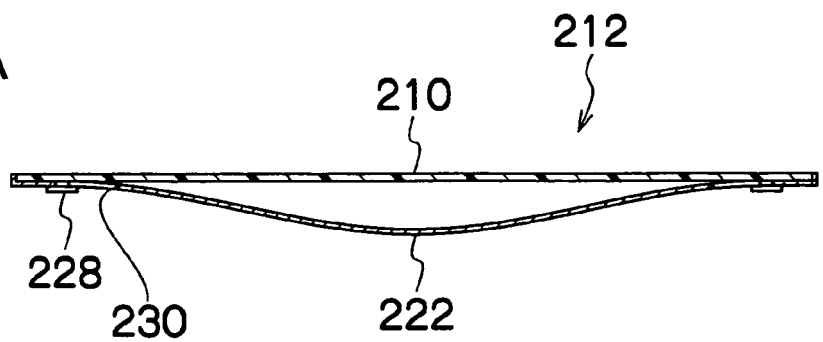
FIGS. 13A to 13C are explanatory drawings showing a flexible display element according to a third embodiment.
Figure 13B:
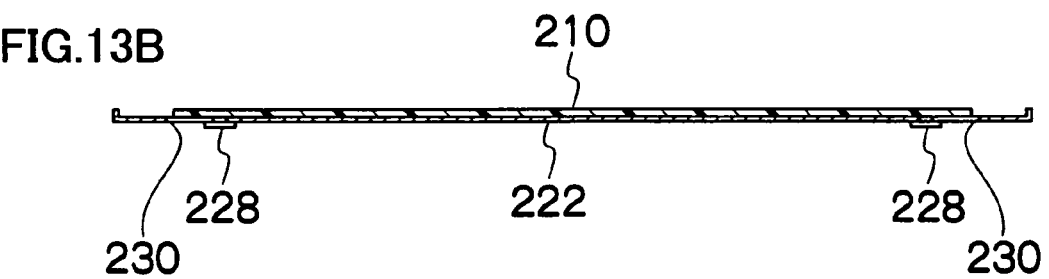

FIG. 13A shows a display device 212 including a flexible display element 210 according to a third embodiment. FIG. 3 is a sectional view showing a back plate 222 combined with the display element 210. FIG. 13B is a sectional view showing the rolled display element 210. On the longitudinal ends of the back side of the display element 210, protruding pins 228 are disposed at a predetermined spacing along the longitudinal direction. Further, on the longitudinal ends of the back plate 222, long holes 230 are formed at the same spacing as the pins 228. The long holes 230 are formed along a direction (width direction) orthogonal to the longitudinal direction.

Figure 13C:
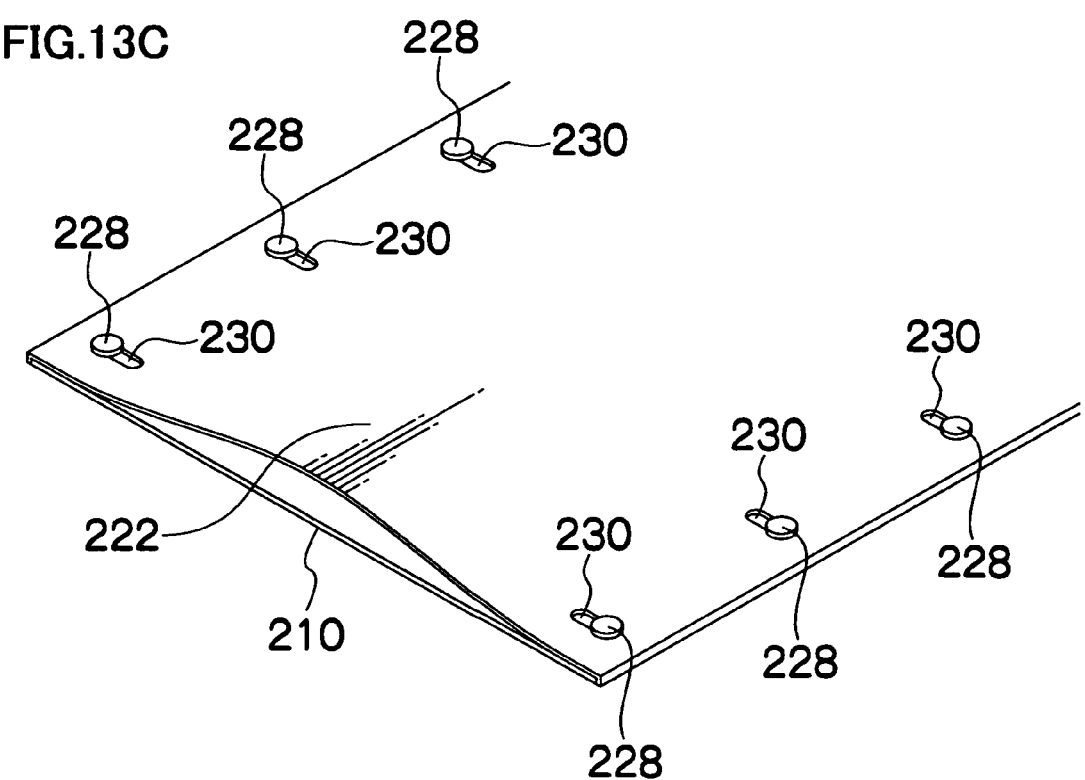

When the back plate 222 is attached to the display element 210 by fitting the pins 228 over the long holes 230, the long holes 230 press the pins 228 in the direction orthogonal to the longitudinal direction in the state of FIG. 13A where an external force is not applied to the back plate 222. Thus lateral pressures are applied to the display element 210. On the other hand, in FIG. 13B where the back plate 222 is flattened, the pressing forces are eliminated and thus the lateral pressures are released, so that the display element 210 can be rolled up. FIG. 13C is a rear view showing the display element 210 of the display device 212. In FIG. 13C, lateral pressures are applied to the display element 210.

In this way, the display element 210 is integrated with the back plate 222 by applying lateral pressures from the longitudinal ends in the width direction, and a raised part is formed at the center of the back plate 222. Thus the overall display device 212 has stereoscopic shape and is not easily bent even by a bending force, so that the display element 210 keeps the flat shape.

Figure 15:
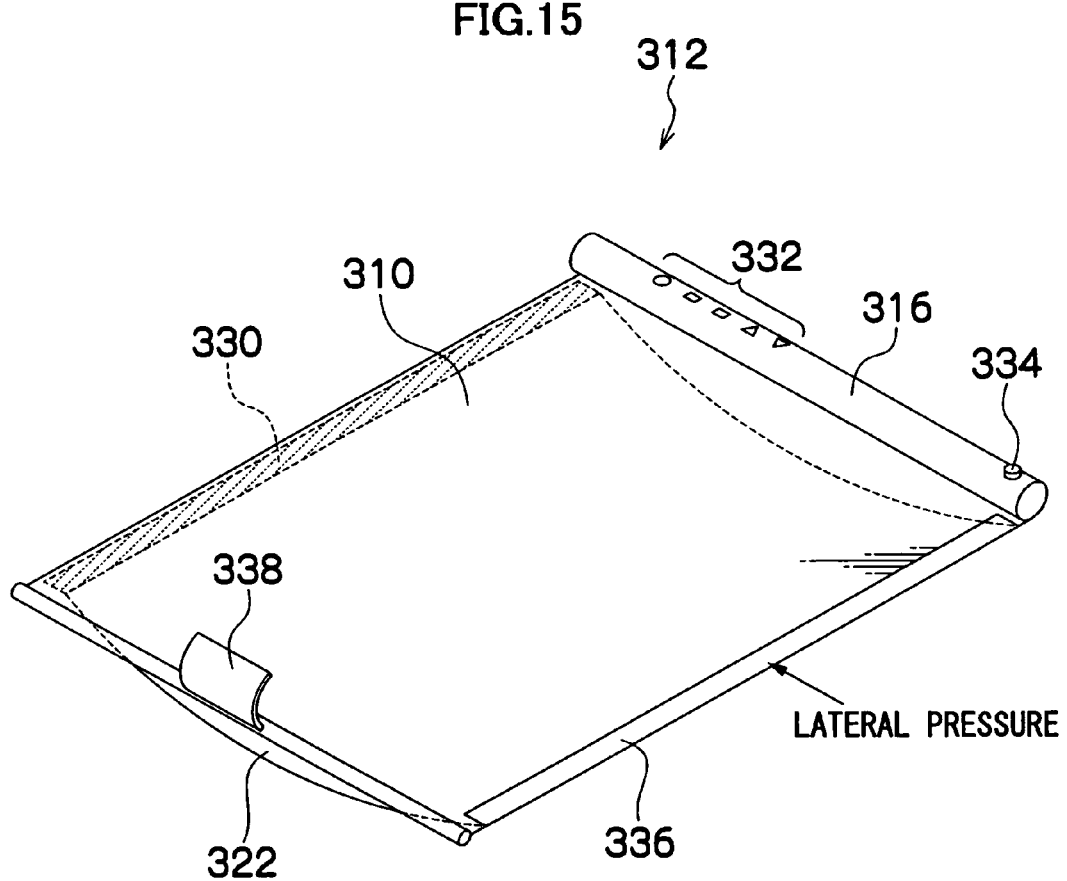
FIG. 15 shows a state in which an operation part is provided on the roll-up shaft of the display device shown in FIG. 14.

FIG. 14 is an outside drawing showing a display device 312 including a flexible display element 310 according to a fourth embodiment. The display element 310 is unrolled. FIG. 15 shows the single unit configuration of the display element 310. In FIG. 15, on the back side of the display element 310, a back plate 322 indicated by broken lines is bonded on a bonding portion 330 shaded by diagonal broken lines. As shown in FIG. 15, a roll-up shaft 316 also acts as a main body having an operation part 332 and a power switch 334.

The back plate 322 to be combined with the display element 310 is substantially V-shaped in its free shape (when an external force is removed). When the back plate 322 is combined with the display element 310, the back plate 322 is extended from the V-shape as shown in FIGS. 14 and 15. At this moment, the back plate 322 is combined while being extended. Thus a folded end 336 on the opposite side from the bonding portion 330 applies a lateral pressure to the display element 310 and the lateral pressure is accepted by the stiffness of the display element 310, so that the flatness of the display element 310 is kept and a force for keeping the flat shape is generated on a part unrolled from the roll-up shaft 316 of FIG. 15. With this configuration, the display element 310 unrolled from the roll-up shaft 316 independently keeps its flatness.

In this state, even when an attempt is made to bend the display element 310, the display element 310 cannot be easily bent because a force of the back plate 322 is applied to keep the flatness. Therefore, the display device 312 can be used by holding the roll-up shaft 316 only with one hand, without holding the display element 310.

The following is an operation of rolling up the display element 310.

Figure 16:
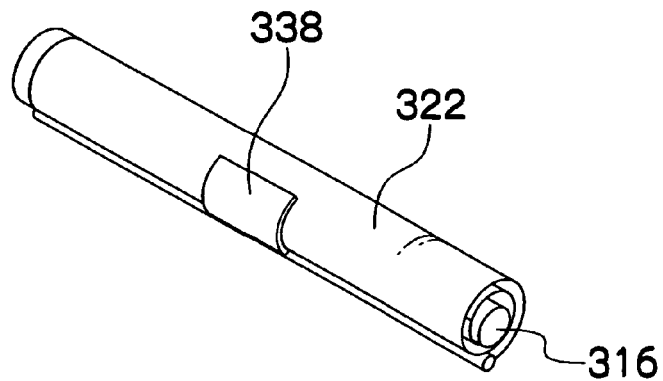
FIG. 16 shows a state in which the display element of FIG. 14 is rolled up around the roll-up shaft.

When the display element 310 is rolled up, rolling is performed from the side of the roll-up shaft 316 (main body) as shown in FIG. 14. Thus the back plate 322 is flattened by the roll-up shaft 316 and the curved shaped is corrected to a flat shape as in the first embodiment. The back plate 322 flattened thus releases the lateral pressure applied to the display element 310 and thus the display element 310 can be bent and smoothly rolled up around the roll-up shaft 316. The display element 310 rolled thus is rolled up around the roll-up shaft 316 as shown in FIG. 16.

As described above, according to the fourth embodiment, the flexible display element 310 is used after being unrolled from the roll-up shaft 316. The display element 310 can keep its flat shape alone and when carried, the display element 310 can be stored while being rolled up around the roll-up shaft 316. Thus the display device 312 can have high portability and operability. Reference numeral 338 denotes a pull for unrolling the display element 310. When the display element 310 is rolled up, the pull 338 acts as a holding portion that is pressed to the arc-shaped back plate 322 to keep the shape of the back plate 322.

Figure 17:
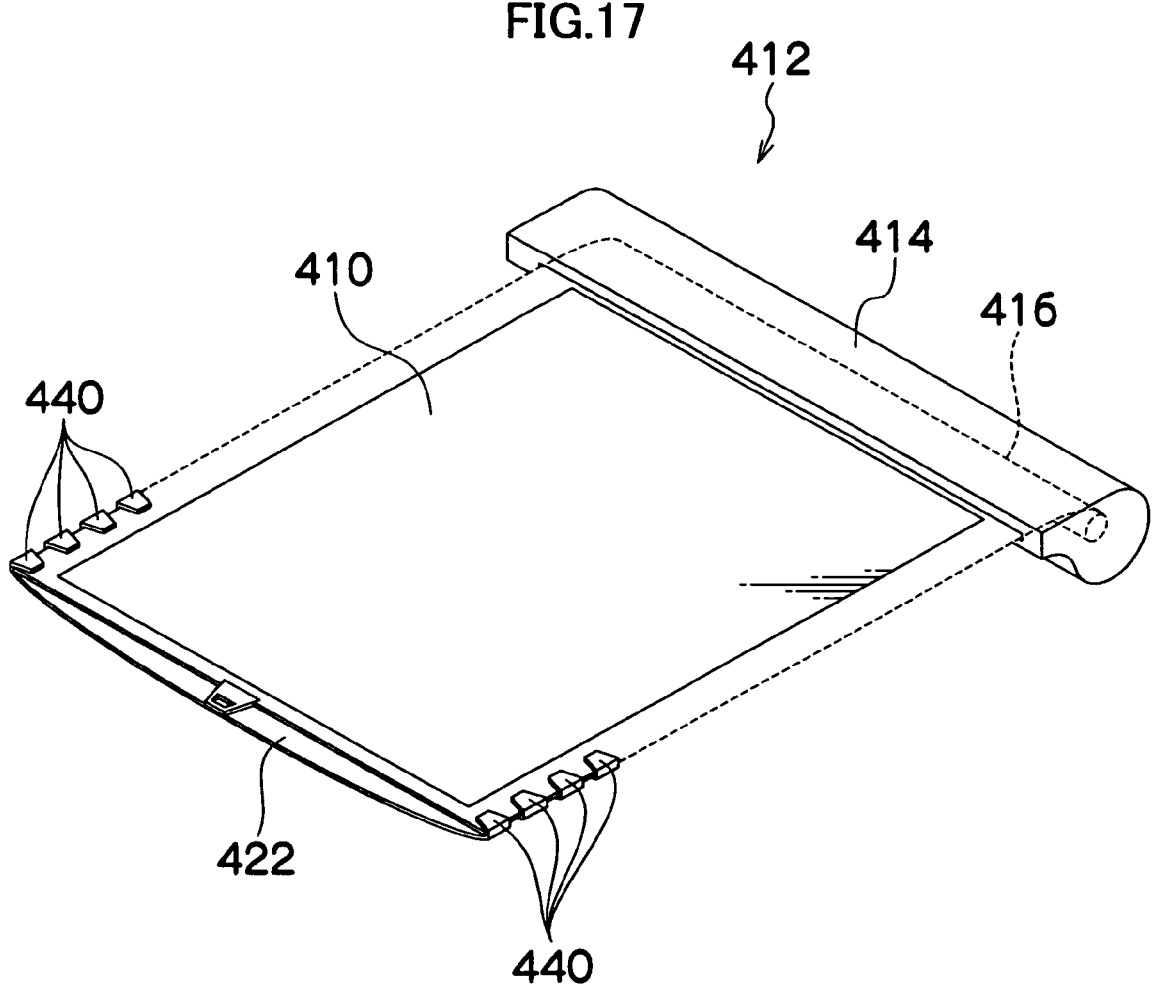
FIG. 17 is an explanatory drawing showing a flexible display element according to a fifth embodiment.
Figure 18:
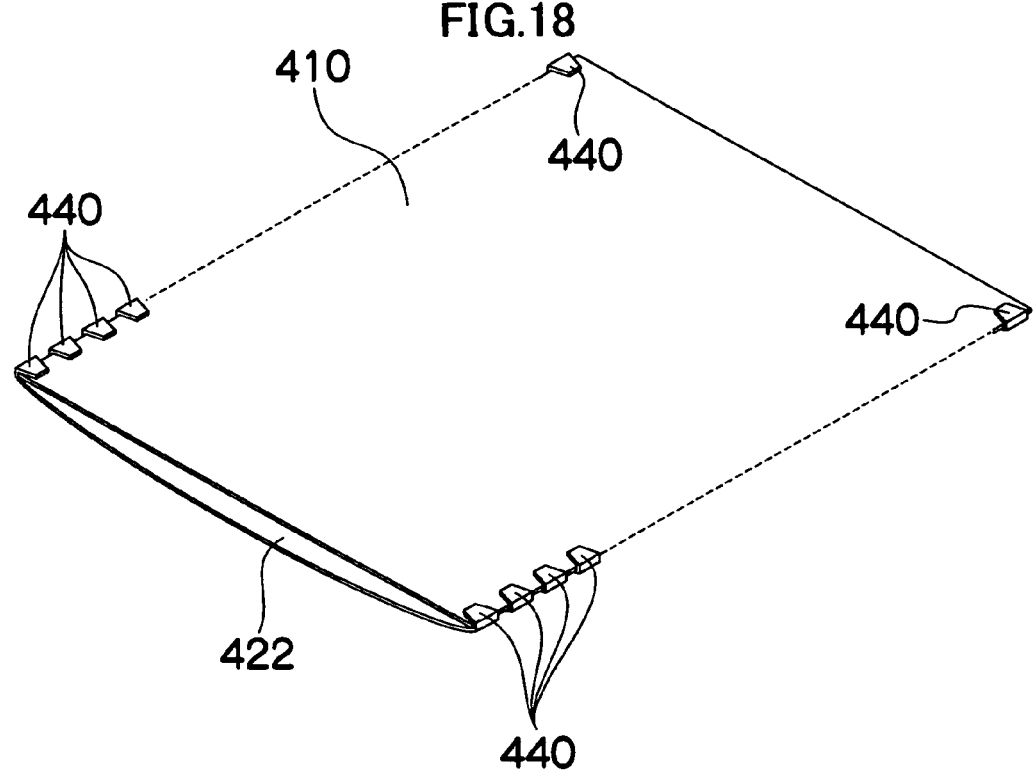
FIG. 18 is a perspective view showing the display element of FIG. 17.
Figure 19:
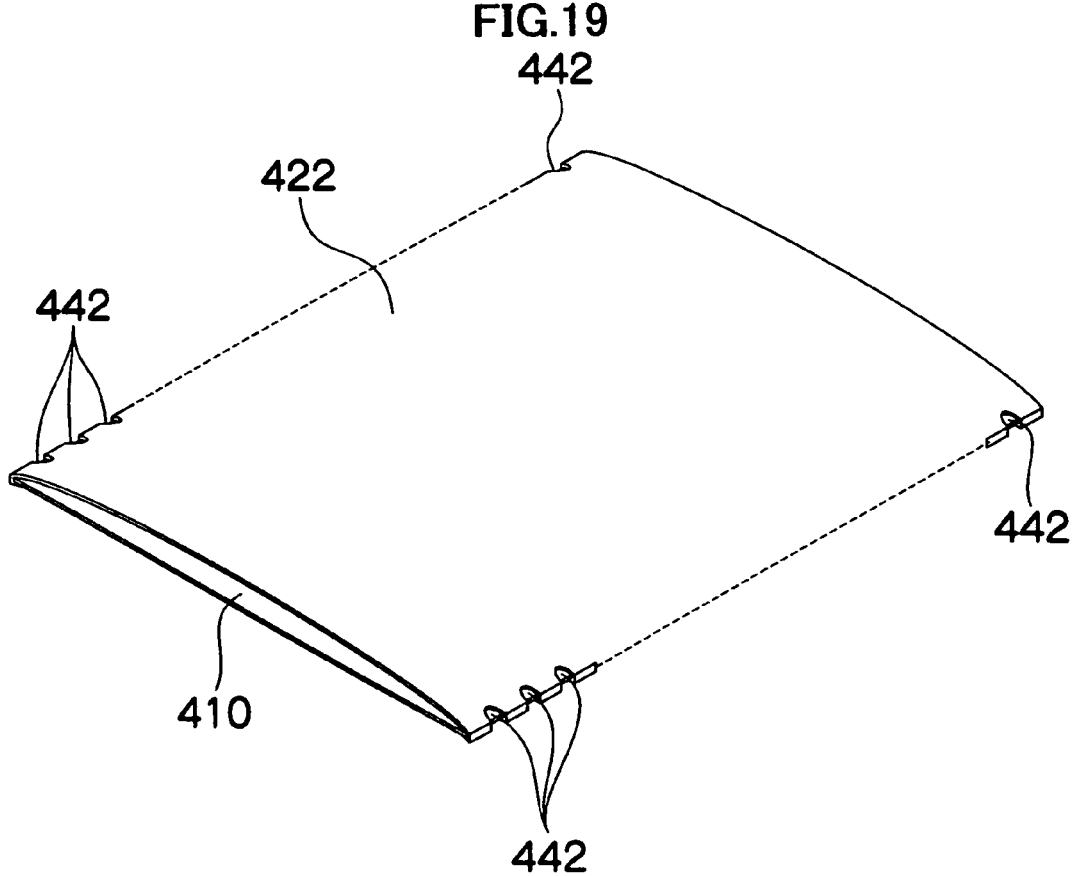
FIG. 19 is a rear view showing the display element of FIG. 18.
Figure 20:
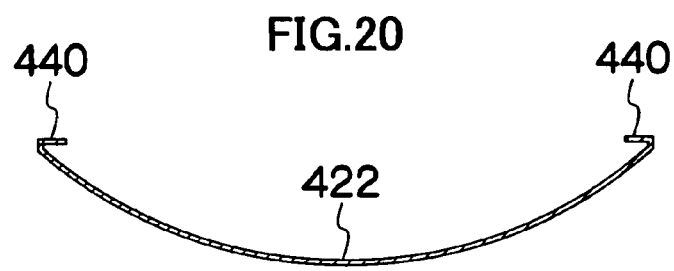
FIG. 20 is a sectional view showing a back plate shown in FIG. 19.

FIG. 17 is an outside drawing showing a display device 412 including a flexible display element 410 according to a fifth embodiment. In FIG. 17, the display element 410 is unrolled (pulled out) from a main body 414. FIG. 18 shows the single unit configuration of the display element 410. FIG. 19 shows the back side of the display element 410. FIG. 20 is a sectional view of a back plate 422. In FIGS. 18 and 19, the display element 410 has a predetermined thickness. The back plate 422 has a plurality of notches 442 formed to prevent convex portions 440 formed on both end portions for applying lateral pressures from causing resistances when the display element 410 is rolled up.

Figure 21:
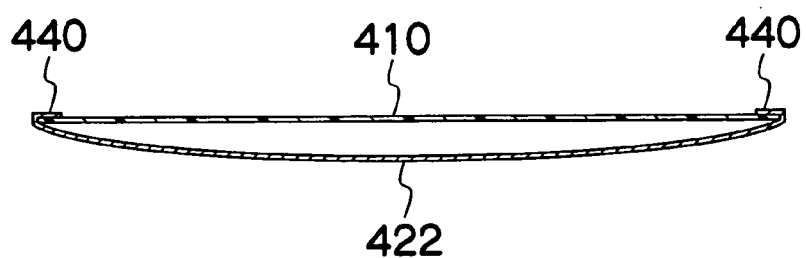
FIG. 21 is a sectional view showing the display element and the back plate of FIG. 18.

In the configuration of the display element 410, it is needless to say that as long as beam members 126 are bonded over the opposite side of a display surface as shown in FIG. 9, it is possible to prevent the display element 410 from being bent even by lateral pressures applied by the back plate 422 as shown in FIG. 21. Moreover, the configuration is not particularly limited as long as the display element 410 is designed to have strength against a bend to be resistant to the lateral pressures of the back plate 422, thus the display element may have a flat shape.

Figure 22:
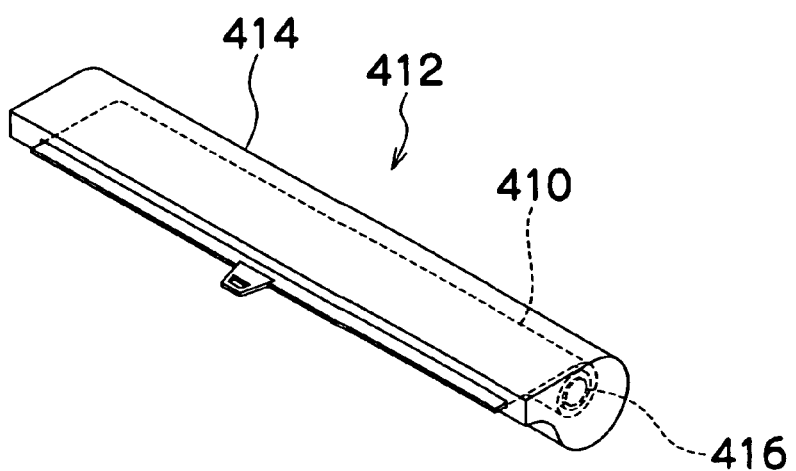
FIG. 22 is a perspective view showing the display device of FIG. 17 in which the display element is stored in the main body of the display device.
Figure 23:
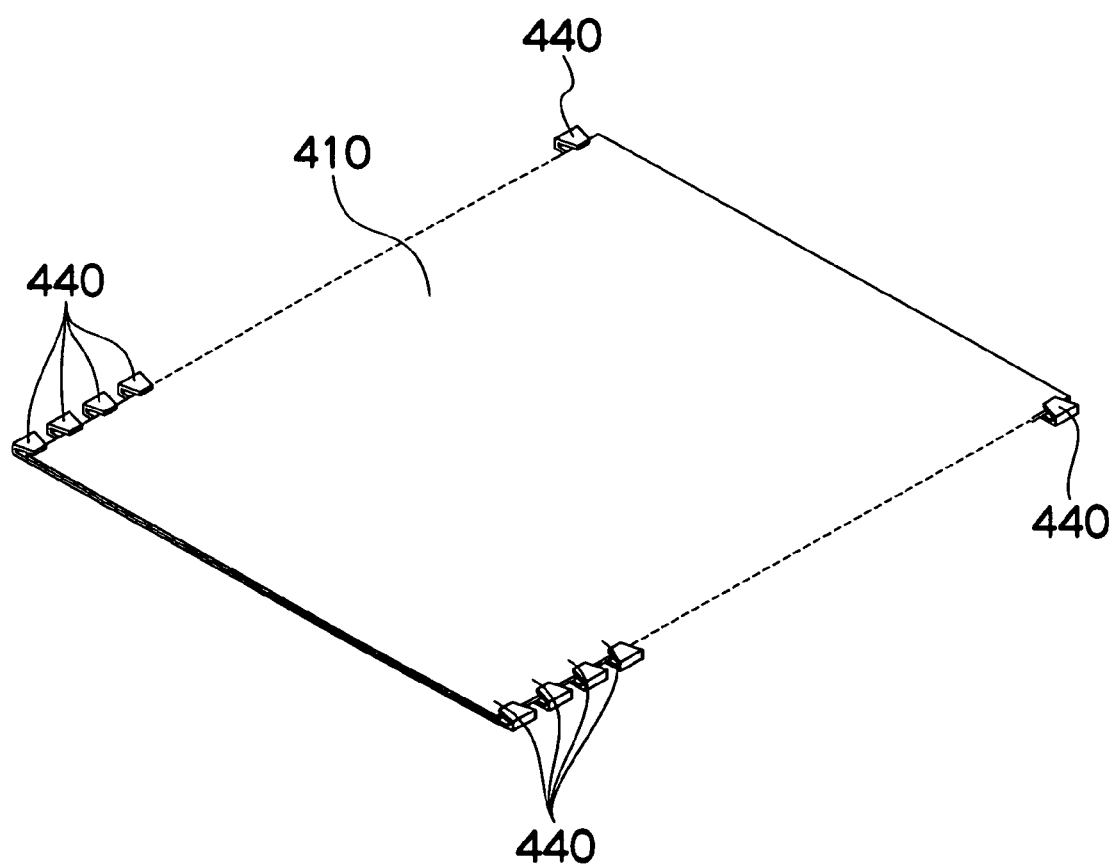
FIG. 23 is a development for explaining that the back plate of FIG. 17 is flattened.
Figure 24:
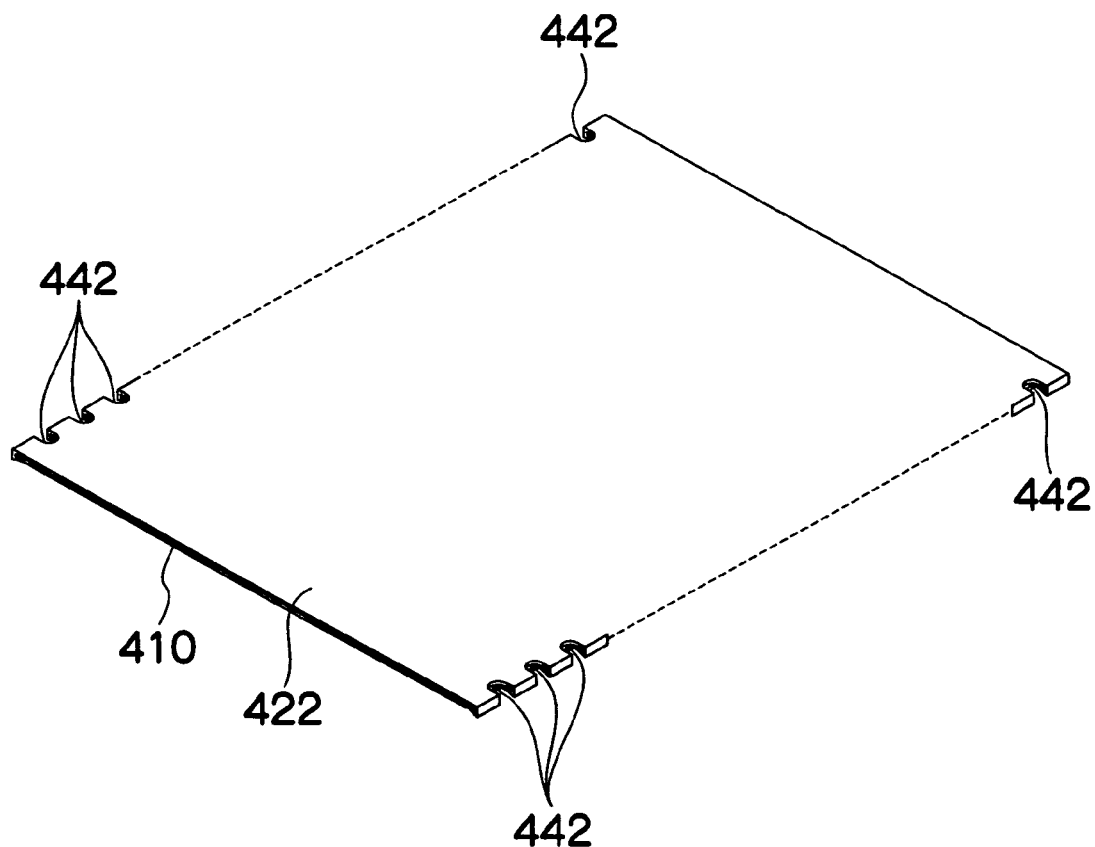
FIG. 24 is a rear view showing the back plate of FIG. 23.

FIG. 22 is an outside drawing showing the display element 410 rolled up around a roll-up shaft 416 of the main body 414. FIGS. 23 and 24 are developments for explaining the state of the display element 410 and the back plate 422 in the main body 414 at this moment. Since the display element 410 is rolled up around the roll-up shaft 416 of the main body 414, the back plate 422 is crushed and flattened. Thus the lateral pressures for keeping the flatness of the display element 410 are not applied to the display element 410.

Figure 25:
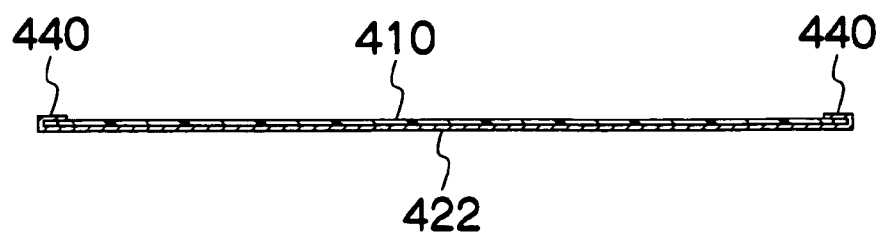
FIG. 25 is a sectional view showing the display element and the back plate of FIG. 24.

The cross-sectional shape at this moment is illustrated in FIG. 25. Since the folded portions 440 of the back plate 422 are separated from both ends of the display element 410, the lateral pressures are released. FIGS. 23 and 24 show virtual shapes. When the display element 410 is unrolled as shown in FIGS. 23 and 24, the back plate 422 is bent and the lateral pressures are applied to the display element 410 (see FIGS. 18 and 19).

Figure 26:
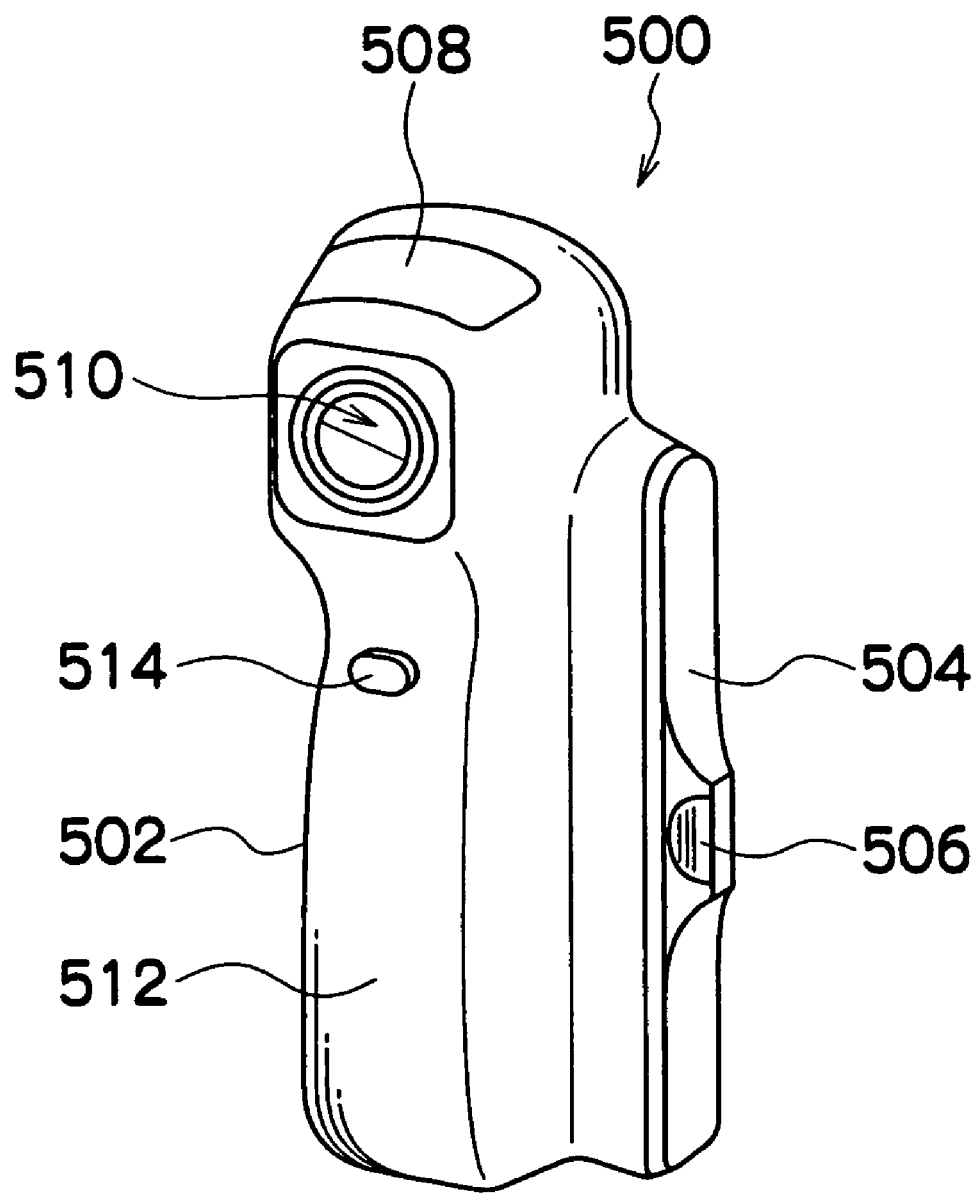
FIG. 26 is a front perspective view in which the same configuration as the display device is applied to an imaging device.
Figure 27:
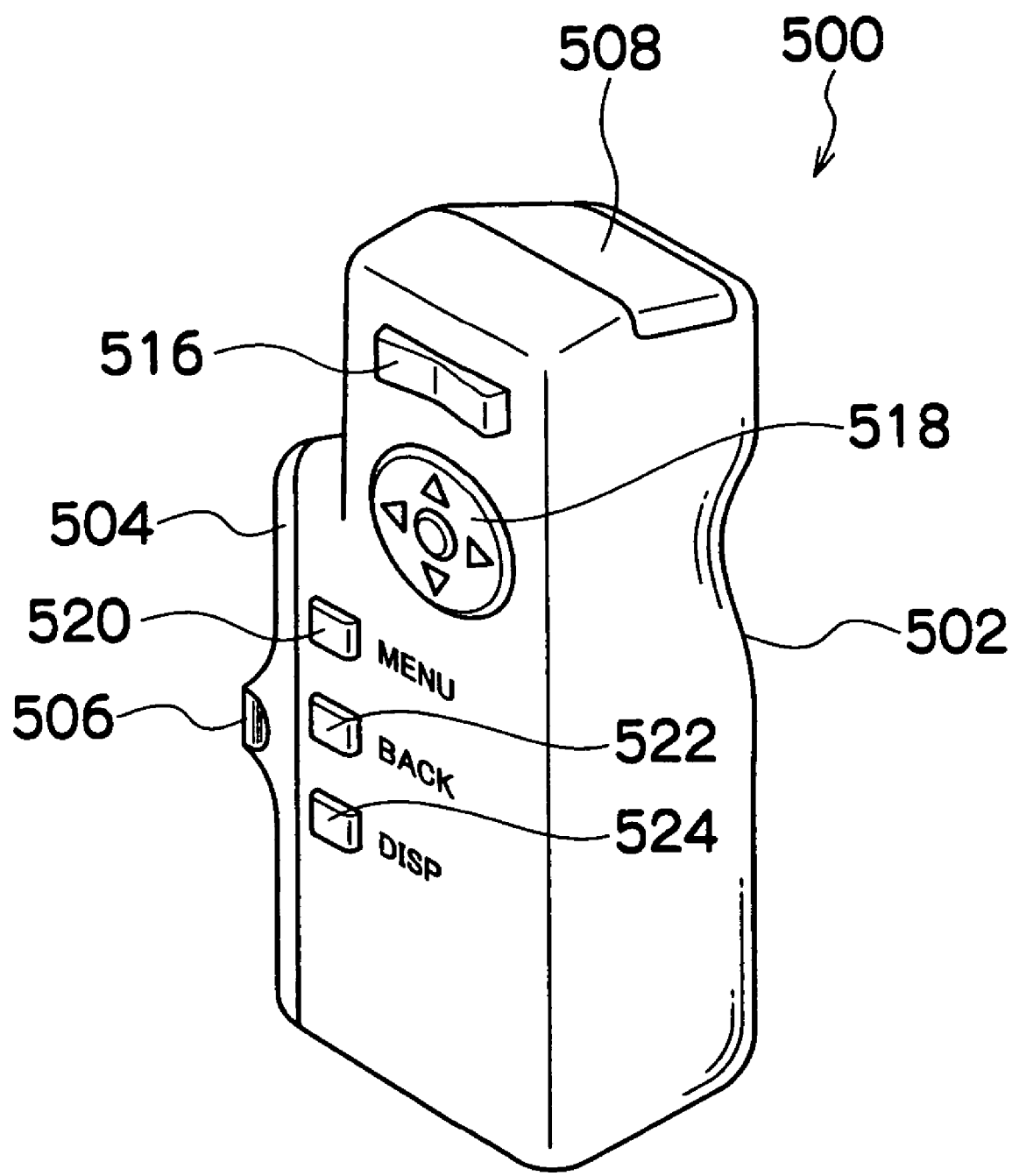
FIG. 27 is a rear perspective view showing the imaging device of FIG. 26.

FIG. 26 is a front perspective view in which the same configuration as the display device of the present invention is applied to an imaging device (digital camera) 500. FIG. 27 is a rear perspective view of the imaging device 500. A main body 502 is substantially shaped like a partially cut square pole. In the rear view, a pull-out slot of the display element is formed on the left (the pull-out slot is closed by a lid 504 fixed on an end of the display element and thus is not shown in FIGS. 26 and 27). The lid 504 has a pull 506 formed to pull out the display element.

A retractable flash 508 capable of protruding and retracting is provided on the top surface of a main body 502, a taking lens 510 is provided at the front of the upper part of the main body 502, a grip 512 is formed under the taking lens 510, and a release button 514 is disposed near the upper end of the grip 512.

Further, a zoom lever 515 is disposed on the upper part of the back of the main body 502, a direction key 518 is disposed under the zoom lever 515, selecting buttons 520, 522 and 524 are provided near the pull-out slot (not shown), and indications showing operations and functions corresponding to these buttons 520 to 524 are engraved beside the buttons.

The buttons 520, 522 and 524 have a plurality of functions. When the display element is pulled out, the names of the functions (e.g., ON and OFF in FIG. 33) are displayed on the display element so as to be close to the buttons. By pressing the selecting buttons 520, 522 and 524 at this moment, the functions displayed on the display element are performed instead of the engraved functions. Although the display element 110 of FIG. 8 is illustrated in the following explanation, the display elements of FIGS. 1 to 25 are all applicable to the imaging device.

Figure 28:
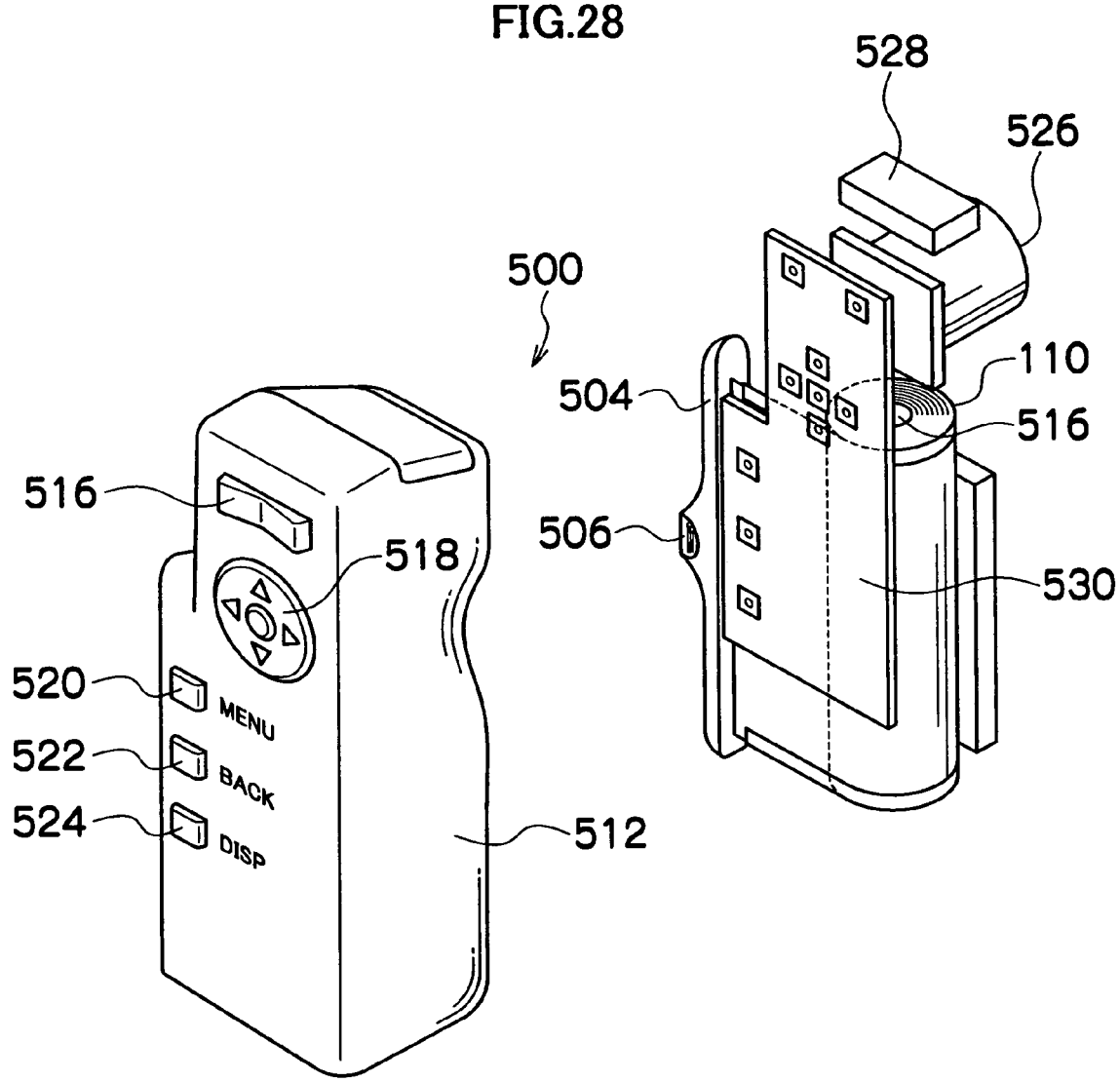
FIG. 28 is a perspective assembly drawing showing the imaging device of FIG. 26.

FIG. 28 is an assembly drawing showing the internal configuration of the imaging device 500. The display element (flexible display) 110 is rolled up around a roll-up shaft 516 disposed in the lower part of the main body 502, and a lens unit 526 is disposed in a space above the roll-up shaft 516. On the lens unit 526, a retractable flash unit 528 is disposed. A main substrate 530 is disposed on the back side of the imaging device and a battery (not shown) is stored in an expanded part at the front of the grip.

Figure 29:
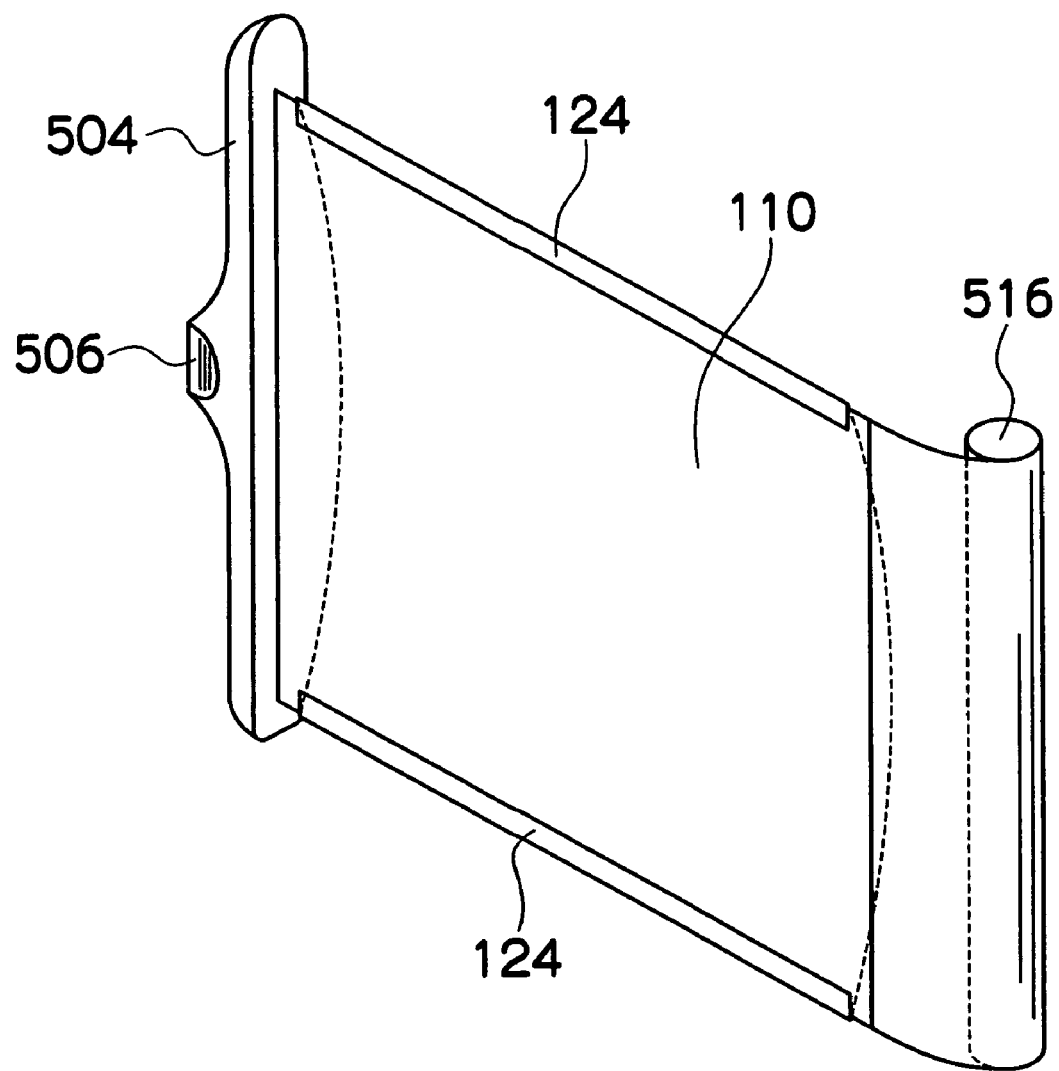
FIG. 29 is a perspective view showing a display element and a back plate which are applied to the imaging device of FIG. 26.
Figure 30:
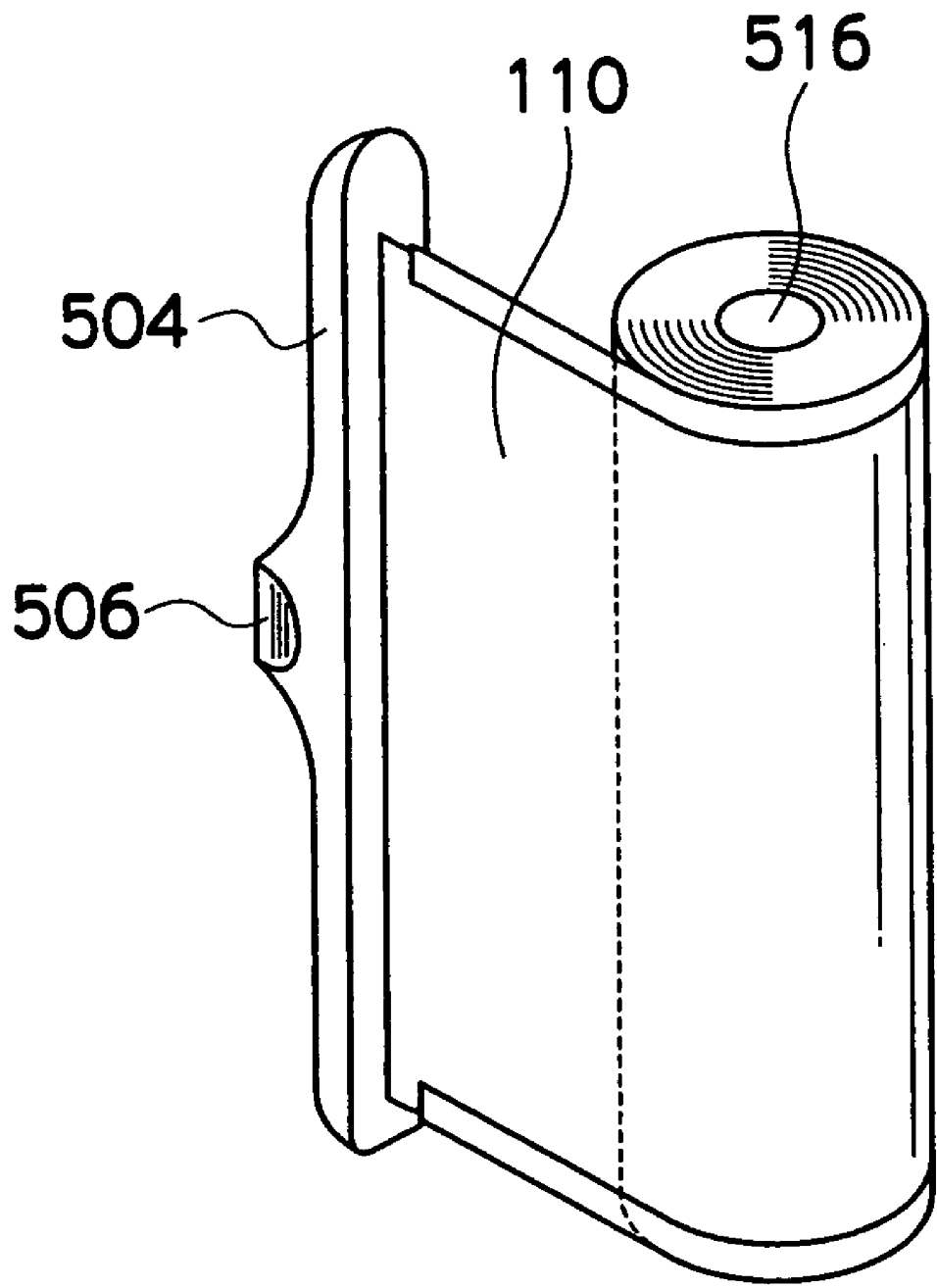
FIG. 30 is a perspective view showing a state in which the display element of FIG. 29 is rolled up around a roll-up shaft.

The rolled flexible display 110 is shaped like a cylinder as shown in FIG. 30. When the flexible display 110 is unrolled as shown in FIG. 29, the flat shape is kept by the actions of lateral pressures applied by the back plate.

Figure 31:
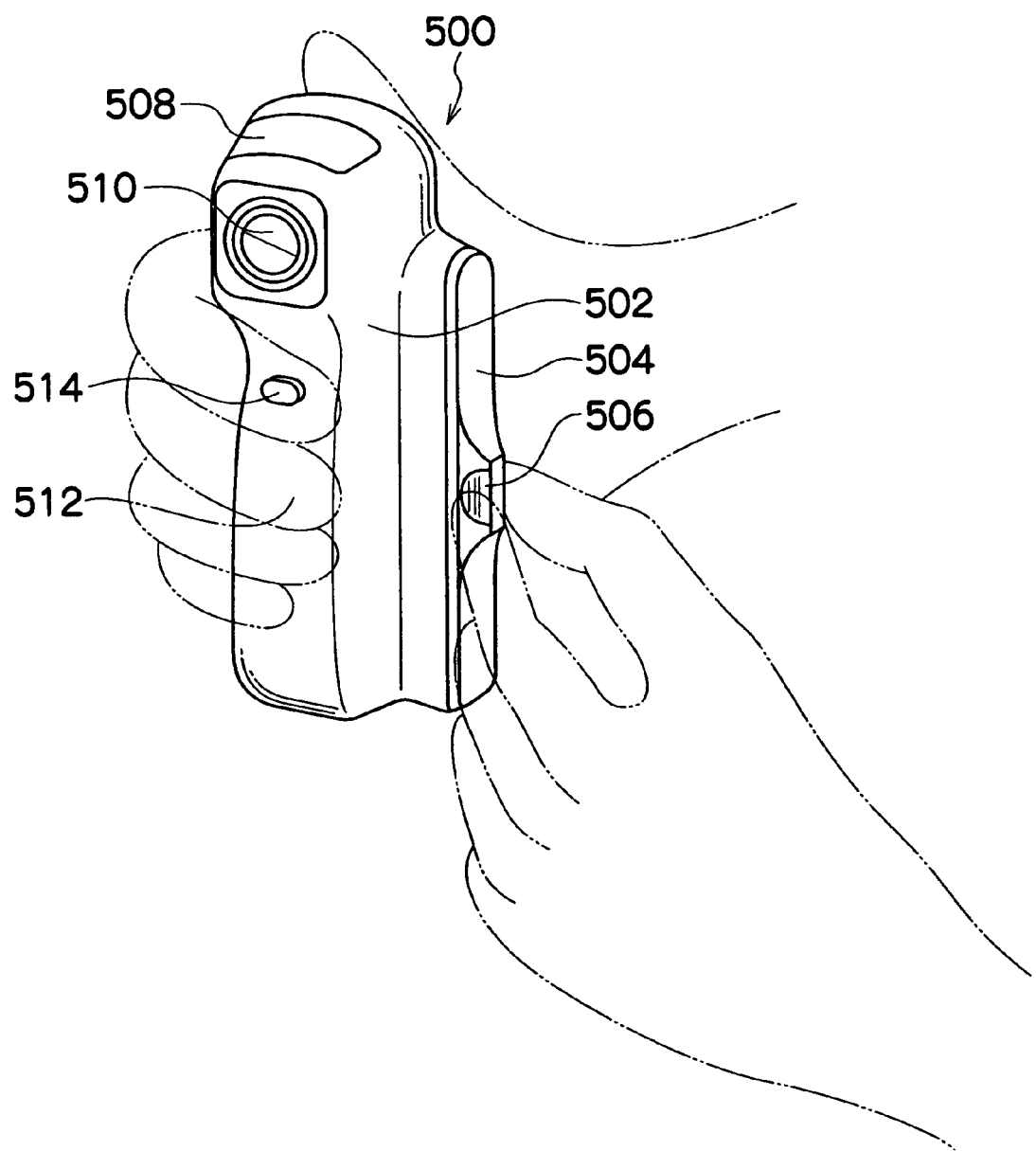
FIG. 31 is an explanatory drawing showing an operation state of the imaging device of FIG. 26.

When the imaging device 500 is used, as shown in FIG. 31, a user holds the pull 506 with the left hand and pulls out the display element 110 while holding the main body 502 with the right hand. The roll-up shaft 516 of the display element 110 is urged in the rolling direction by the roll-up spring 18 shown in FIG. 7. When the display element 110 is unrolled to a predetermined position, the roll-up shaft 516 is locked by a roll-up shaft locking mechanism 531 (see FIG. 35) made up of a known latching/unlatching mechanism, and the imaging device 500 enters a state of FIGS. 32 and 33. In this state, the display element 110 is not rolled back even when the user moves the left hand off the pull 506. When a rolling detecting SW 533 (see FIG. 35) for detecting the rotation of the roll-up shaft 516 detects that the display element 110 has been completely pulled out of the main body 502, power is supplied to an imaging circuit by the action of a rolling detecting circuit 535 (see FIG. 35) of the main substrate 530, and then the taking lens 510 protrudes from a retraction position to a shooting position shown in FIG. 32. Power is supplied thus when the display element 110 is completely pulled out, thereby increasing immediacy for the imaging device 500 applied to a camera.

Figure 32:
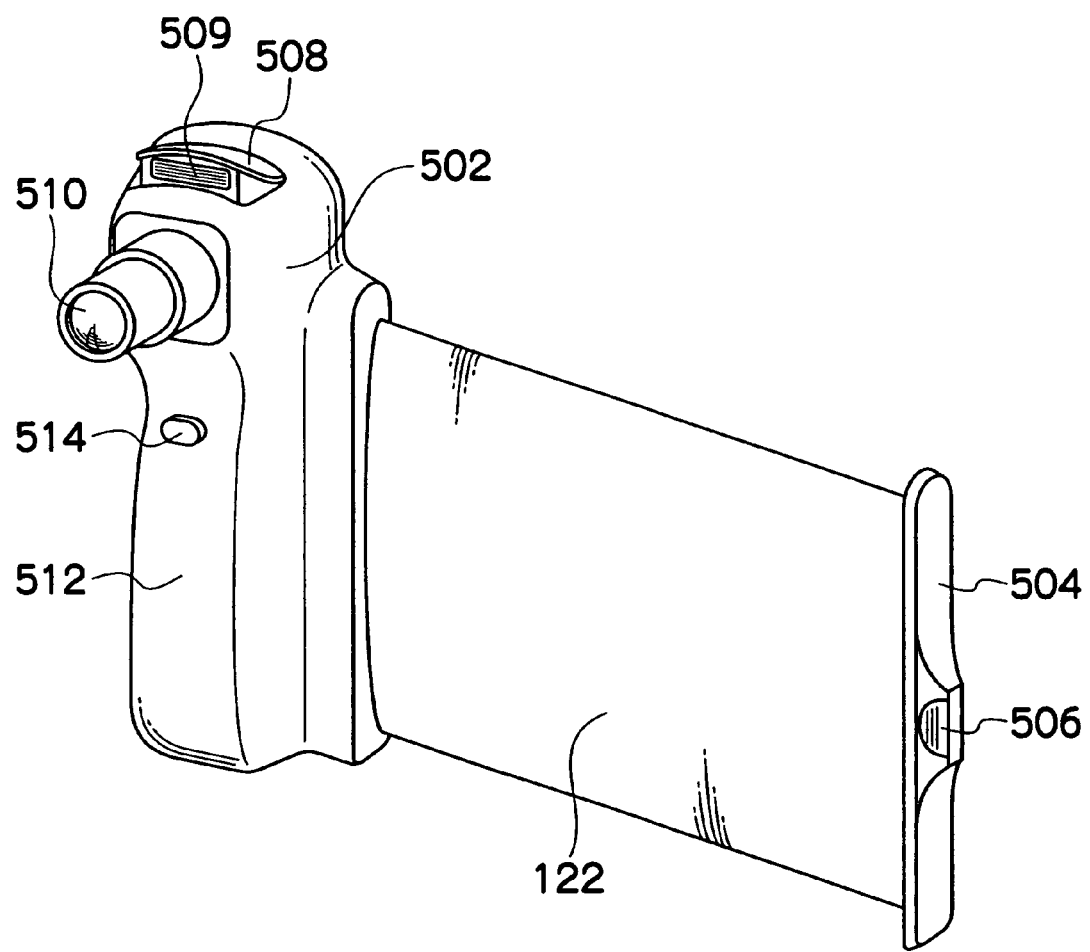
FIG. 32 is an explanatory drawing showing a state in which the display element is pulled out of the main body of the imaging device shown in FIG. 26.
Figure 33:
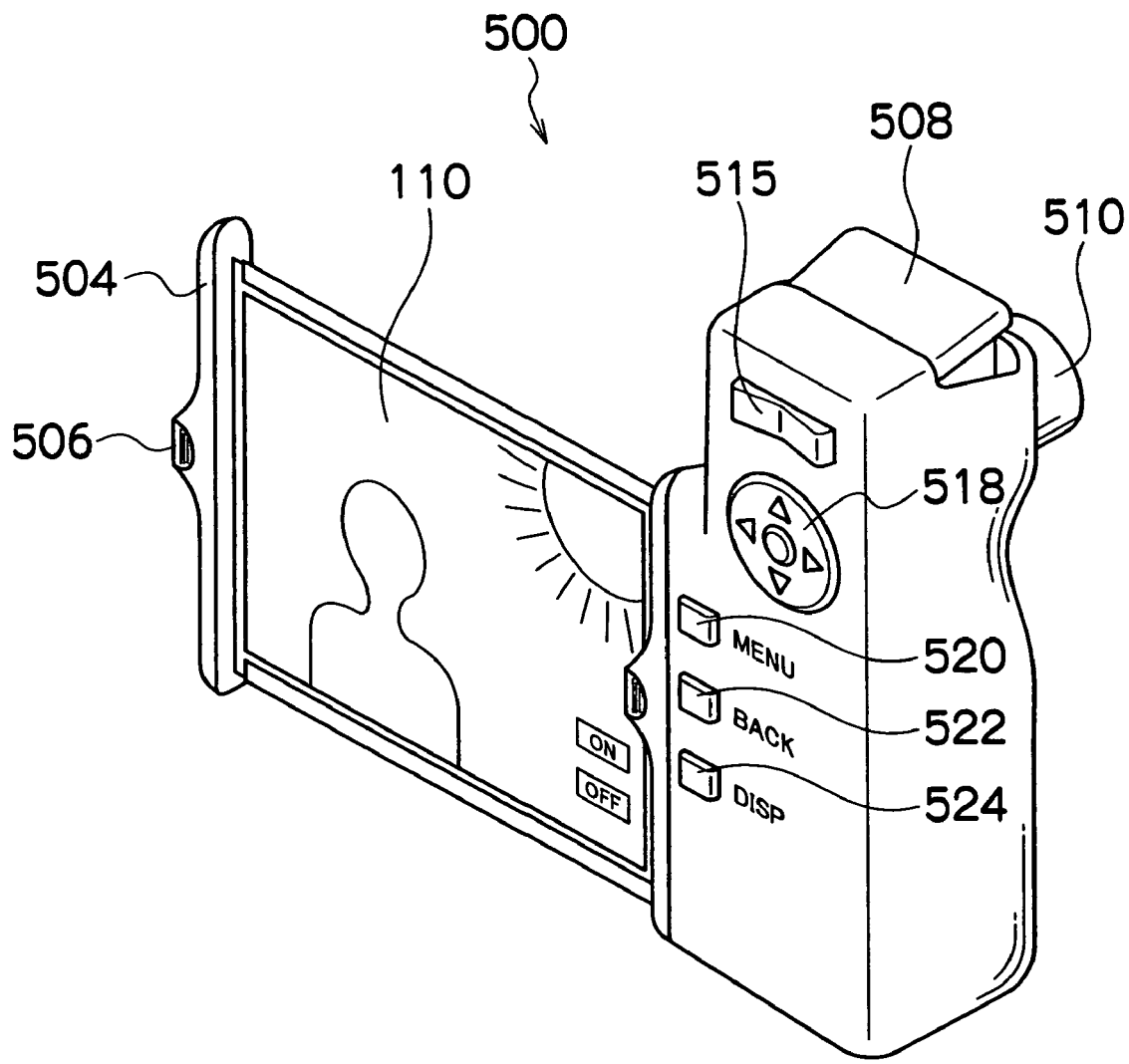
FIG. 33 is a rear perspective view showing the imaging device of FIG. 32.
Figure 34:
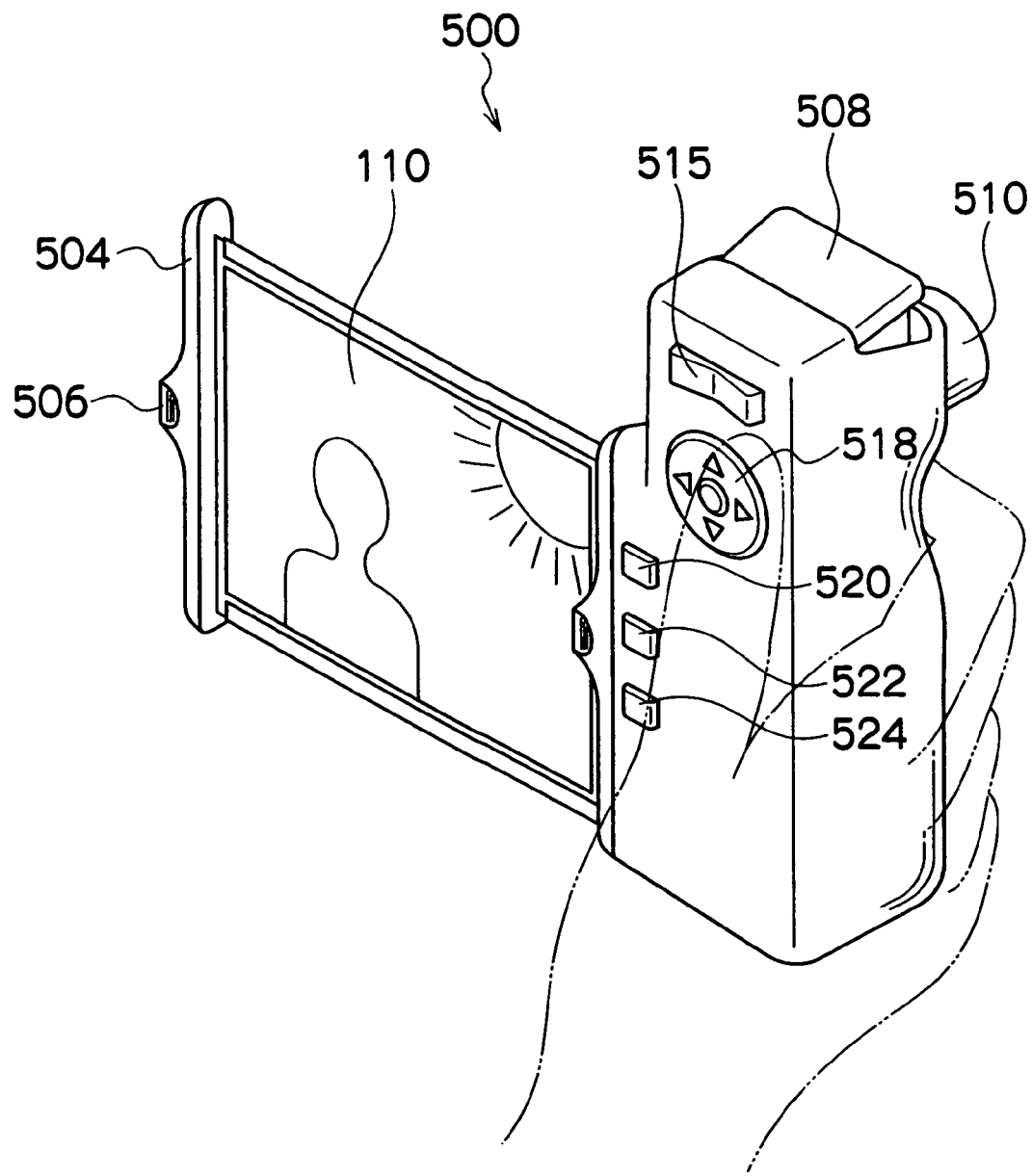
FIG. 34 is an explanatory drawing showing an operation state of the imaging device of FIG. 33.

Further, the retractable flash 508 pops up concurrently with the operation of the taking lens 510 and a light emitting portion 509 is exposed as shown in FIG. 32. Next, when the imaging circuit is activated and a live-view image is outputted, the live-view image of a subject is displayed on the display surface of the display element 110 as shown in FIG. 33, enabling framing and other operations for photo shooting. At this moment, the flat shape of the display element 110 is kept by the back plate 122 and the pull-out slot of the main body 502 restricts the positional relationship relative to the main body 502. Thus the display element 110 can be independently stabilized in a state in which the main body 502 is held with one hand as shown in FIG. 34, and the positional relationship and the flat shape of FIG. 34 can be kept even when an external force is applied. Therefore, the operations of the imaging device, i.e., shooting, reproduction, edition and so on can be performed with one hand having held the main body 502 without holding the display element 110, so that operability improves when the imaging device 500 is applied to a camera.

When the display element 110 is stored in the main body 502, in response to the pull 506 strongly pulled in a pulling direction from the state of FIG. 32, the roll-up shaft 516 having been locked by the roll-up shaft locking mechanism 531 is unlocked and the display element 110 is rolled up around the roll-up shaft 516.

When the rolling detecting switch 533 for detecting the rotation of the roll-up shaft 516 detects that the display element 110 has been completely rolled up around the roll-up shaft 516, the operation of the imaging circuit is stopped by the action of the control circuit of the main substrate 530, the taking lens 510 is moved from the shooting position to the retraction position, the image device enters the state of FIG. 26 (protected by a barrier), and then the power is turned off. Further, the flash 508 is also stored in the main body 502 concurrently with the retracting operation of the taking lens 510. In this way, the power is turned off concurrently with the rolling movement of the display element 110, so that an operation for turning off the power can be omitted and thus the inconvenience can be eliminated. Moreover, portability remarkably increases when the imaging device 500 is applied to a camera.

Figure 35:
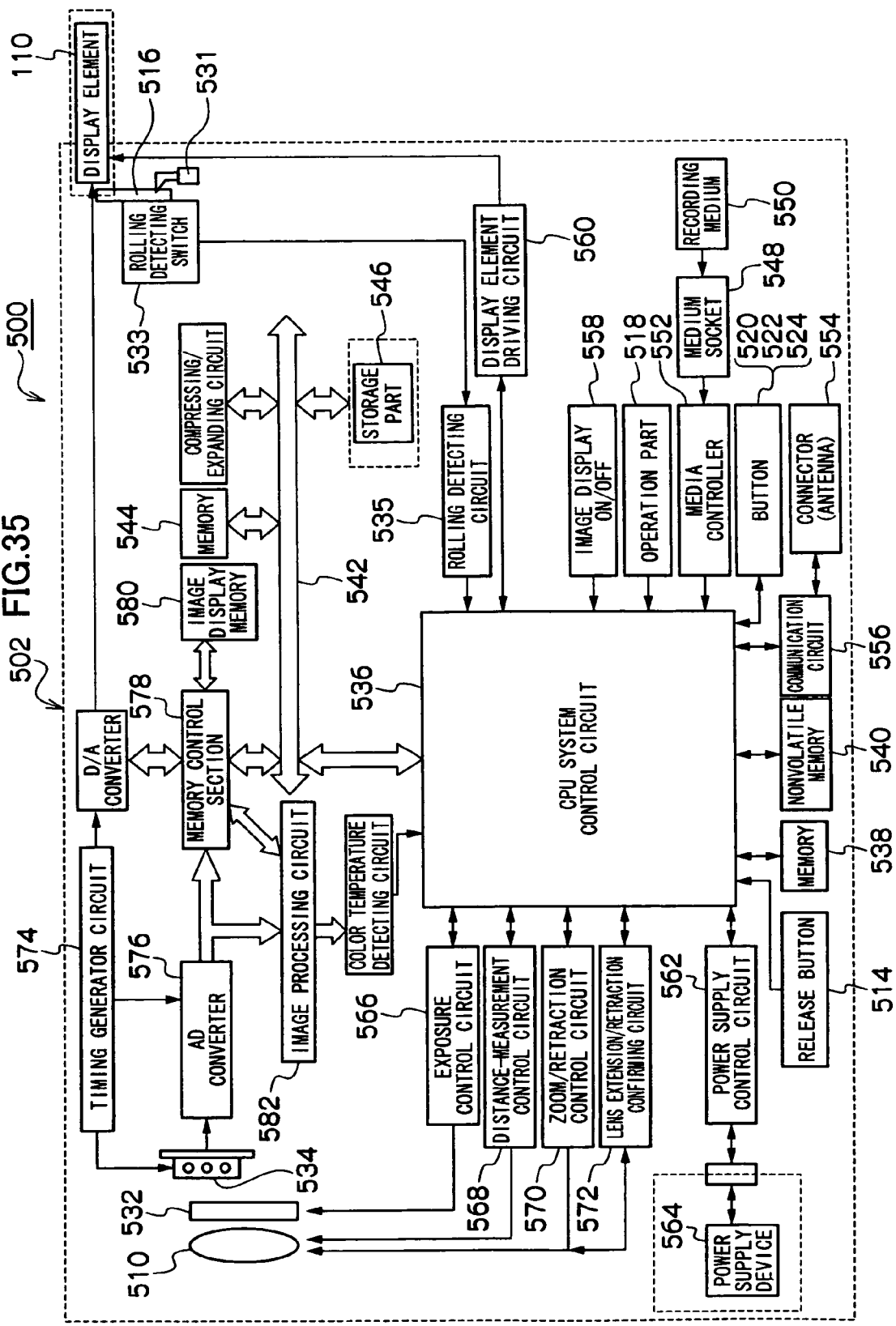
FIG. 35 is a block diagram showing the configuration of the imaging device of FIG. 26.

FIG. 35 is a block diagram showing the configuration of the imaging device 500.

A diaphragm device 532 is disposed behind the taking lens 510 of the imaging device 500, and a CCD 534 is disposed on the image forming position of the taking lens 510. The overall operation of the imaging device 500 is controlled by a CPU 536. The CPU 536 acts as a system controlling circuit which controls a camera system according to a predetermined program and also acts as an arithmetic device which performs various operations such as autoexposure (AE) operation, autofocus (AF) operation, and white balance (WB) adjustment operation.

A program run by the CPU 536, kinds of data required for control, and so on are stored in a ROM 538 connected to the CPU 536. CCD pixel defect information, kinds of constant/information about camera operations, and so on are stored in an EEPROM 540.

A memory 544 connected to the CPU 536 via a bus 542 is used as the expansion area of the program and the arithmetic area of the CPU 536 and also used as a temporary storage area of image data and audio data. A storage part 546 is a temporary memory only for image data.

The release button 514 is an operation button for inputting an instruction to start shooting and is a two-step stroke switch which is made up of an S1 switch turned on by a half press and an S2 switch turned on by a full press.

The display element 110 is driven as an electronic view finder for displaying through images during shooting and is also driven as an image production monitor for displaying still images and moving images during reproduction. Further, the display element 110 is also used as a display screen for a user interface. Menu information and information about selected items and setting contents are displayed on the display element 110 when necessary. Moreover, image data stored in the storage part 546 is reduced and displayed as thumbnail images on the display element 110.

The main body 502 has a medium socket 548 in which a recording medium 550 is loaded. The type of recording medium 550 is not particularly limited. Various media including xD-PictureCard, a semiconductor memory card typified by SmartMedia (trademark), a portable and compact hard disk, a magnetic disk, an optical disk, and a magneto-optical disk can be used.

The media controller 552 performs necessary signal conversion to pass input/output signals suitably for the recording medium 550 loaded in the medium socket 548.

Further, the imaging device 500 includes a communication circuit 556 for connection to a personal computer and other peripheral equipment via a connector or an antenna 554. Reference numeral 558 denotes a switch for turning on/off an image displayed on the display element 110, and reference numeral 560 denotes a display element driving circuit for driving the display element 110. Reference numeral 562 denotes a power supply circuit through which power is supplied to the CPU 536 from a power supply device 564 such as a battery and so on.

The following will discuss the camera function of the imaging device 500.

Zoom control, focus control, and iris control are performed on the taking lens 510 and the diaphragm device 532 by an exposure control circuit 566, a distance-measurement control circuit 568, a zoom/retraction control circuit 570, and a lens extension/retraction confirming circuit 572 which are controlled by the CPU 536.

Light having passed through the taking lens 510 forms an image on the light-receiving surface of the CCD 534. A number of photodiodes (light receiving elements) are arranged in a two-dimensional manner on the light receiving surface of the CCD 534, and primary-color filters of red (R), green (G), and blue (B) are so disposed as to correspond to the photodiodes in a predetermined arrangement. Further, the CCD 534 has an electronic shutter function of controlling the charge storage time (shutter speed) of each photodiode. The CPU 536 controls the charge storage time in the CCD 534 through a timing generator 574. Imaging elements of other types such as a MOS may be used instead of the CCD 534.

A subject image formed on the light receiving surface of the CCD 534 is converted into signal charge by the photodiodes according to an amount of incident light. The signal charge having been accumulated in the photodiodes is read sequentially as voltage signals (image signals) corresponding to the signal charge based on a driving pulse applied from the timing generator 574 in response to an instruction of the CPU 536.

Signals outputted from the CCD 534 are transmitted to an analog processing section, in which RGB signals of each pixel are sampled and held (correlated double sampling) before being amplified. After that, the signals are applied to an AD converter 576. The RGB signals having been converted into digital signals by the AD converter 576 in a dot sequential manner are stored in an image display memory 580 through a memory control section 578.

The RGB signals having been stored in the image display memory 580 are processed by an image processing circuit 582 according to an instruction of the CPU 536. In other words, the image processing circuit 582 acts as an image processing device which includes a synchronization circuit (a processing circuit which interpolates a spatial displacement of a color signal in a color filter arrangement of a single-panel CCD and simultaneously converts the color signal), a white balance correction circuit, a gamma correction circuit, an edge correction circuit, and a luminance/color signal difference generation circuit. The image processing circuit 582 performs predetermined signal processing according to a command from the CPU 536 while using the image display memory 580.

RGB image data inputted to the image processing circuit 582 is converted into a luminance signal and a color difference signal in the image processing circuit 582 and is subjected to predetermined processing such as gamma correction and so on. The image data having been processed in the image processing circuit 582 is stored in the storage part 546.

When a photographed/reproduced image is outputted to the display element 110, the image data is read from the storage part 546 and is transmitted to the display element driving circuit 560 through the bus 542. The display element driving circuit 560 converts the inputted image data into a signal of a predetermined system for display (for example, an NTSC color combined video signal) (NTSC: National Television System Committee) and outputs the signal to the display element 110. Further, a through image during shooting is displayed on the display element 110 from the image processing circuit 582 through the bus 542 and the display element driving circuit 560.

Figure 36:
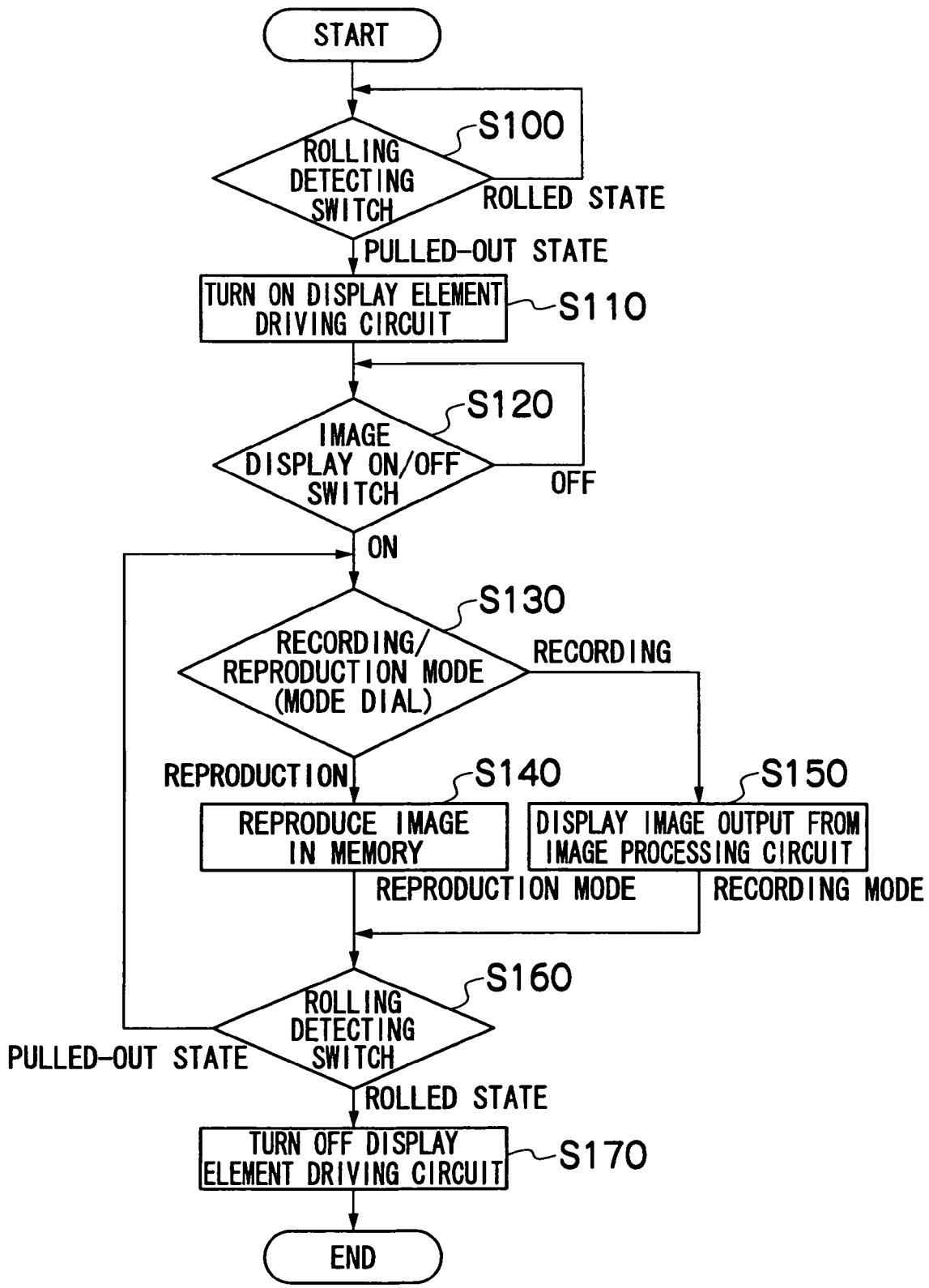
FIG. 36 is a flowchart showing an example of the operating procedure of the imaging device shown in FIG. 26.

FIG. 36 is a flowchart showing the control of a series of operations of the imaging device 500.

When the rolling detecting switch 533 detects that the display element 110 has been completely pulled out (S100), the display element driving circuit 560 is turned on (S110). After that, the image display on/off switch 558 is turned on (S120) and a mode dial (e.g., the selecting buttons 520, 522 and 524) is operated to select reproduction (S130). At this moment, images recorded on the memory 544 and the storage part 546 are read and displayed on the display element 110 (S140). When the mode dial is operated to select recording (S130), an output image from the image processing circuit 582 is displayed on the display element 110 (S150). Thereafter, at the completion of the operation of the imaging device 500, the display element 110 is rolled back into the main body 502. When the rolling detecting switch 533 detects that the display element 110 has been completely rolled up (S160), the display element driving circuit 560 is turned off (S70). The sequence of the imaging device 500 is completed thus.

As described above, when the imaging device 500 is applied to a camera, the configuration of FIG. 34 eliminates the need for supporting the display element 110 with one hand while holding the main body 502 with the other hand, enabling one-hand shooting. A user can freely use the other hand (left hand in the present embodiment) for operations on the screen, the operations of a taking lens, and so on. Thus it is possible to achieve a camera having high operability without causing inconvenience.

Further, as shown in FIG. 31, by holding the main body 502 with one hand and pulling out the display element 110 with the other hand, the imaging device 500 can enter a shooting state. At this moment, the power is turned on and switching to a shooting mode is performed in synchronization with the rolling detecting switch 533, shown in FIG. 35, for detecting rolling and a pulling-out detecting switch (not shown) for detecting the pulling out of the display element 110, so that the imaging device 500 can enter the shooting state without the need for operating the power supply or switching modes. It is therefore possible to achieve a camera enabling excellent snapshots.

Figure 37:
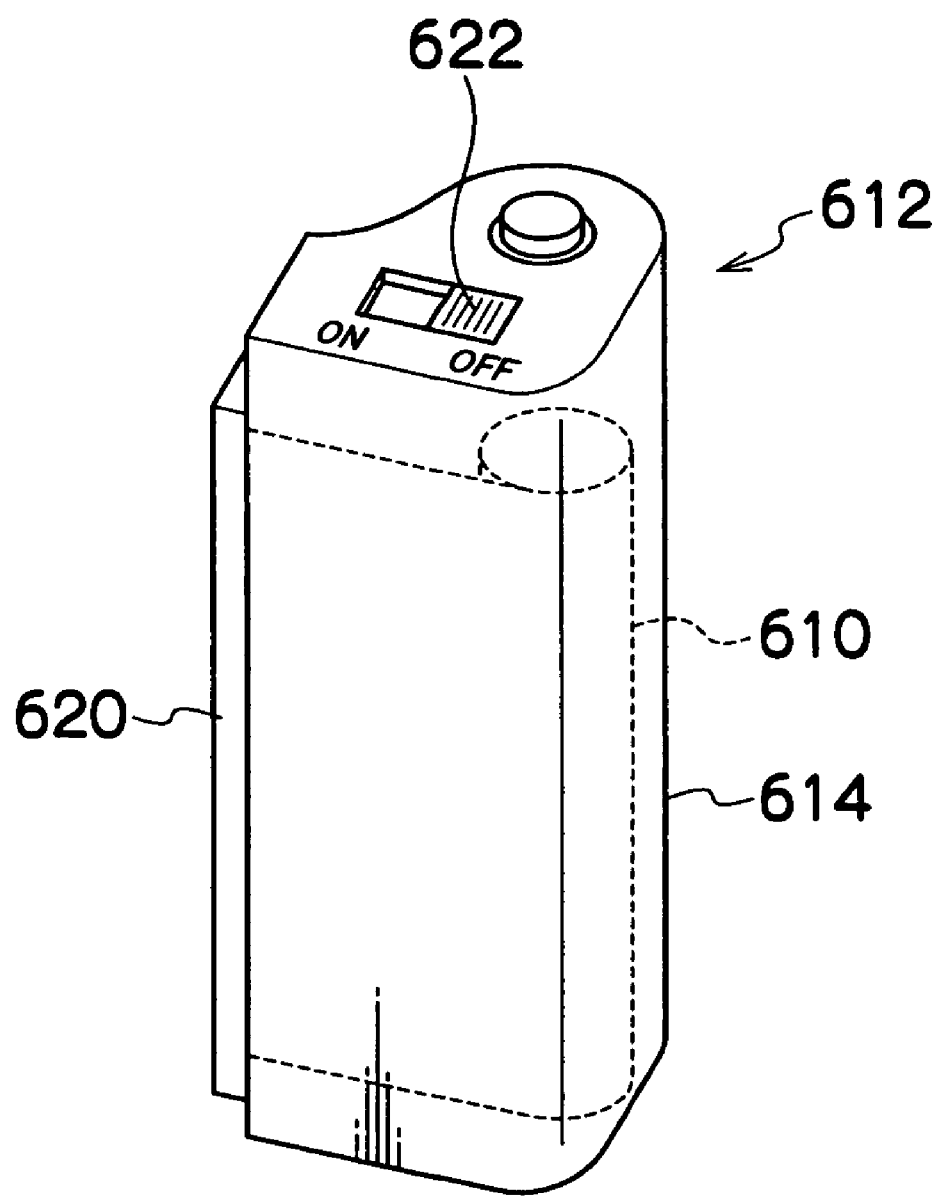
FIG. 37 is an outside drawing showing a display device including a flexible display element according to a sixth embodiment.
Figure 38:
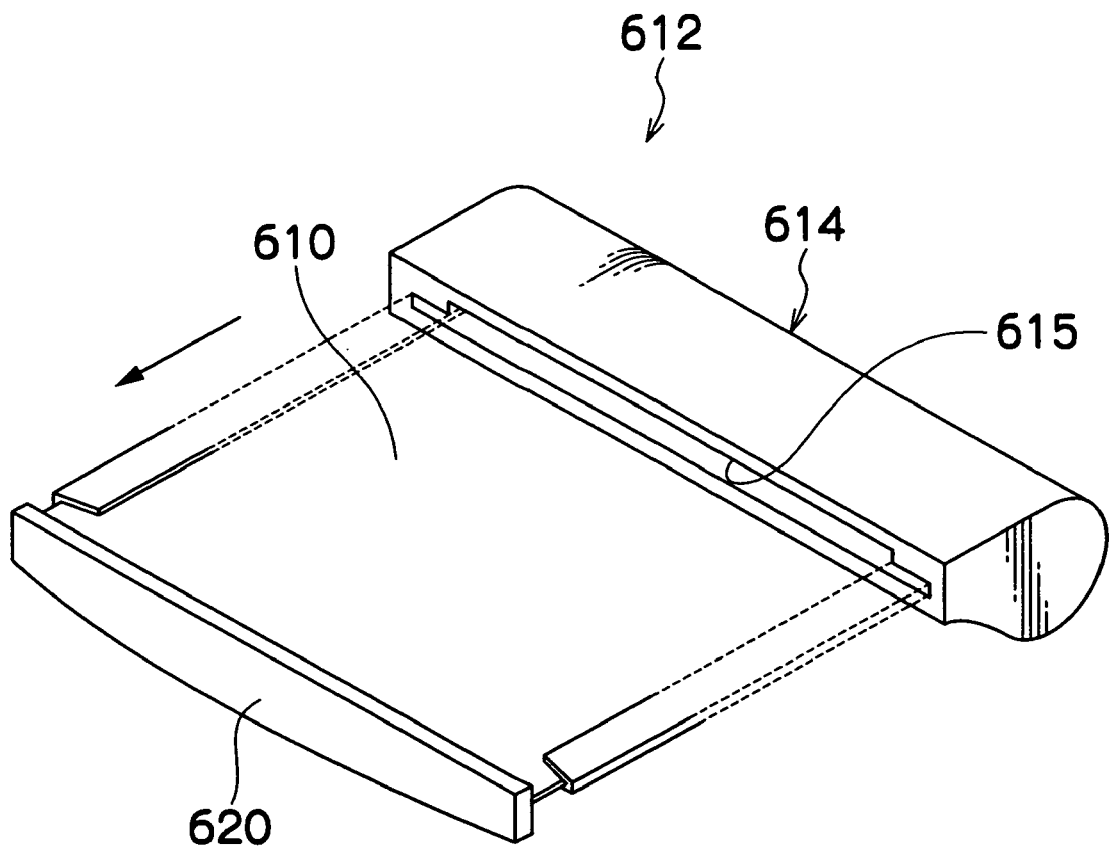
FIG. 38 is an explanatory drawing showing a state in which the display element is pulled out of the main body of the display device shown in FIG. 37.
Figure 39:
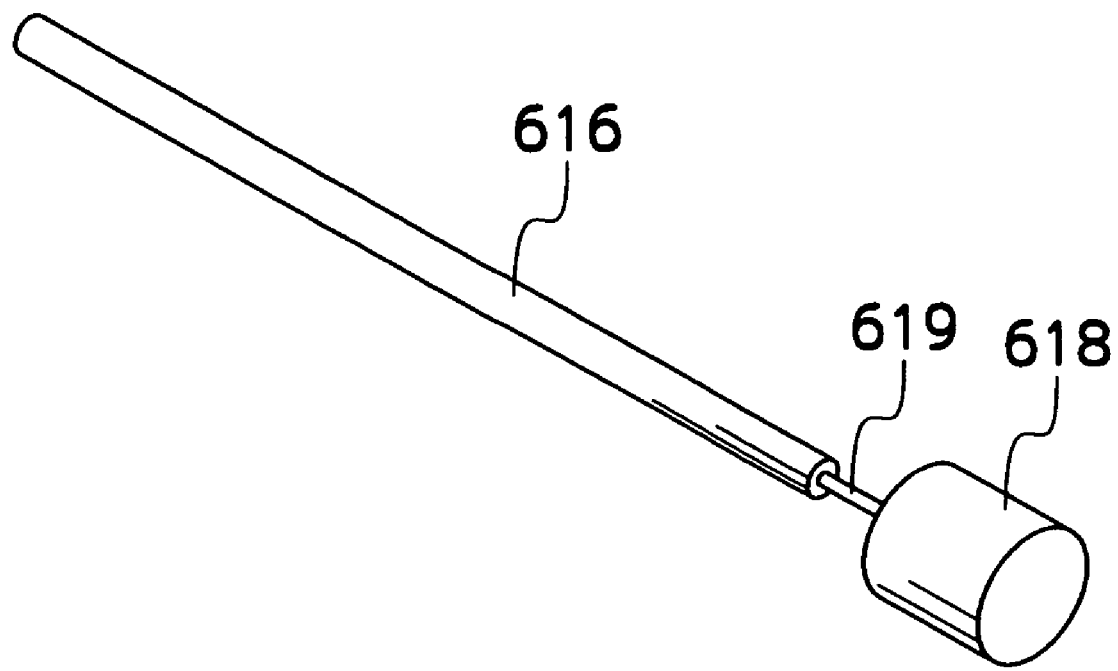
FIG. 39 is an explanatory drawing showing a motor for rolling and unrolling the display element of FIG. 38.

FIG. 37 is an outside drawing showing a display device 612 including a flexible display element 610 according to a sixth embodiment. FIG. 37 shows a state in which a display element 610 is stored in a main body 614, and FIG. 38 shows a state in which the display element 610 is pulled out of the main body 614. The present embodiment illustrates an example of an image player capable of displaying, on the display element 610, image data stored in a built-in memory. FIG. 39 shows the main part of the internal configuration of the image player. A rotating shaft 619 of a motor 618 is connected to a roll-up shaft 616, and the display element 610 is pulled out and rolled up by electricity. Reference numeral 620 is a pull attached to an end of the display element 610 and also acts as a lid for closing a pull-out slot 615 of the main body 614.

Figure 40:
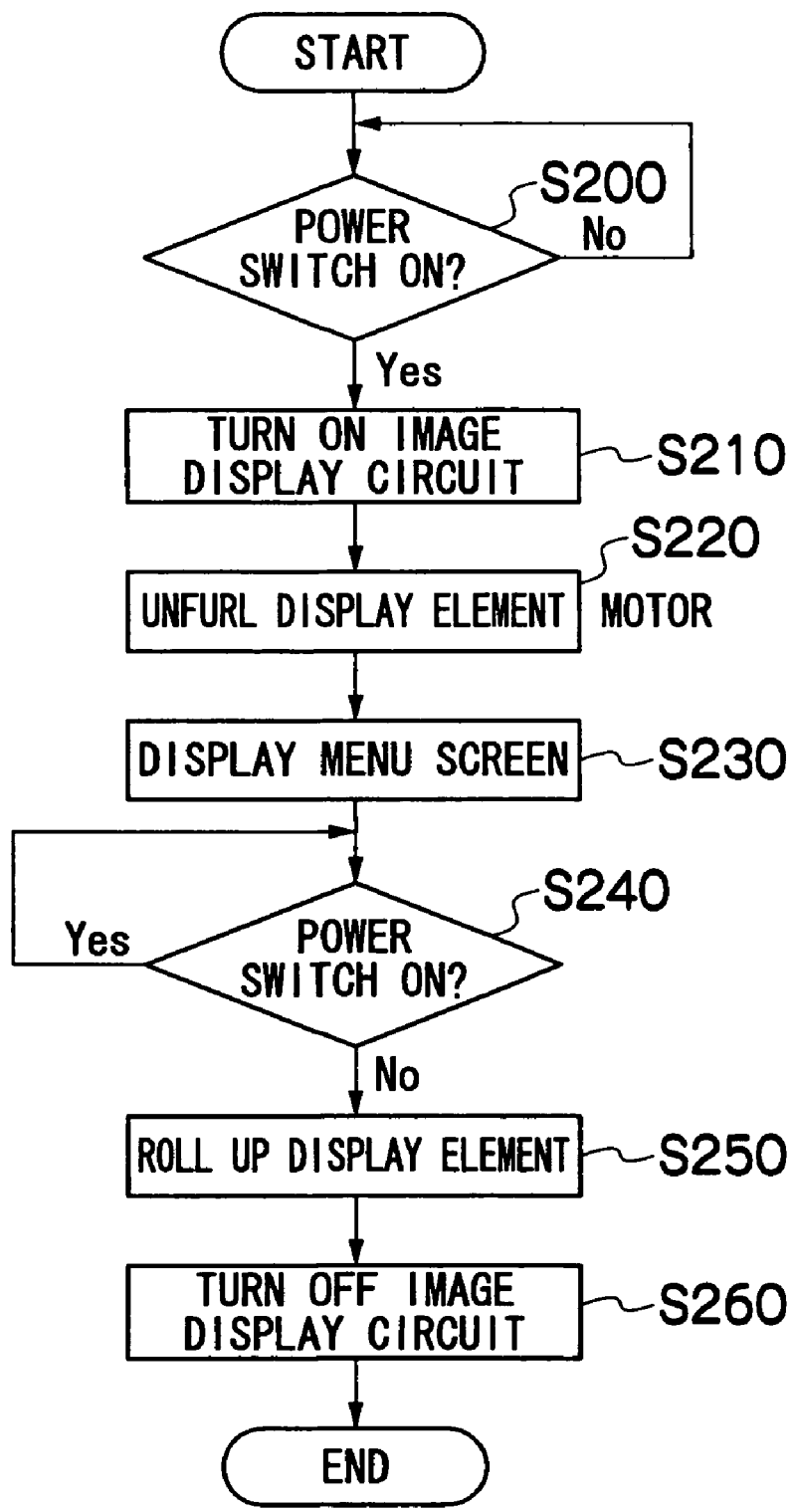
FIG. 40 is a flowchart showing an example of the operating procedure of the display device shown in FIG. 38.
Figure 41:
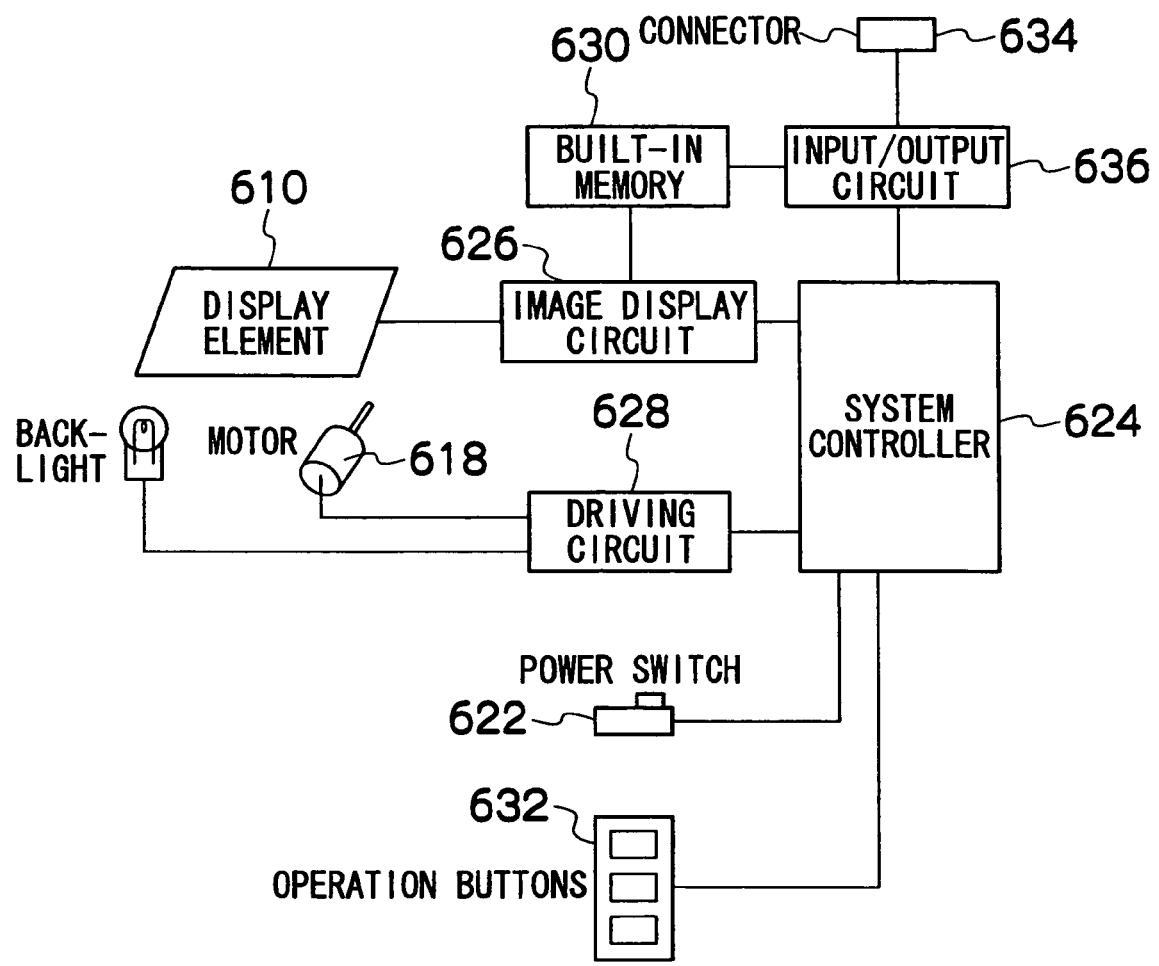
FIG. 41 is a block diagram showing the configuration of the display device of FIG. 38.

A series of operations of the display device 612 will now be described in accordance with the flowchart of FIG. 40 and the block diagram of FIG. 41 showing the image player.

When a power switch 622 is slid to the left (to the left when viewed from the display surface) in FIG. 37 (S200), it is detected that the power switch has been turned on, and an image display circuit 626 is turned on by a system controller 624 (S210). Simultaneously, a driving circuit 628 is controlled to rotate the motor 618 of FIG. 39 in a counterclockwise direction, and the display element 610 extends out along the arrow of FIG. 38 (S220). Thus the display screen can be observed and a menu screen stored in a built-in memory 630 is displayed on the display screen to receive various operations from operation buttons 632 (S230).

Next, when the power switch is turned off (S240), the motor 618 is rotated clockwise by the system controller 624, and the display element 610 is rolled up around the roll-up shaft 616 (S250). Simultaneously, the image display circuit is turned off (S260) and the power switch waits for an input. The sequence is completed thus. In FIG. 41, reference numeral 634 denotes a connector connected to the system controller 624 via an input/output circuit 636. The connector 634 is connected to external communication equipment, so that information is passed between the image player and the external communication equipment.

Figure 42:
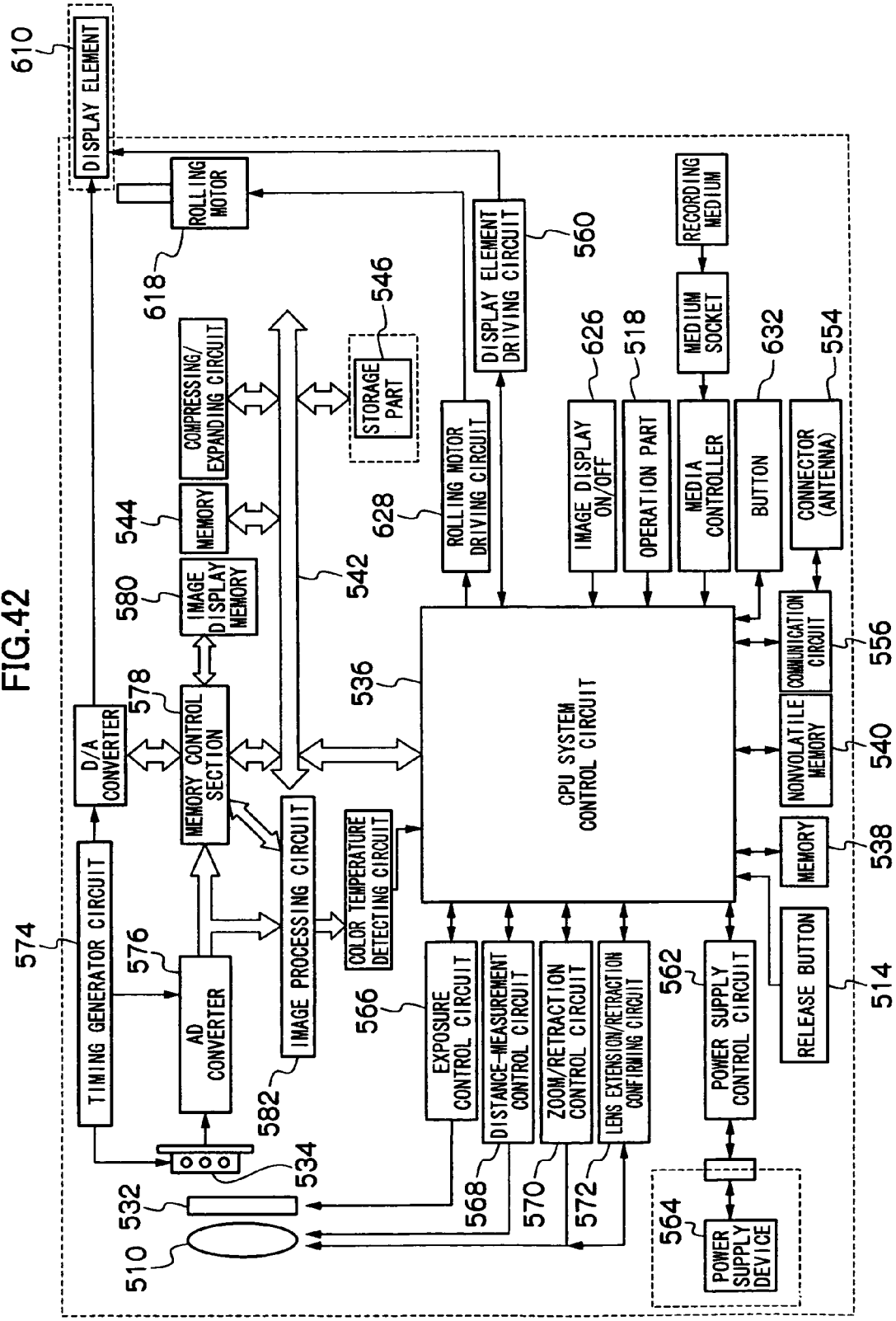
FIG. 42 is a block diagram showing a configuration in which the display device of FIG. 38 is applied to an imaging device.

FIG. 42 is a block diagram showing an imaging device in which the display element 610 is rolled up by the rolling motor 618 by electricity. The configuration of the imaging device is substantially similar to that of the imaging device 500 shown in FIG. 35, except for the motor 618 and the driving circuit 628. Thus the similar parts are indicated by the same reference numerals and the explanation thereof is omitted. Further, the series of operations in reproduction mode conforms to the sequence of FIG. 40.

As shown in FIG. 38, when the display element 610 and a back plate (not shown) are pulled out, the cross-sectional shape of the back plate is restricted by the shape of the pull-out slot 615 at the base of the main body 614.

Figure 43A:
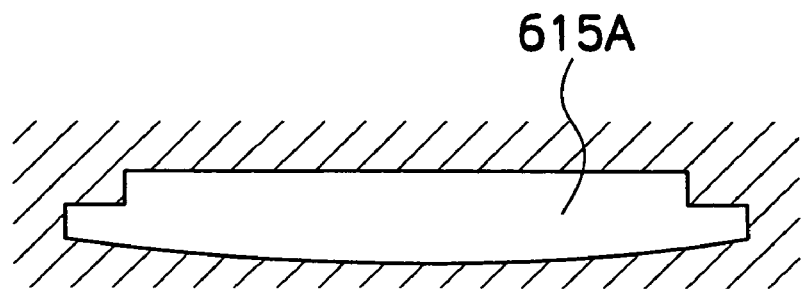
FIGS. 43A to 43D are explanatory drawings showing the shapes of the pull-out slot of the display device shown in FIG. 38.

FIG. 43A shows an example in which a pull-out slot 615A is formed to have a shape which is substantially identical to the cross-sectional shape of the unrolled back plate. The pull-out slot 615A formed thus can strongly keep the flatness of the unrolled display element 610, so that the flatness can be more easily kept. On the front side of the display element 610, only the outer periphery of the display element 610 and the edge of the pull-out slot 615A come into contact with each other and the central portion of the display element 610 does not make contact with the pull-out slot 615A because of a clearance. Thus the display surface is not rubbed and scratches can be prevented.

Figure 43B:
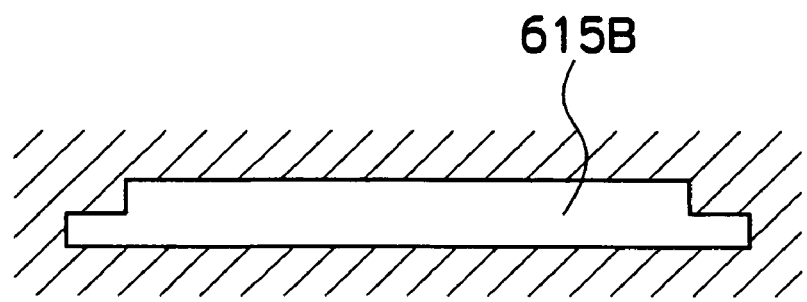

FIG. 43B shows an example in which a pull-out slot 615B is formed to have a shape which is flatter than the cross-sectional shape of the unrolled back plate in some small measure. Although the pull-out slot 615B formed thus keeps the flatness of the unrolled display element 610 less than the pull-out slot 615A of FIG. 43A, a resistance upon rolling is low, so that the display element 610 can be easily stored.

Figure 43C:
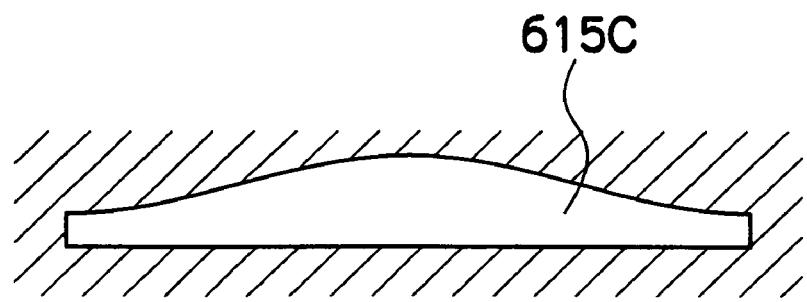

FIG. 43C shows an example in which a pull-out slot 615C is formed to have a shape which is further flatter than the cross-sectional shape of the unrolled back plate. The pull-out slot 615C formed thus reduces a force required for storing the display element 610, so that the display element 610 can be frequently pulled out and stored with high operability. On the front side of the display element 610, FIG. 43C is similar to FIG. 43A in that only the outer periphery of the display element 610 and the edge of the pull-out slot 615C come into contact with each other. However, since the clearance increases toward the central portion, the display surface is not rubbed and scratches can be prevented even when the display element 610 is somewhat bent.

Figure 43D:
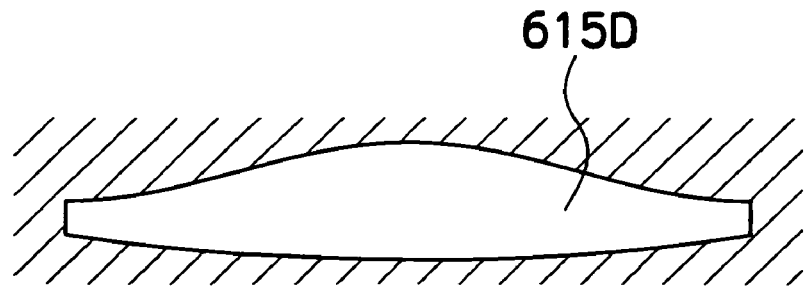

FIG. 43D shows a pull-out slot 615D formed by combining the restricted back plate shape of FIG. 43A with the shape having the clearance of FIG. 43C.

Since the back plate and the edge of the display element 610 are held through the pull-out slot 615D, the base of the display element 610 is positioned relative to the main body 614 and the display element 610 keeps its protruding shape in a certain direction while keeping its flatness as shown in FIG. 34. With this configuration, without the need for holding the display element 610, the display device 612 can be used as a display device or an imaging device by holding the main body 614 with one hand.

Figure 44:
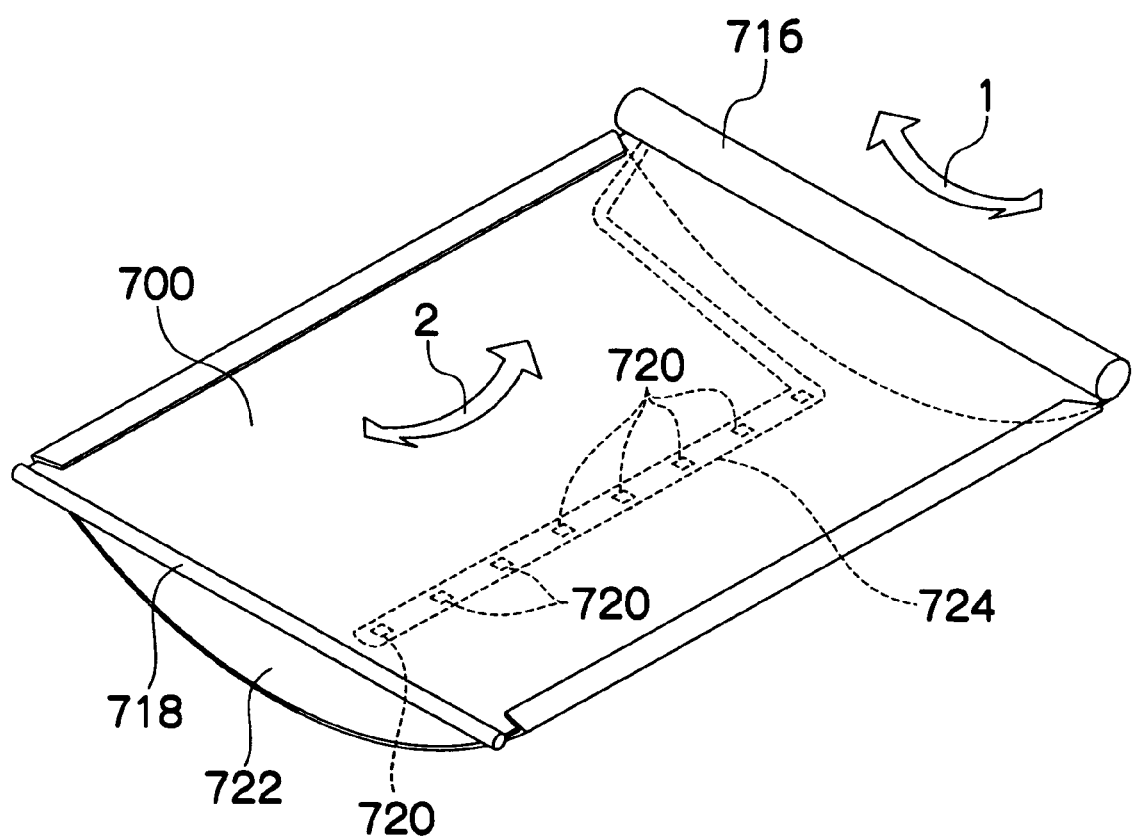
FIG. 44 is a perspective view of a display element including a back plate having backlights.

FIG. 44 is an outside drawing showing a display element and a back plate which are applied to the display devices of FIGS. 1, 8 and 15 and the imaging device of FIG. 26.

Figure 45A:
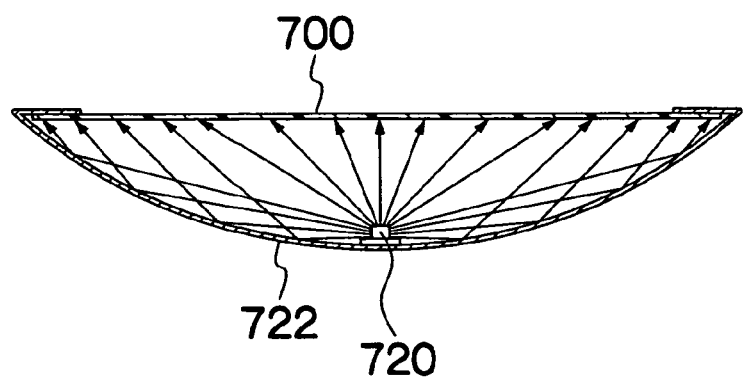
FIGS. 45A and 45B are sectional views showing the display element of FIG. 44.
Figure 45B:
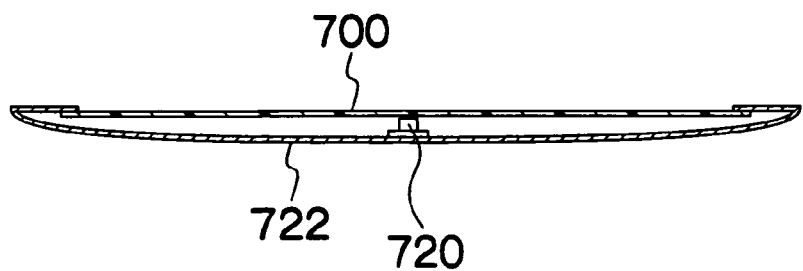

As shown in FIG. 44, the display device of the present embodiment includes a flat display element 700 and a back plate 722 that is attached to the back side of the display element 700 and has a curved shape in cross section. The display element 700 has one end connected to a roll-up shaft 716 and the other end connected to a rod 718, and thus the display element 700 is hardly bent by a force curving in the direction of an arrow 1 (or in the opposite direction). On the other hand, the display element 700 is easily bent by a force curving in the direction of an arrow 2 (or in the opposite direction), and thus the display element 700 can be rolled up around the roll-up shaft 716 and stored. The back plate 722 is curved and has a cross-sectional shape of FIG. 45A when unfurled. In this case, a clearance is generated between the display element 700 and the back plate 722 and increases toward the center. The display element 700 is a flexible LCD. Since transmitted light is necessary for viewing displayed images, as shown in FIG. 44, a plurality of LEDs 720 for backlighting are arranged around the center of the back plate 722 to transmit light at a distance from the back side of the display element 700. A flexible printed board (flexible printed board for backlighting) 724 having the LEDs 720 is bonded to the back plate 722 and has one end connected to a backlight driving circuit 726 of FIG. 46 (not shown in FIG. 44) through the end of the back plate 722. The light beams of the LEDs 720 are radially emitted as shown in FIG. 45A. The back plate 722 has a reflective surface on which light beams emitted in respective directions are reflected to the display element 700 as shown in FIG. 45A. Thus the LEDs 720 can be used as backlights. After rolled up, the display element 700 and the back plate 722 have a cross-sectional shape shown in FIG. 45B. Since the back plate 722 substantially becomes flat in cross section, the display element 700 and the back plate 722 can be rolled up and stored in a small space.

Figure 46:
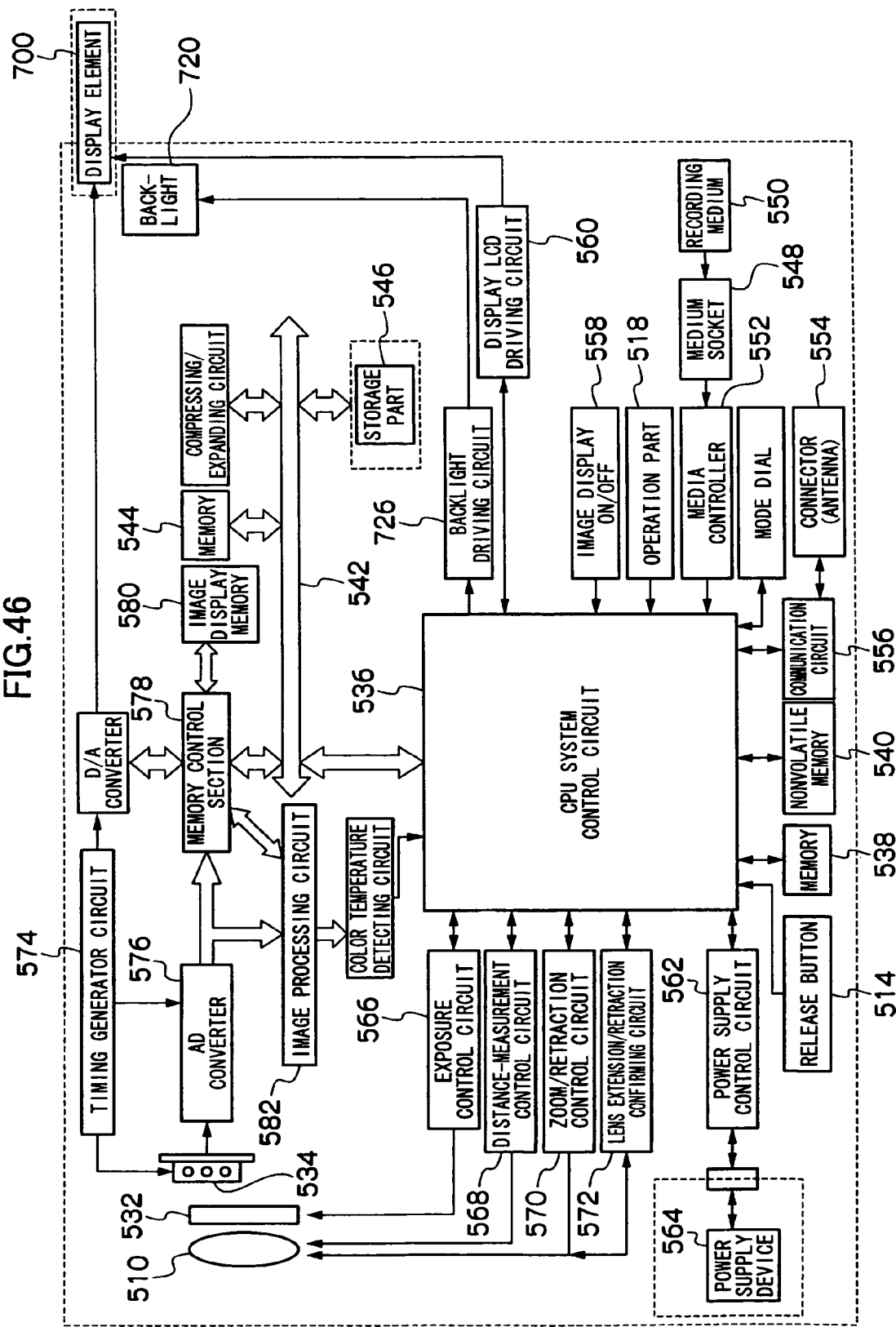
FIG. 46 is a block diagram showing the configuration of an imaging device including the display element of FIG. 44.

FIG. 46 is a block diagram showing the case where the display element is applied to an imaging device. The configuration of the imaging device is substantially similar to that of the imaging device 500 shown in FIG. 35, except for the backlight LEDs 720 and the backlight driving circuit 726. Thus the similar parts are indicated by the same reference numerals and the explanation thereof is omitted.

FIG. 47 is an outside drawing showing a display element 810 and a back plate 822 according to another embodiment in which light emitting elements are provided in two rows.

In a display device of the present embodiment, the display element 810 has one end connected to a roll-up shaft 816 and the other end attached to a rod 818, so that the display element 810 is hardly bent in one direction and is easily bent in the other direction. Further, the display element 810 can be rolled up around the roll-up shaft 816 and stored. The back plate 822 is curved with two ridges 826 as shown in FIG. 48A and has a cross-sectional shape of FIG. 48A when unfurled. Moreover, a plurality of backlight LEDs 820 are arranged in two rows around the center of the back plate 822 to obtain more evenly transmitted light. A flexible printed board (flexible printed board for backlighting) 824 having the LEDs 820 is bonded to the back plate 822 and has one end connected to the backlight driving circuit 726 of FIG. 46 through the end of the back plate 822. The bend absorbing portions of the flexible printed board are bent in an unfurled state of FIG. 47. When the display element is rolled up and stored, the back plate 822 becomes flat and the spacing between the LEDs 820 is increased as shown in FIG. 48B, so that dimensional changes are absorbed by the bent portions. The light beams of the LEDs 820 are radially emitted as shown in FIG. 48A. The back plate 822 has a reflective surface on which the light beams emitted in respective directions are reflected to the display element 810 that is a flexible LCD as shown in FIG. 48A, so that the LEDs are caused to act as backlights. After rolled up, the display element 810 and the back plate 822 have a cross-sectional shape shown in FIG. 48B. The back plate 822 substantially becomes flat in cross section. Thus the display element 810 and the back plate 822 can be rolled up and stored in a small space.

FIG. 49 is an outside drawing showing a display element 910 and a back plate 922 according to another embodiment in which light emitting elements are arranged to emit light to the back side.

Figure 50A:
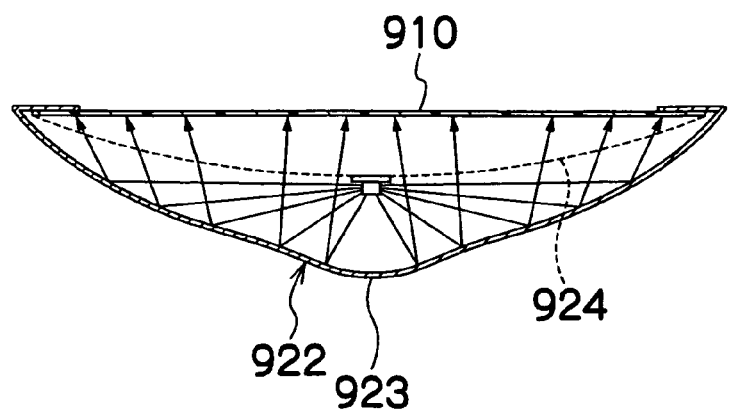
FIGS. 50A and 50B are sectional views showing the display element of FIG. 49.
Figure 50B:
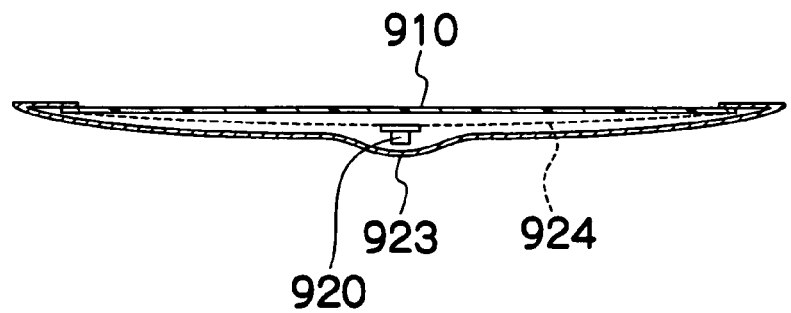

As shown in FIG. 50A, the back plate 922 of the present embodiment is so bent as to have a second expanded portion 923 at the center of the back plate 922. Further, backlight LEDs 920 are arranged around the center of the back plate 922 to emit light to the back plate 922. A flexible printed board (flexible printed board for backlighting) 924 having the LEDs 920 is bonded to the back plate 922 with four bonded portions 924A and has one end connected to the backlight driving circuit 726 of FIG. 46 through the end of the back plate 922. The flexible printed board 924 is bent with the LEDs 920 disposed at the intermediate position as shown in FIG. 50A, and reflected light is emitted to the back side of the display element 910 through a reflective surface as shown 50A. When unfurled, the back plate 922 is bent as shown in FIG. 49. When rolled up, the back plate 922 is flattened and is reduced in thickness as shown in FIG. 50B, so that the display element 910 and the back plate 922 can be rolled up and stored in a small space. At this moment, the convex portions of the LEDs 920 facing the back side are stored in the second expanded portion 923 at the center of the back plate, so that the back plate 922 is not deformed.

The flexible printed board 924 does not always have to keep the shape of the display element 910. Any configuration may be used as long as the flexible printed board 924 is bent and separated from the display element 910 when used and the flexible printed board 924, when stored, comes into contact with or comes closer to the display element 910 than when used.

Figure 51A:
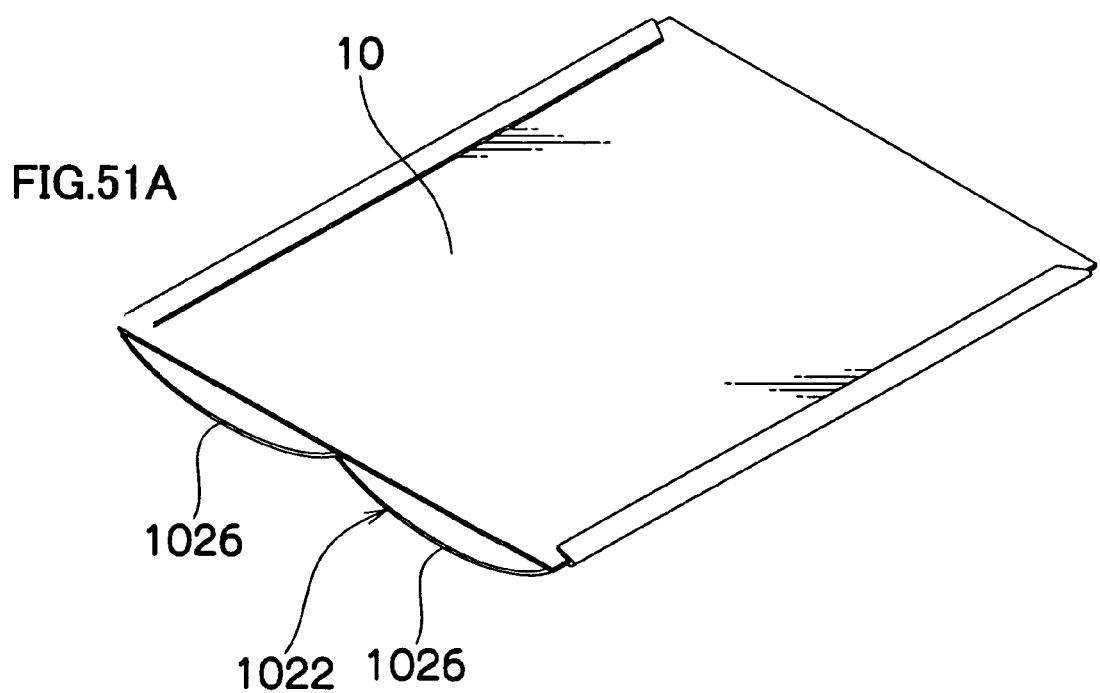
FIGS. 51A to 51F are explanatory drawings showing back plates according to another embodiment.
Figure 51B:
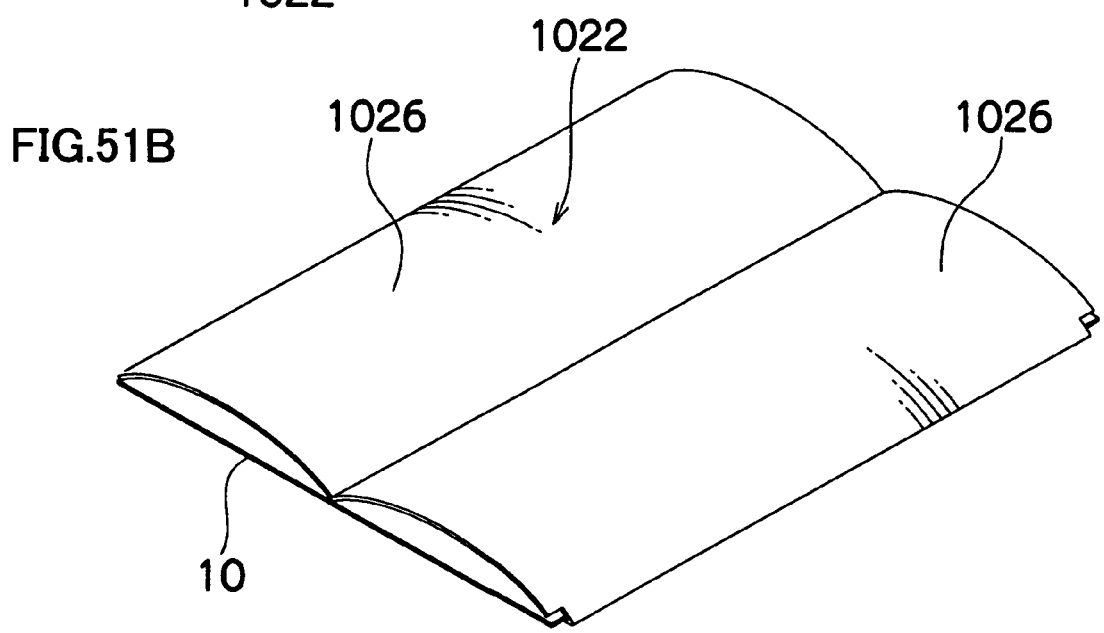
Figure 51C:
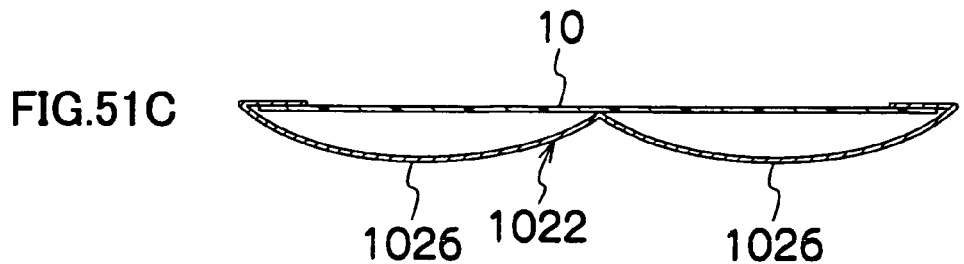
Figure 51D:
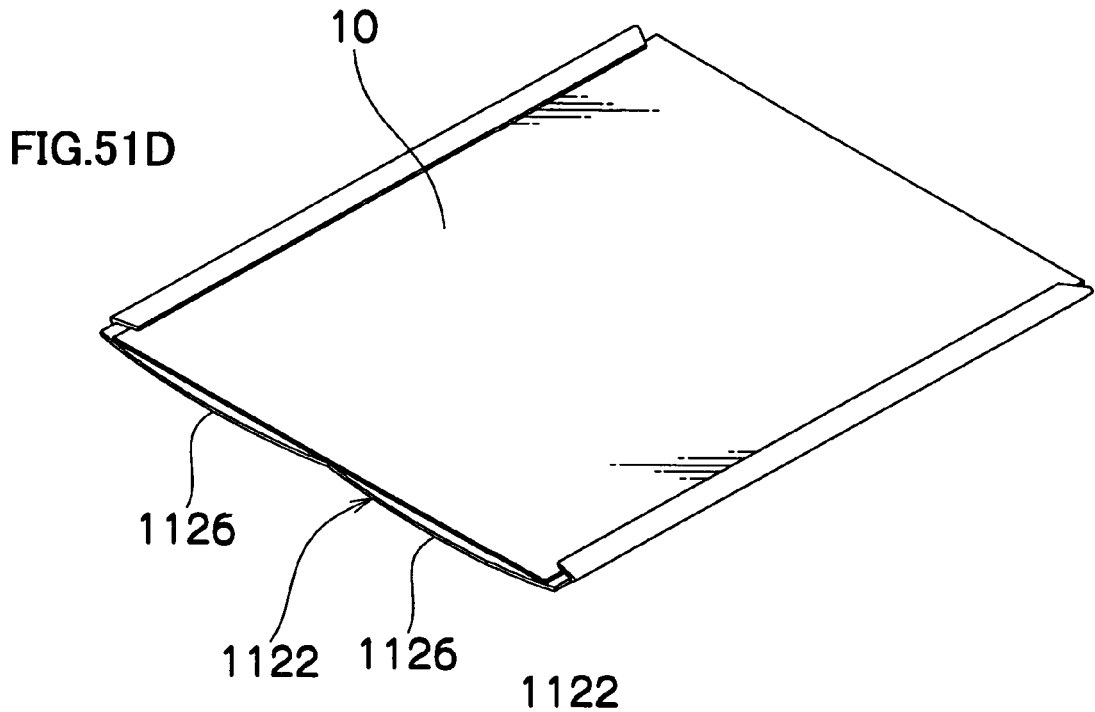
Figure 51E:
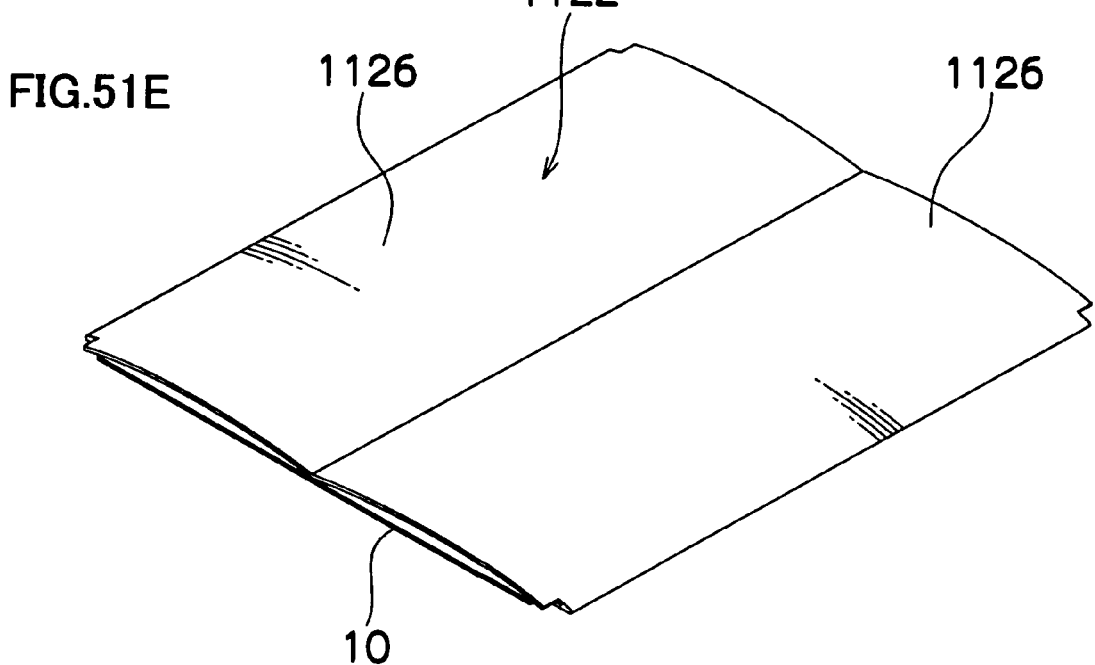
Figure 51F:
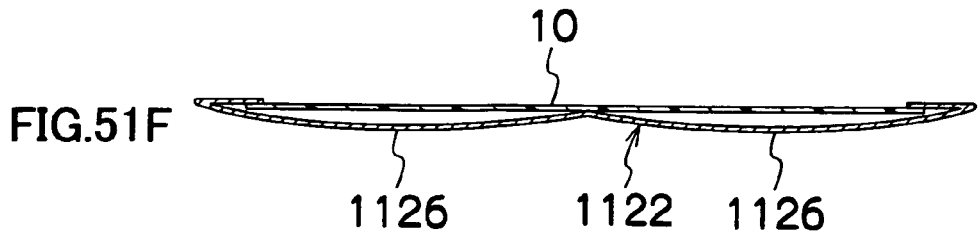

FIGS. 51A to 51D show a back plate according to another embodiment. A back plate 1022 of FIGS. 51A to 51C has two high ridges 1026. A back plate 1122 of FIGS. 51D to 51F has two ridges 1126 bent to be lower than the ridges 1026. For convenience, reference numeral 10 denotes a display element.

Figure 52A:
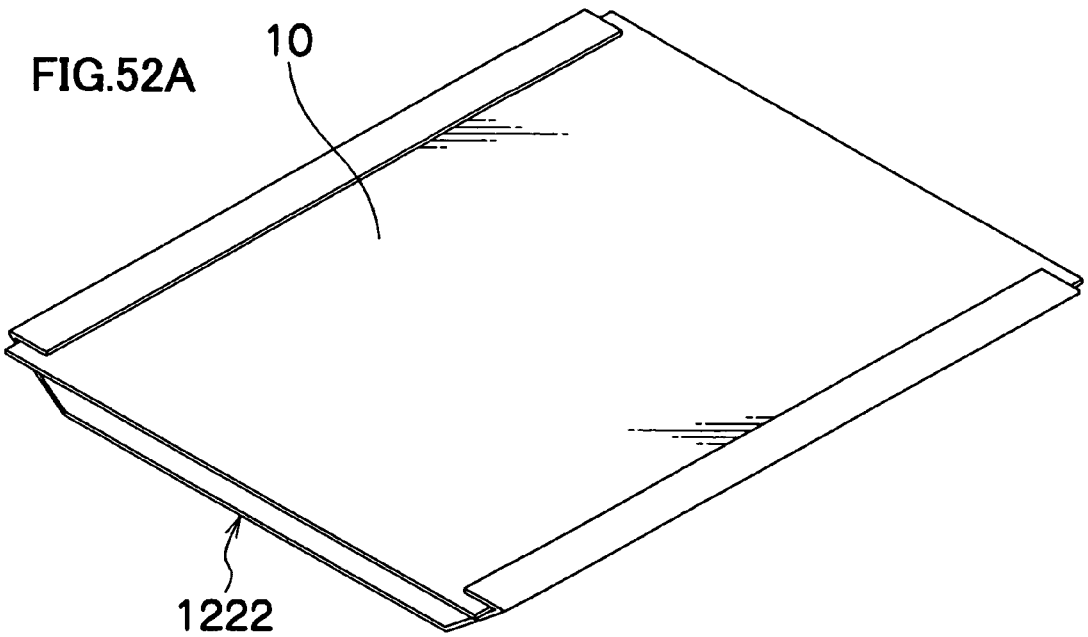
FIGS. 52A and 52B are explanatory drawings showing a back plate according to another embodiment.
Figure 52B:
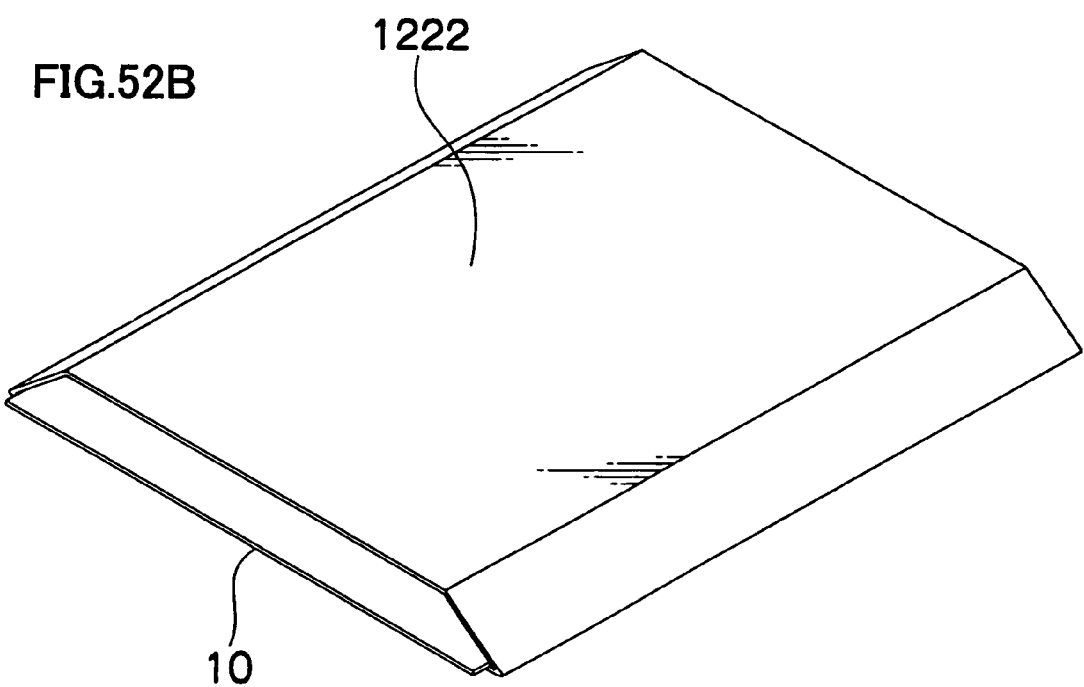
Figure 53A:
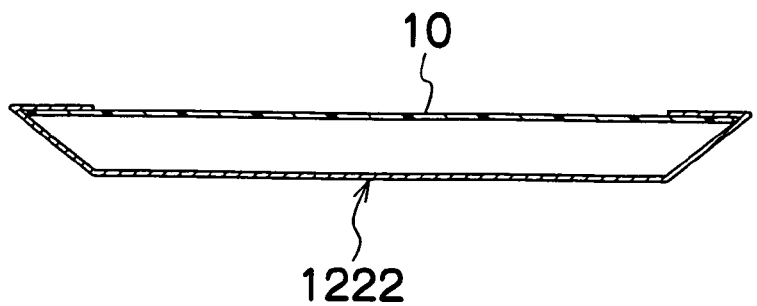
FIGS. 53A and 53B show the cross-sectional shapes of another embodiment of FIGS. 52A and 52B when rolled and unrolled.
Figure 53B:
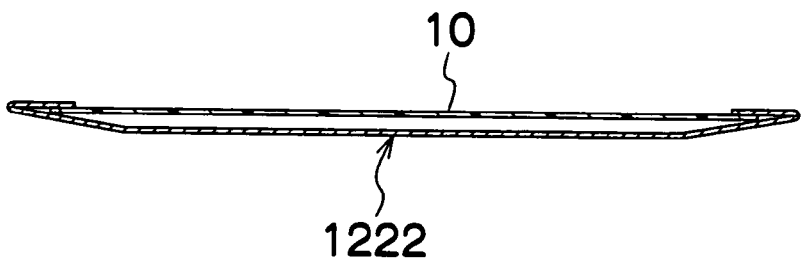

FIGS. 52A and 52B show a back plate according to still another embodiment. A back plate 1222 of FIGS. 52A and 52B does not have any ridges or is not substantially V-shaped but substantially has a recessed shape in cross section. FIG. 53A shows the cross-sectional shape of the unrolled display element and the unrolled back plate of FIGS. 52A and 52B. FIG. 53B shows the cross-sectional shape of the rolled display element and the rolled back plate of FIGS. 52A and 52B.

What is claimed is:

1. A flexible display capable of being rolled up and unfurled, comprising:
 a flexible display element; and
 a back plate covering a back side of the flexible display element,
 wherein the back plate comes into contact with the back side of the flexible display element when the flexible display element is rolled up, and at least a central portion of the back plate is separated from the flexible display element to support the flexible display element in a flat shape when the flexible display element is unfurled, and
 wherein the back plate has a ridge member to have a shape with a plurality of ridges formed by a plurality of bent portions separate from the flexible display element, so as to form a space surrounded by the flexible display element and the back plate when the flexible display element is unfurled.

2. The flexible display according to claim 1,
 wherein the back plate comes into contact with the back side of the flexible display element when the flexible display element is rolled up, and is bent in a manner that at least a central portion of the back plate is separated from the back side of the flexible display element due to a bend when the flexible display element is unfurled, and
 wherein flatness of the flexible display element is kept by a structure made up of the flexible display element and the back plate when the flexible display element is unfurled.

3. The flexible display according to claim 1, wherein the back plate is V-shaped in cross section with the central portion separated from the flexible display element due to a bend when the flexible display element is unfurled.

4. The flexible display according to claim 1, wherein the back plate has one end fixed on the back side of the flexible display element.

5. The flexible display according to claim 1,
 wherein the back plate reduces a resistance to a rolling movement by removing a lateral pressure in a planar direction of the flexible display element to decrease shape retention of the flexible display element when the flexible display element is rolled up, and applies a lateral pressure to the flexible display element to keep the shape of the flexible display element flat when the flexible display element is unfurled.

6. The flexible display according to claim 5, wherein the back plate is V-shaped in cross section with the central portion separated from the flexible display element due to a bend when the flexible display element is unfurled.

7. The flexible display according to claim 5, wherein the back plate has one end fixed on the back side of the flexible display element.

8. The flexible display according to claim 1, further comprising:
 a reflective surface which is placed on a side of the flexible display element of the back plate; and
 light emitting elements which are placed between the reflective surface and the flexible display element.

9. The flexible display according to claim 8,
 wherein the light emitting elements are provided on an intermediate position of the flexible display element and the reflective surface by an elastic member, and the light emitting elements can be rolled in contact with the flexible display element when the flexible display element is rolled up.

10. The flexible display according to claim 9, wherein the elastic member comprises a flexible printed board having an interconnection of the light emitting elements.

11. The flexible display according to claim 8,
 wherein the back plate comes into contact with the flexible display element when the flexible display element is rolled up, and the back plate is ridged to have a plurality of bent portions separate from the flexible display element due to bends when the flexible display element is unfurled.

12. The flexible display according to claim 1, further comprising:
 a main body substantially shaped like one of a cylinder and a polygon, the main body which stores the flexible display element and the back plate when the flexible display element is unfurled;
 a roll-up shaft for rolling up the flexible display element and the back plate when the flexible display element is unfurled, the roll-up shaft being included in the main body; and
 a pull-out slot through which the flexible display element and the back plate are taken in and out from the main body.

13. The flexible display according to claim 12,
 wherein the pull-out slot is formed to have a shape which is flattened by a predetermined amount from a cross-sectional shape of the unrolled back plate, and to have a clearance formed on a portion facing a surface of the flexible display element.

14. The flexible display according to claim 12,
 wherein the pull-out slot is formed to have a shape which is flatter than a cross-sectional shape of the unrolled back plate, and to have a clearance formed on a portion facing a surface of the flexible display element.

15. The flexible display according to claim 12,
 wherein the pull-out slot is formed to have a shape which is substantially identical shape to a cross-sectional shape of the unrolled back plate, and to have a clearance expanding toward a center, which is formed on a portion facing a surface of the flexible display element.

16. An imaging device including:
 a taking lens and a shooting part; and
 the flexible display according to claim 12,
 wherein the back plate keeps a predetermined positional relationship and shape relative to the main body by applying a restraining force to the pulled out flexible display element, and releases the restraining force when the flexible display element is stored in the main body.

17. The imaging device according to claim 16, further comprising a detecting device which detects a movement of the flexible display element,
 wherein operation modes are switched in synchronization with the movement of the flexible display element from a first position to a second position.

18. The imaging device according to claim 16, further comprising
 convex portions provided on portions of the back plate, which are folded to both ends of a display screen.

19. The imaging device according to claim 16, further comprising
 a rolling detecting switch disposed on a position making contact with a portion outside a display range of the flexible display element when the flexible display element is rolled up, on the roll-up shaft of the flexible display element stored in the main body,
 wherein the rolling detecting switch turns off at least a part of display on a display part when the flexible display element is rolled up.

20. The imaging device according to claim 16, wherein the taking lens and the shooting part are placed on the main body.

21. A flexible display capable of being rolled up and unfurled, comprising:
- a flexible display element;
- a back plate covering a back side of the flexible display element;
- a main body substantially shaped like one of a cylinder and a polygon, the main body storing the flexible display element and the back plate when the flexible display element is unfurled;
- a roll-up shaft for rolling up the flexible display element and the back plate when the flexible display element is unfurled, the roll-up shaft being included in the main body; and
- a pull-out slot through which the flexible display element and the back plate are taken in and out from the main body,
- wherein the back plate comes into contact with the back side of the flexible display element when the flexible display element is rolled up, and at least a central portion of the back plate is separated from the flexible display element to support the flexible display element in a flat shape when the flexible display element is unfurled, and
- wherein the pull-out slot is formed to have a shape which is substantially identical to a cross-sectional shape of the unrolled back plate, and to have a clearance formed on a portion facing a surface of the flexible display element.

22. The flexible display according to claim 21, further comprising
- a detecting device which detects a movement of the flexible display element,
- wherein operation modes are switched in synchronization with the movement of the flexible display element from a first position to a second position.

23. The flexible display according to claim 22, further comprising:
- a taking lens; and
- a shooting part.

24. The flexible display according to claim 21, further comprising
- a rolling detecting switch disposed on a position making contact with a portion outside a display range of the flexible display element when the flexible display element is rolled up, on the roll-up shaft of the flexible display element stored in the main body,
- wherein the rolling detecting switch turns off at least a part of display on a display part when the flexible display element is rolled up.

25. The flexible display according to claim 24, further comprising:
- a taking lens; and
- a shooting part.

26. A flexible display capable of being rolled up and unfurled, comprising:
- a flexible display element;
- a back plate covering a back side of the flexible display element;
- a main body substantially shaped like one of a cylinder and a polygon, the main body storing the flexible display element and the back plate when the flexible display element is unfurled;
- a roll-up shaft for rolling up the flexible display element and the back plate when the flexible display element is unfurled, the roll-up shaft being included in the main body; and
- a pull-out slot through which the flexible display element and the back plate are taken in and out from the main body,
- wherein the back plate comes into contact with the back side of the flexible display element when the flexible display element is rolled up, and at least a central portion of the back plate is separated from the flexible display element to support the flexible display element in a flat shape when the flexible display element is unfurled, and
- wherein the pull-out slot is formed to have a shape which is substantially identical shape to a cross-sectional shape of the unrolled back plate, and to have a clearance expanding toward a center, which is formed on a portion facing a surface of the flexible display element.

27. The flexible display according to claim 26, further comprising
- a detecting device which detects a movement of the flexible display element,
- wherein operation modes are switched in synchronization with the movement of the flexible display element from a first position to a second position.

28. The flexible display according to claim 27, further comprising:
- a taking lens; and
- a shooting part.

29. The flexible display according to claim 26, further comprising
- a rolling detecting switch disposed on a position making contact with a portion outside a display range of the flexible display element when the flexible display element is rolled up, on the roll-up shaft of the flexible display element stored in the main body,
- wherein the rolling detecting switch turns off at least a part of display on a display part when the flexible display element is rolled up.

30. The flexible display according to claim 29, further comprising:
- a taking lens; and
- a shooting part.

* * * * *